US011327264B2

(12) United States Patent
Reynolds et al.

(10) Patent No.: US 11,327,264 B2
(45) Date of Patent: May 10, 2022

(54) FIBER OPTIC TENSIONING REEL SUB-SYSTEM IN ROBOTIC FIBER OPTIC CROSS-CONNECT SYSTEMS, SUB-SYSTEMS, DEVICES AND METHODS

(71) Applicant: TELESCENT INC., Irvine, CA (US)

(72) Inventors: Keith Wayne Reynolds, Carlsbad, CA (US); Michael Bijan Ahmadi, Corona del Mar, CA (US); Anthony Stephen Kewitsch, Costa Mesa, CA (US)

(73) Assignee: TELESCENT INC., Irvine, CA (US)

( * ) Notice: Subject to any disclaimer, the term of this patent is extended or adjusted under 35 U.S.C. 154(b) by 0 days.

(21) Appl. No.: 17/012,024

(22) Filed: Sep. 3, 2020

(65) Prior Publication Data

US 2021/0072483 A1    Mar. 11, 2021

Related U.S. Application Data

(60) Provisional application No. 62/896,050, filed on Sep. 5, 2019, provisional application No. 62/897,168, filed on Sep. 6, 2019, provisional application No. 62/898,353, filed on Sep. 10, 2019, provisional application No. 62/924,291, filed on Oct. 22, 2019, provisional application No. 63/073,842, filed on Sep. 2, 2020.

(51) Int. Cl.
  *G02B 6/38*   (2006.01)
  *G02B 6/44*   (2006.01)
  *G02B 6/35*   (2006.01)

(52) U.S. Cl.
  CPC .......... *G02B 6/4457* (2013.01); *G02B 6/356* (2013.01); *G02B 6/3888* (2021.05)

(58) Field of Classification Search
  CPC ..... G02B 6/356; G02B 6/3888; G02B 6/4457
  See application file for complete search history.

(56) References Cited

U.S. PATENT DOCUMENTS

| | | | |
|---|---|---|---|
| 5,436,987 A | 7/1995 | Saito et al. | |
| 7,289,197 B2 | 10/2007 | Kewitsch | |
| 7,315,681 B2 | 1/2008 | Kewitsch | |
| 7,460,753 B2 | 12/2008 | Kewitsch | |
| 7,665,901 B2 | 2/2010 | Kewitsch | |
| 7,920,764 B2 | 4/2011 | Kewitsch | |
| 8,068,715 B2 | 11/2011 | Kewitsch | |
| 8,150,227 B2 | 4/2012 | Kewitsch | |
| 8,428,405 B2 | 4/2013 | Kewitsch | |
| 8,463,091 B2 | 6/2013 | Kewitsch | |
| 8,480,310 B2 | 7/2013 | Kewitsch | |
| 8,488,938 B2 | 7/2013 | Kewitsch et al. | |

(Continued)

FOREIGN PATENT DOCUMENTS

WO   2021021280 A1   2/2021

OTHER PUBLICATIONS

WIPO, International Search Report and Written Opinion of the International Searching Authority for International Application No. PCT/US2020/049213 (dated Feb. 17, 2021).

*Primary Examiner* — Charlie Y Peng
(74) *Attorney, Agent, or Firm* — Siritzky Law, PLLC

(57) ABSTRACT

A tensioning spool apparatus for storage of optical fiber exhibiting reduced variation of tension during a retraction cycle versus an extension cycle of fiber over a predefined range of spool rotation cycles, the optical fiber dynamically extended under tension from the spool.

17 Claims, 58 Drawing Sheets

(56) References Cited

U.S. PATENT DOCUMENTS

| | | |
|---|---|---|
| 8,554,033 B2 | 10/2013 | Kewitsch |
| 8,805,155 B2 | 8/2014 | Kewitsch |
| 9,052,465 B2 | 6/2015 | Kewitsch |
| 9,052,490 B2 | 6/2015 | Kewitsch |
| 9,110,249 B2 | 8/2015 | Kewitsch |
| 9,188,748 B2 | 11/2015 | Kewitsch |
| 9,411,108 B2 | 8/2016 | Kewitsch |
| 9,411,308 B2 | 8/2016 | Kubo |
| 9,703,060 B2 | 7/2017 | Kewitsch |
| 10,042,122 B2 | 8/2018 | Kewitsch |
| 10,345,526 B2 | 7/2019 | Kewitsch et al. |
| 10,649,149 B2 | 5/2020 | Kewitsch |
| 2003/0053043 A1 | 3/2003 | Nguyen et al. |
| 2008/0239295 A1* | 10/2008 | Xia ...................... G02B 6/4289 356/73.1 |
| 2010/0316334 A1* | 12/2010 | Kewitsch ............. G02B 6/3502 901/2 |
| 2015/0098698 A1 | 4/2015 | Kewitsch |
| 2016/0202424 A1* | 7/2016 | Kewitsch ............. G02B 6/3508 385/17 |
| 2017/0023710 A1* | 1/2017 | Kuznetsov ............. G02B 1/005 |
| 2019/0056553 A1 | 2/2019 | Kewitsch |
| 2019/0293875 A1 | 9/2019 | Kewitsch |
| 2020/0003958 A1 | 1/2020 | Kewitsch et al. |
| 2020/0003978 A1 | 1/2020 | Kewitsch |
| 2020/0005001 A1 | 1/2020 | Kewitsch |
| 2020/0041725 A1 | 2/2020 | Kewitsch |
| 2020/0358277 A1 | 11/2020 | Kewitsch |
| 2020/0359117 A1 | 11/2020 | Kewitsch |

* cited by examiner

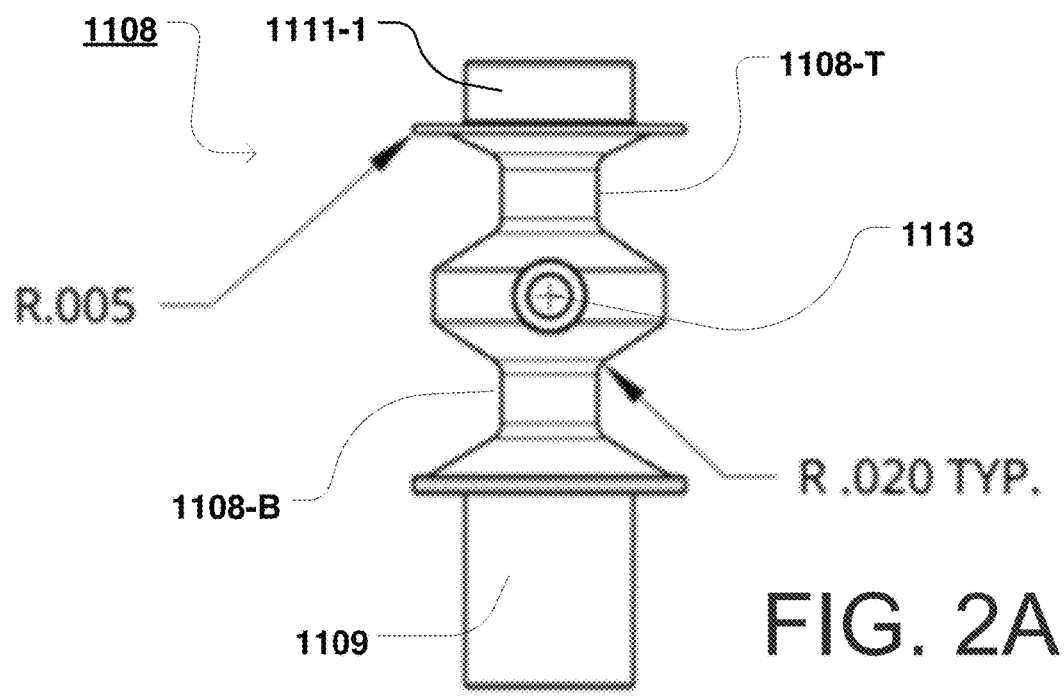
FIG. 2A
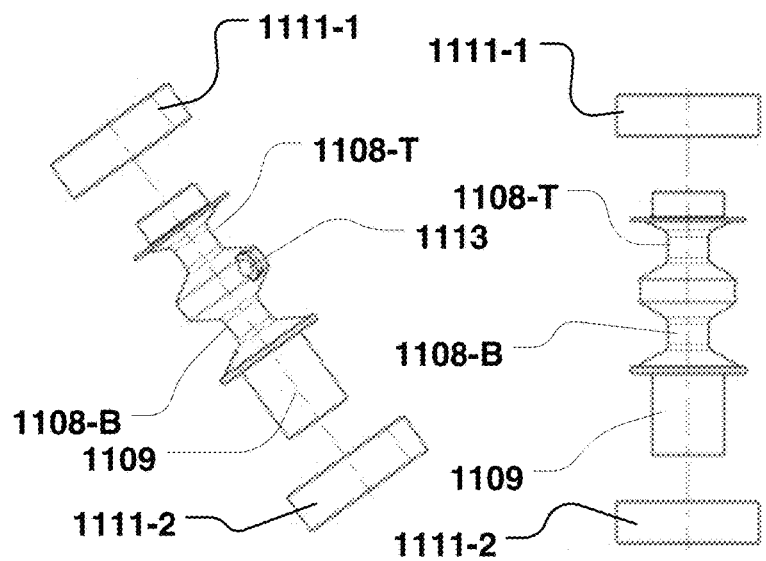
FIG. 2B
FIG. 2C
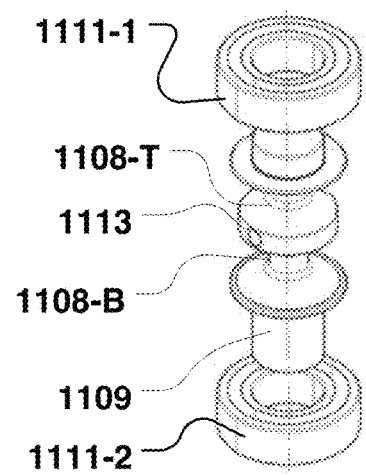
FIG. 2D

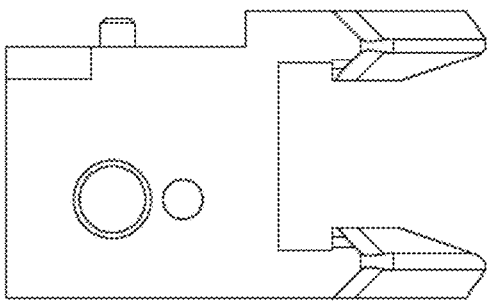
FIG. 4E
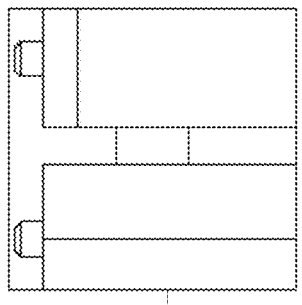
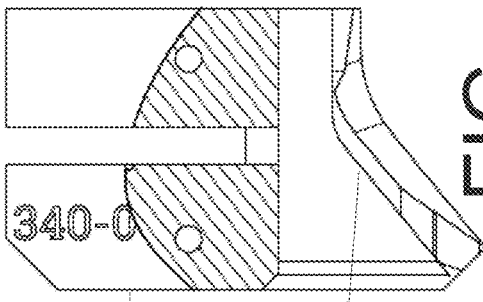
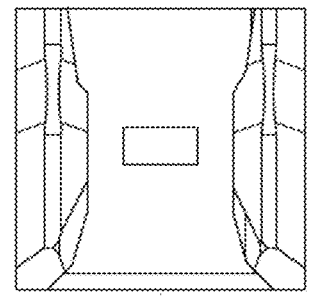
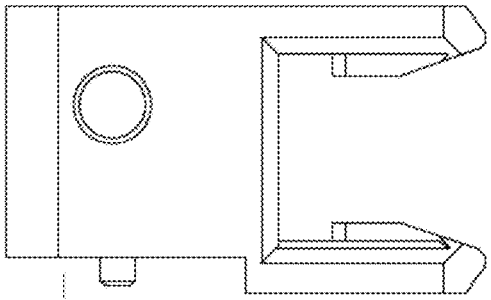
FIG. 4A

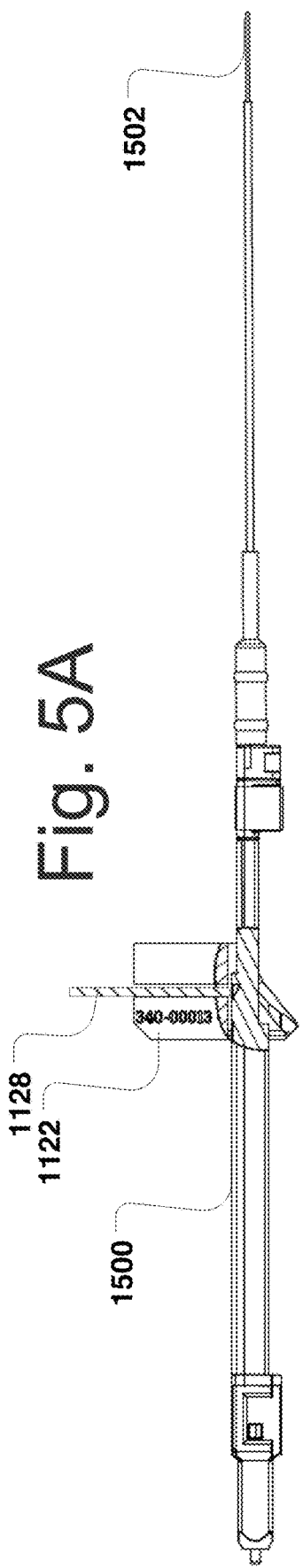
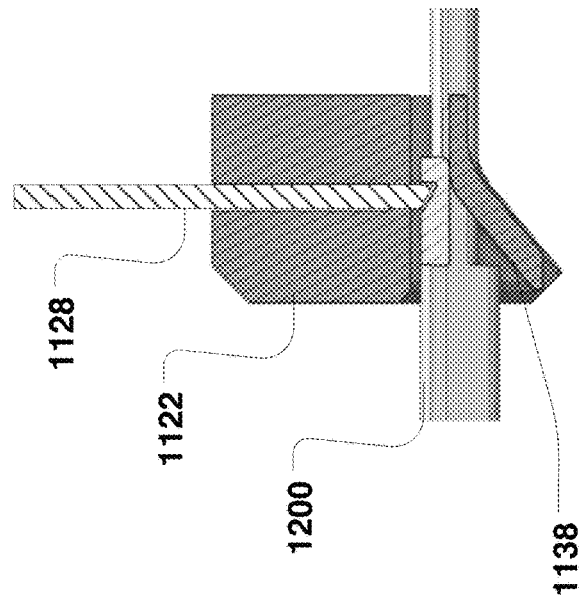

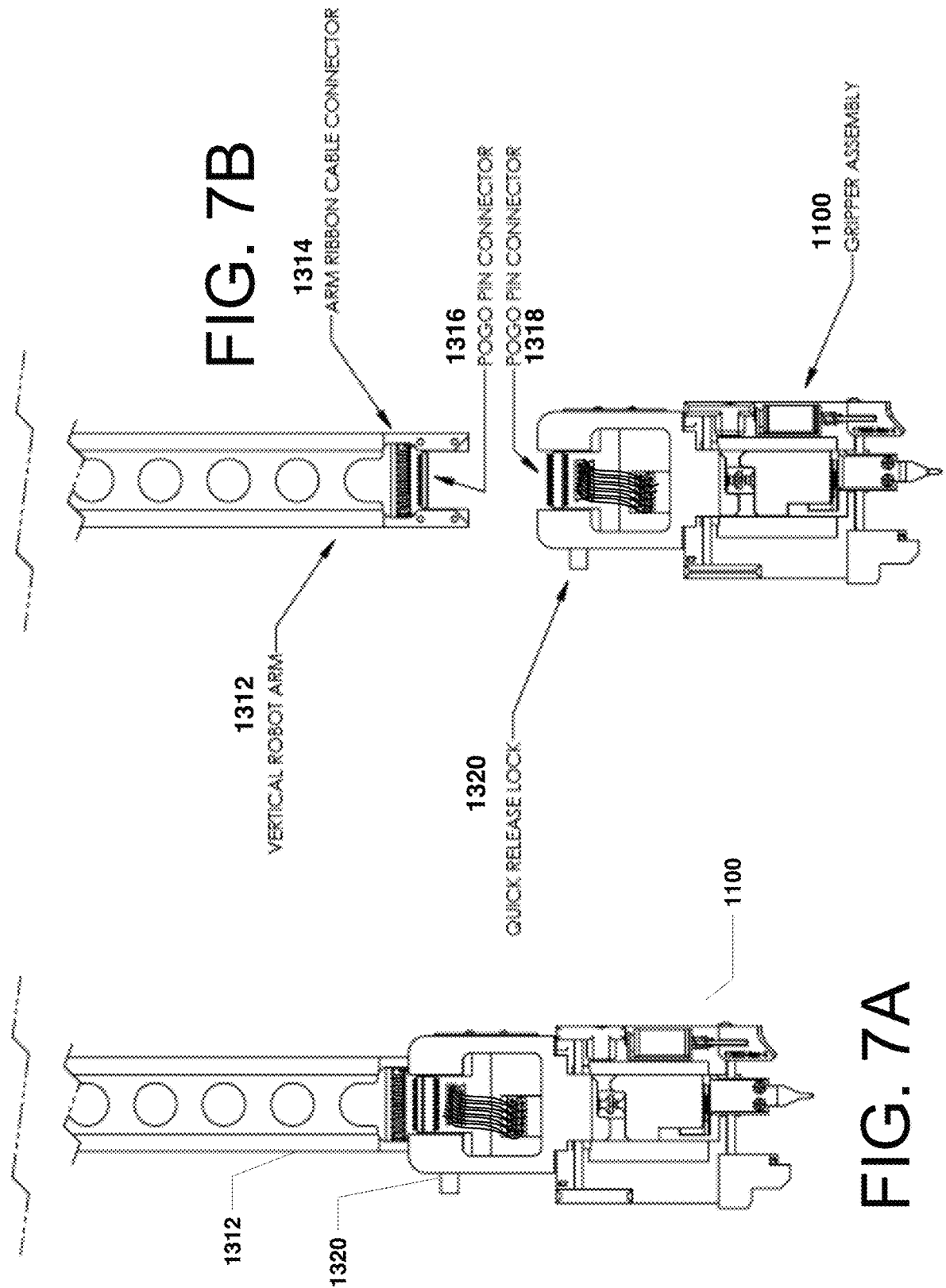

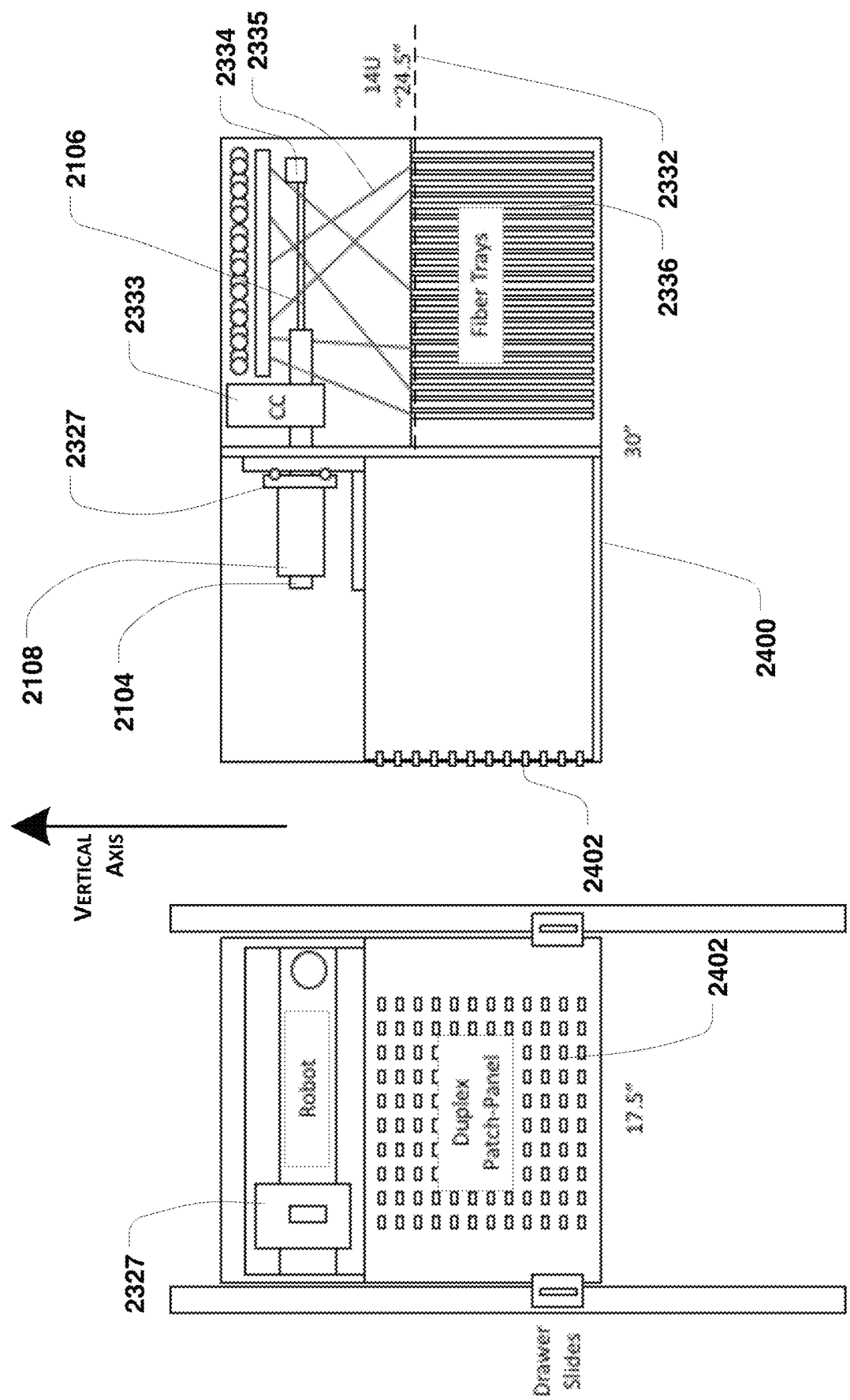

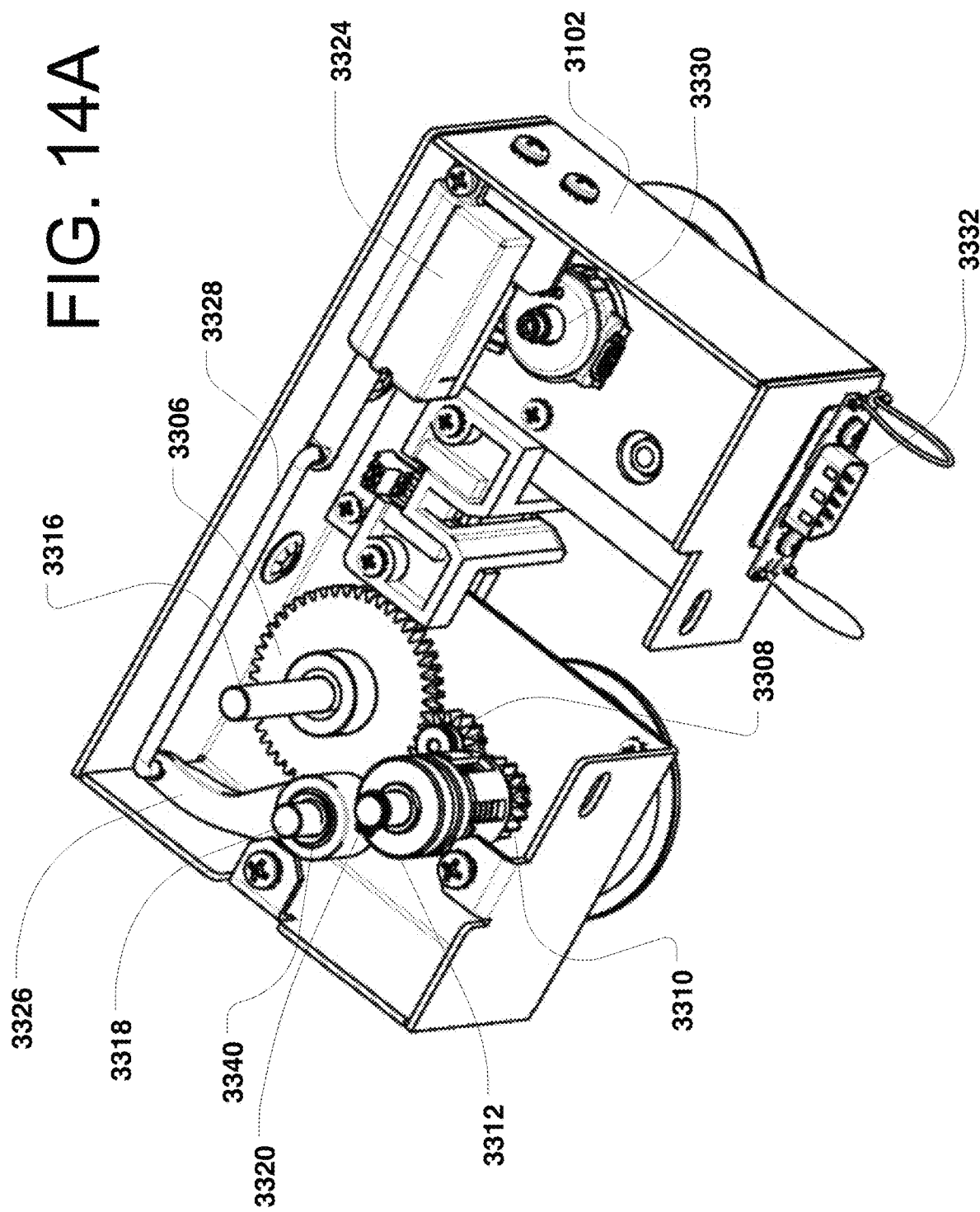

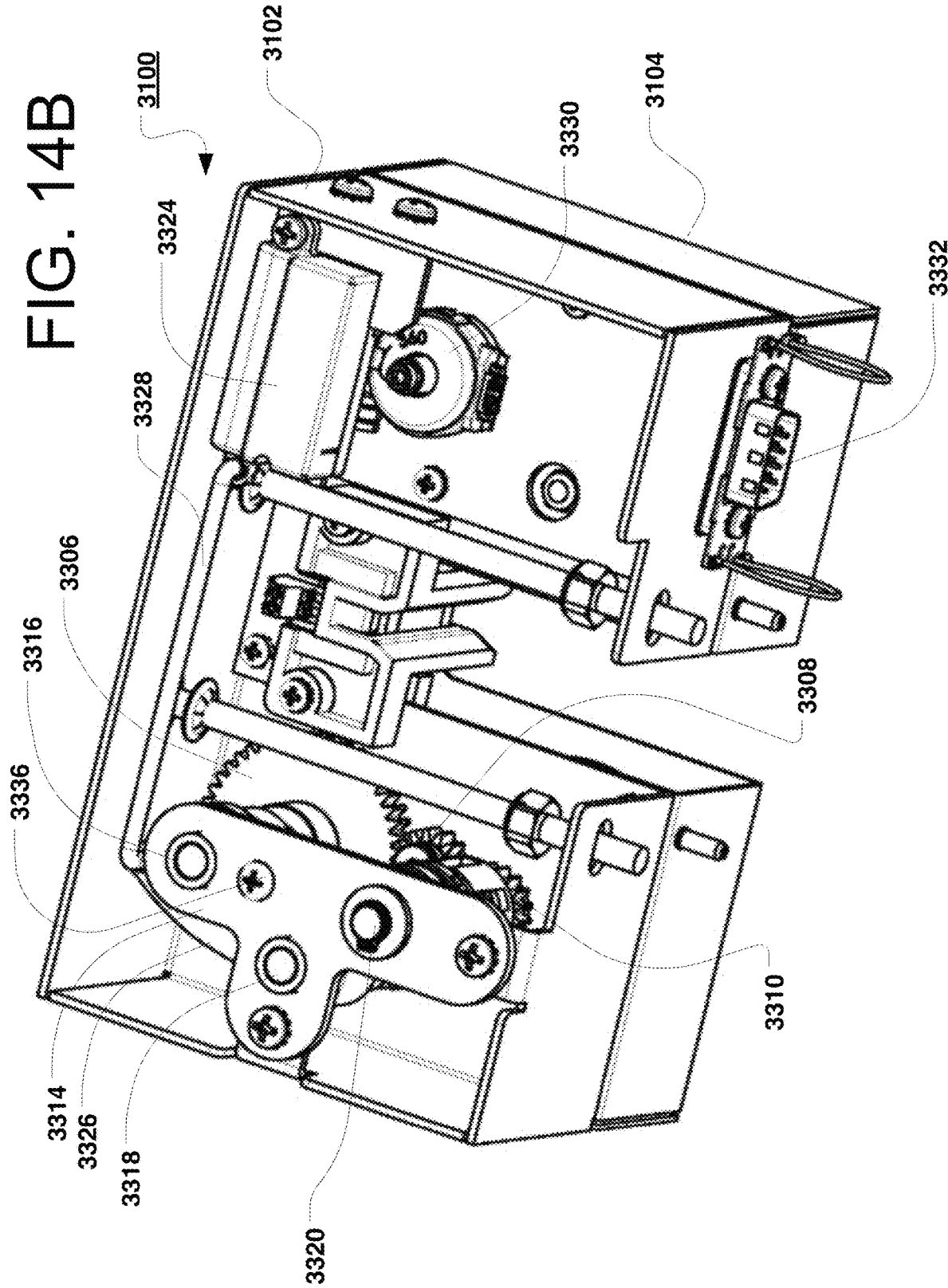

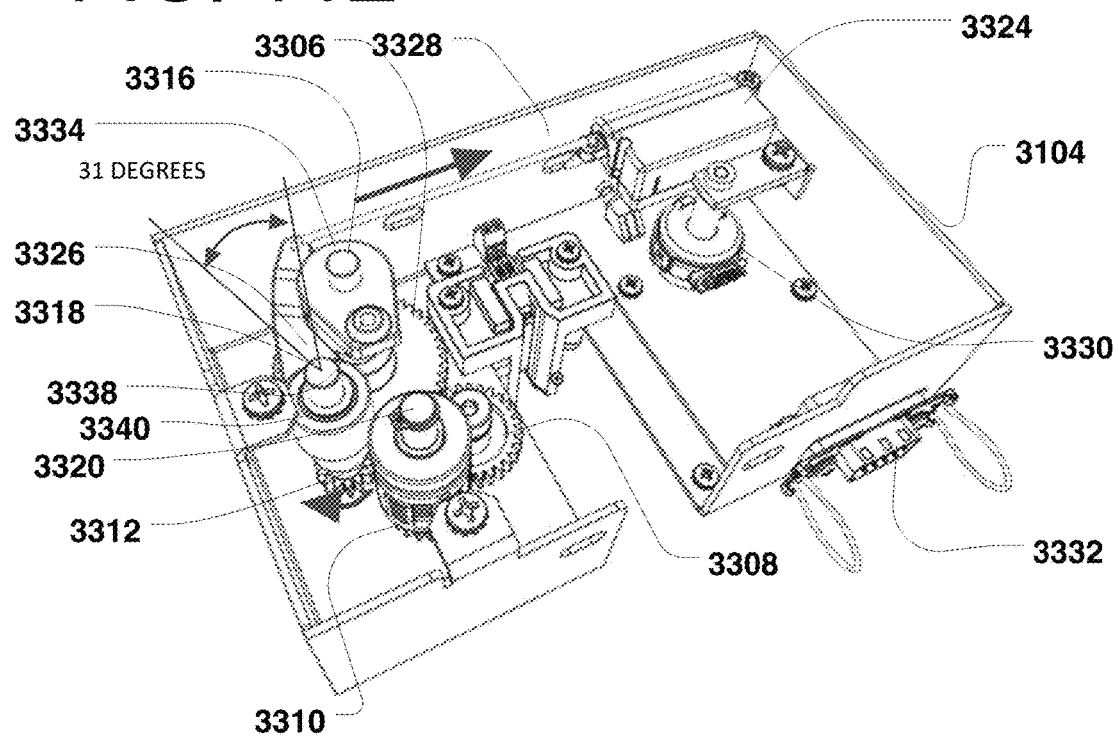
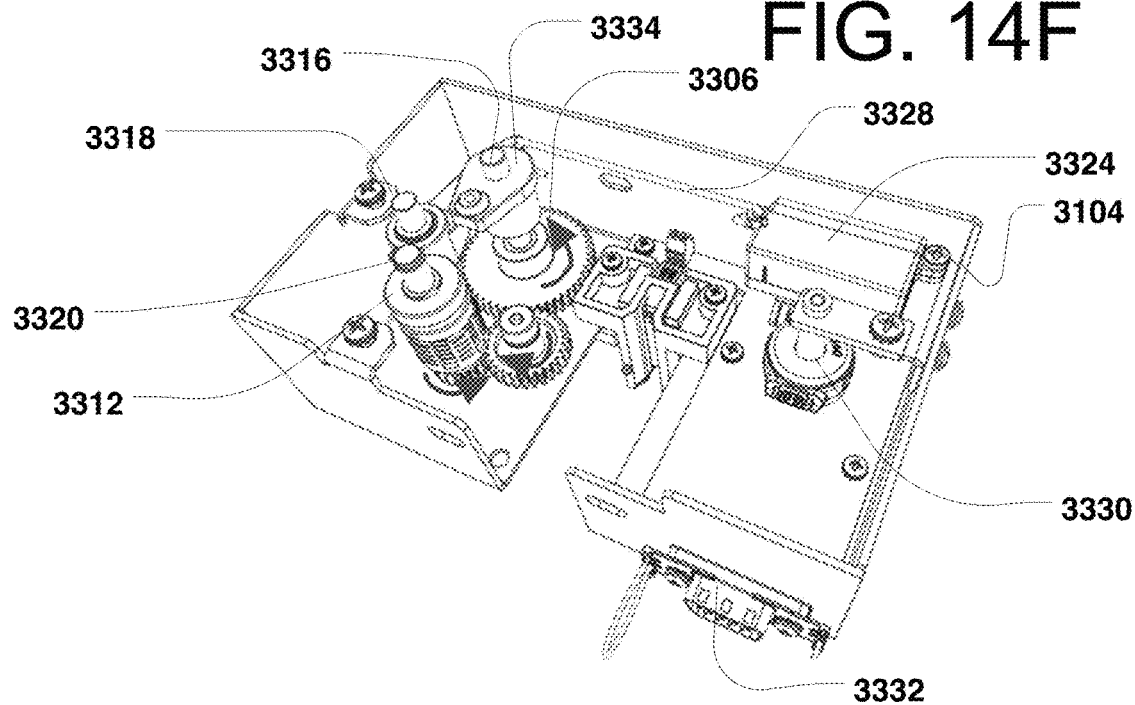

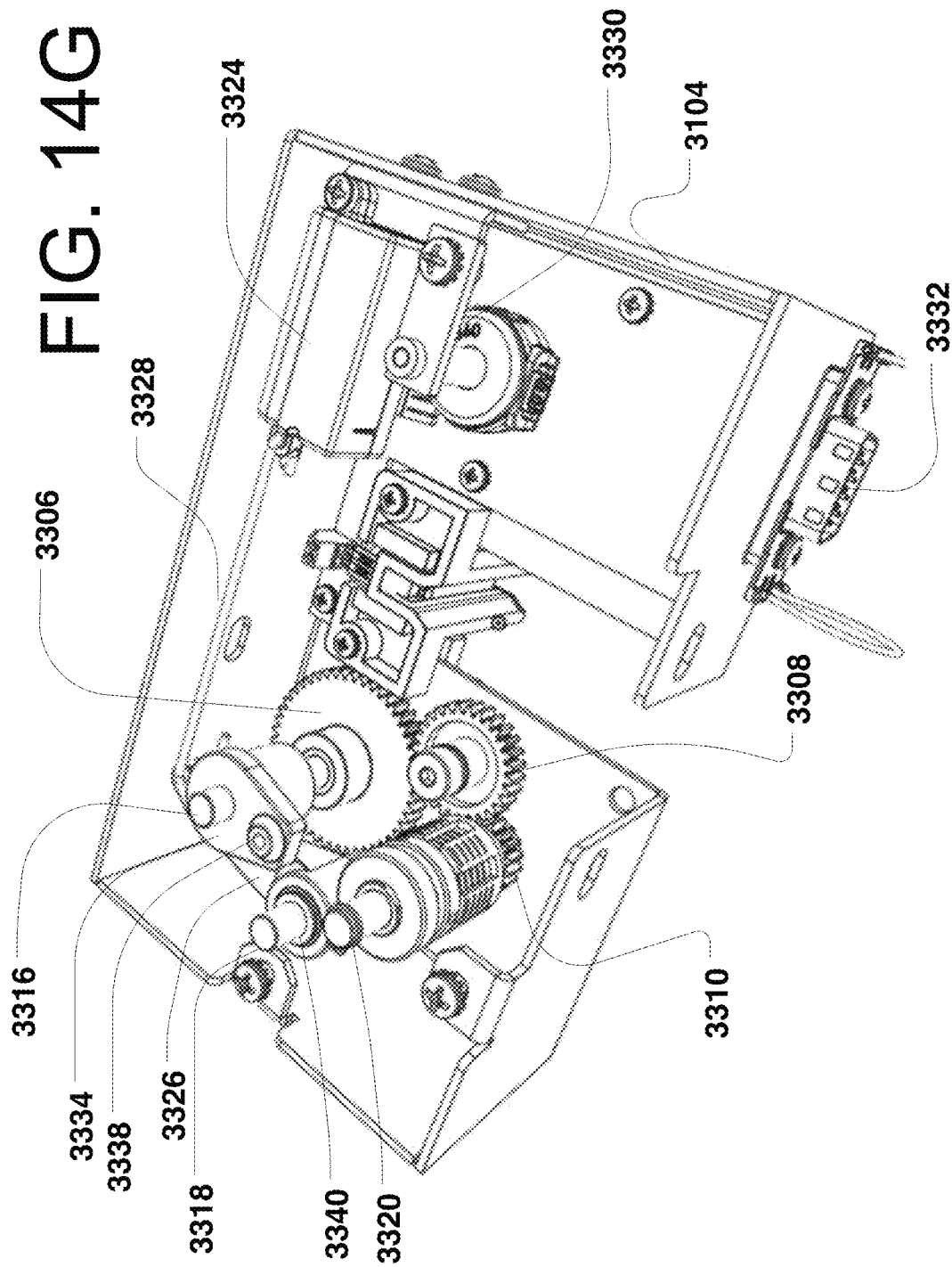

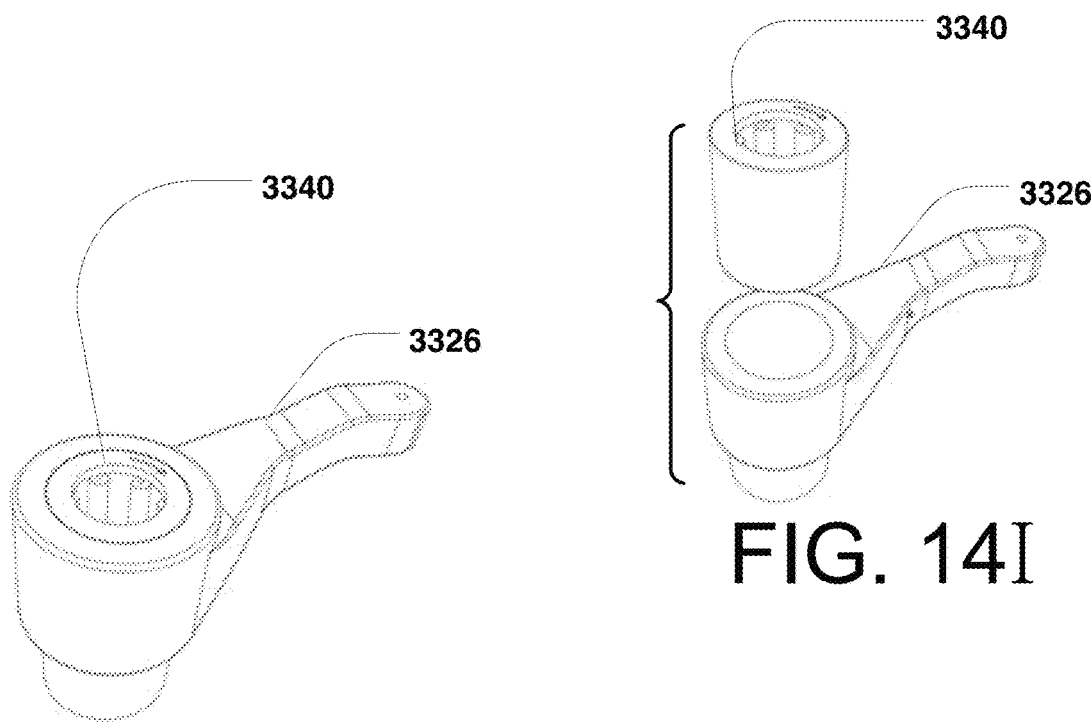
FIG. 14I
FIG. 14J
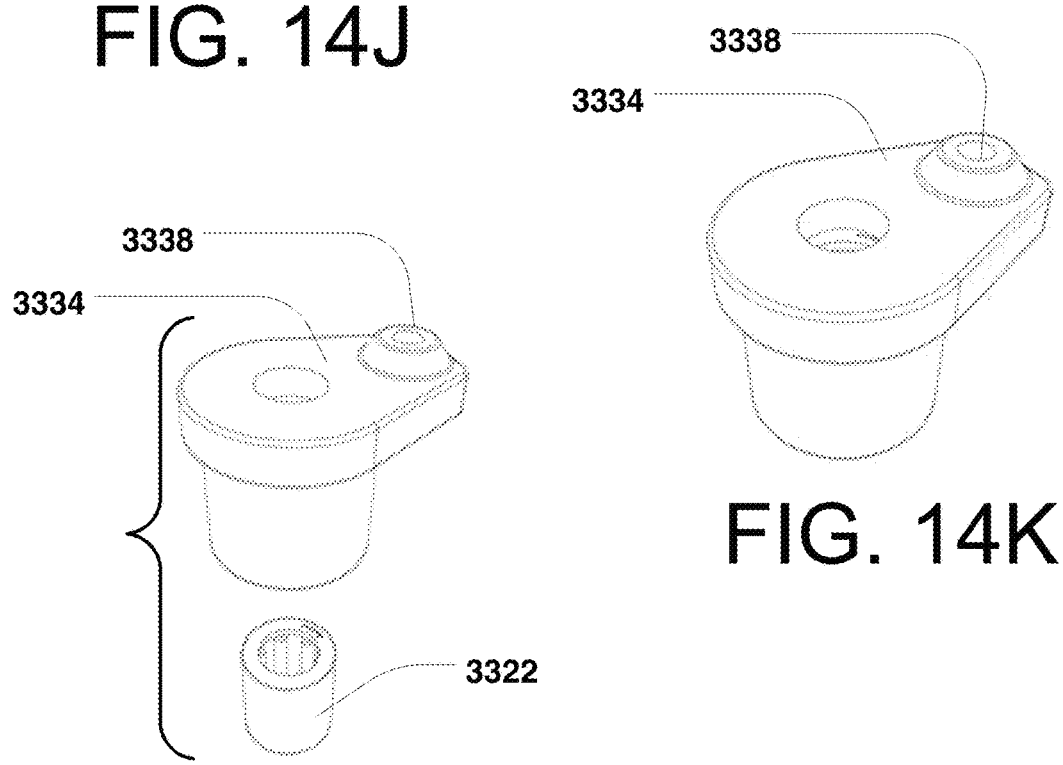
FIG. 14K
FIG. 14L

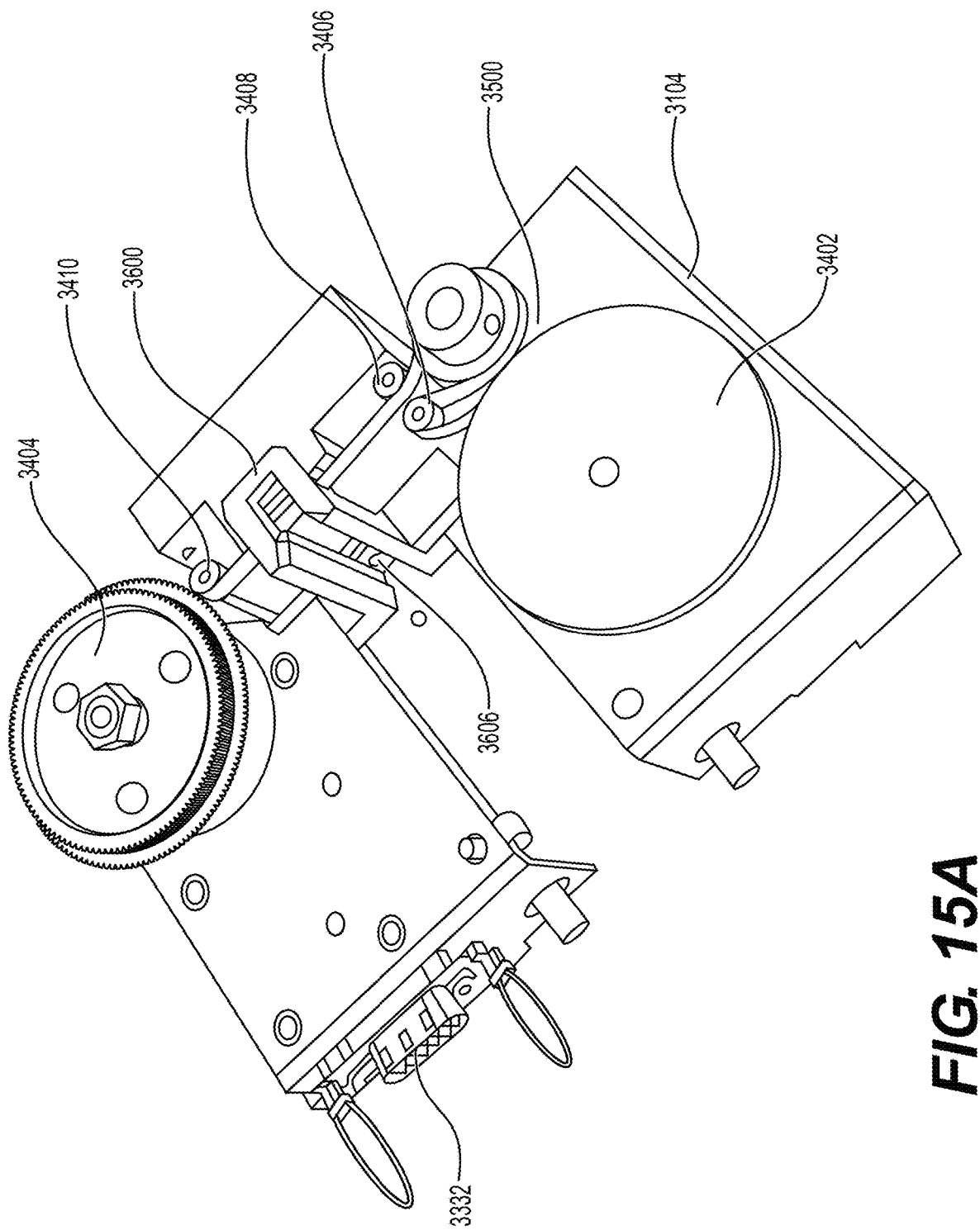

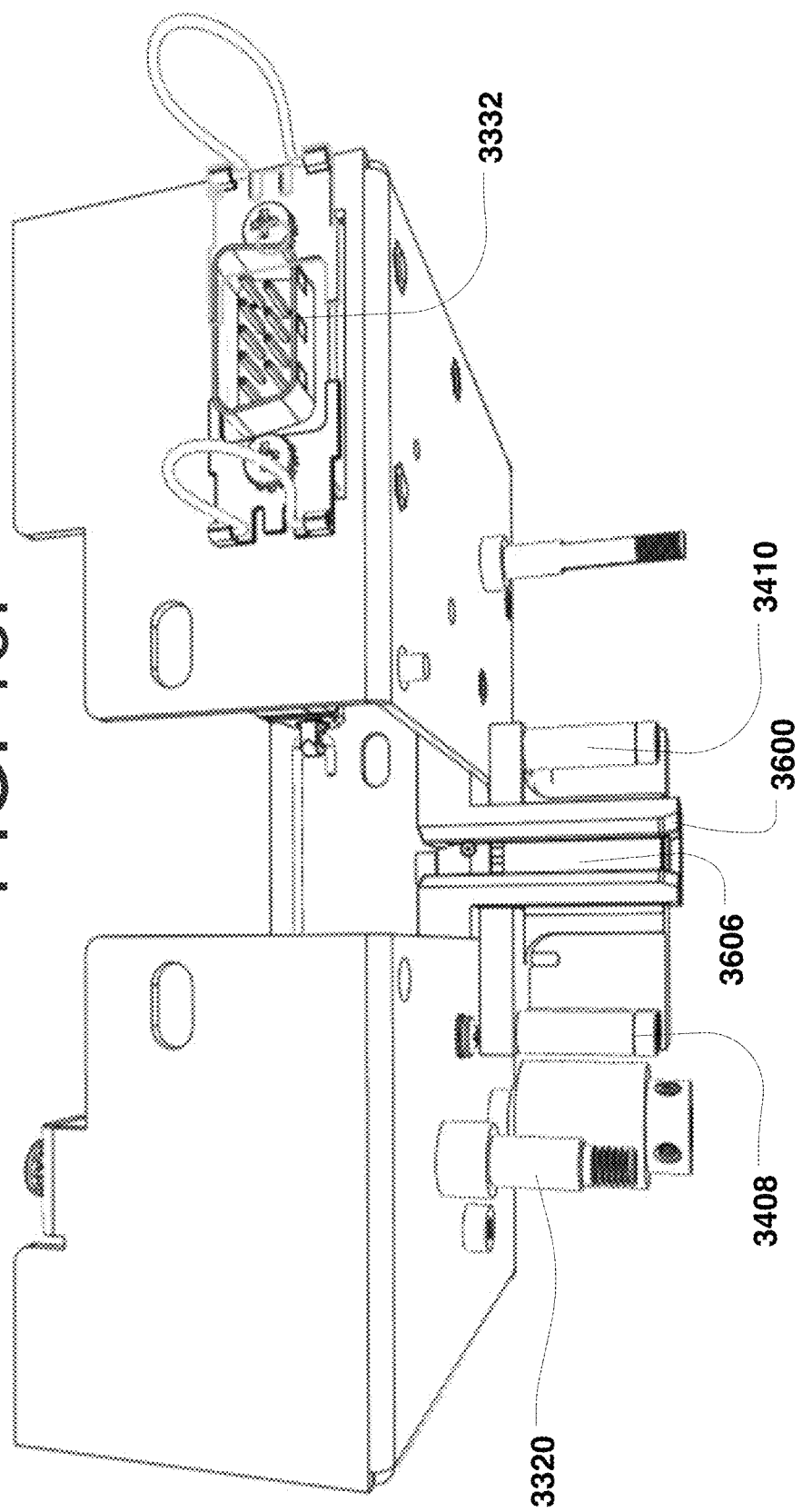

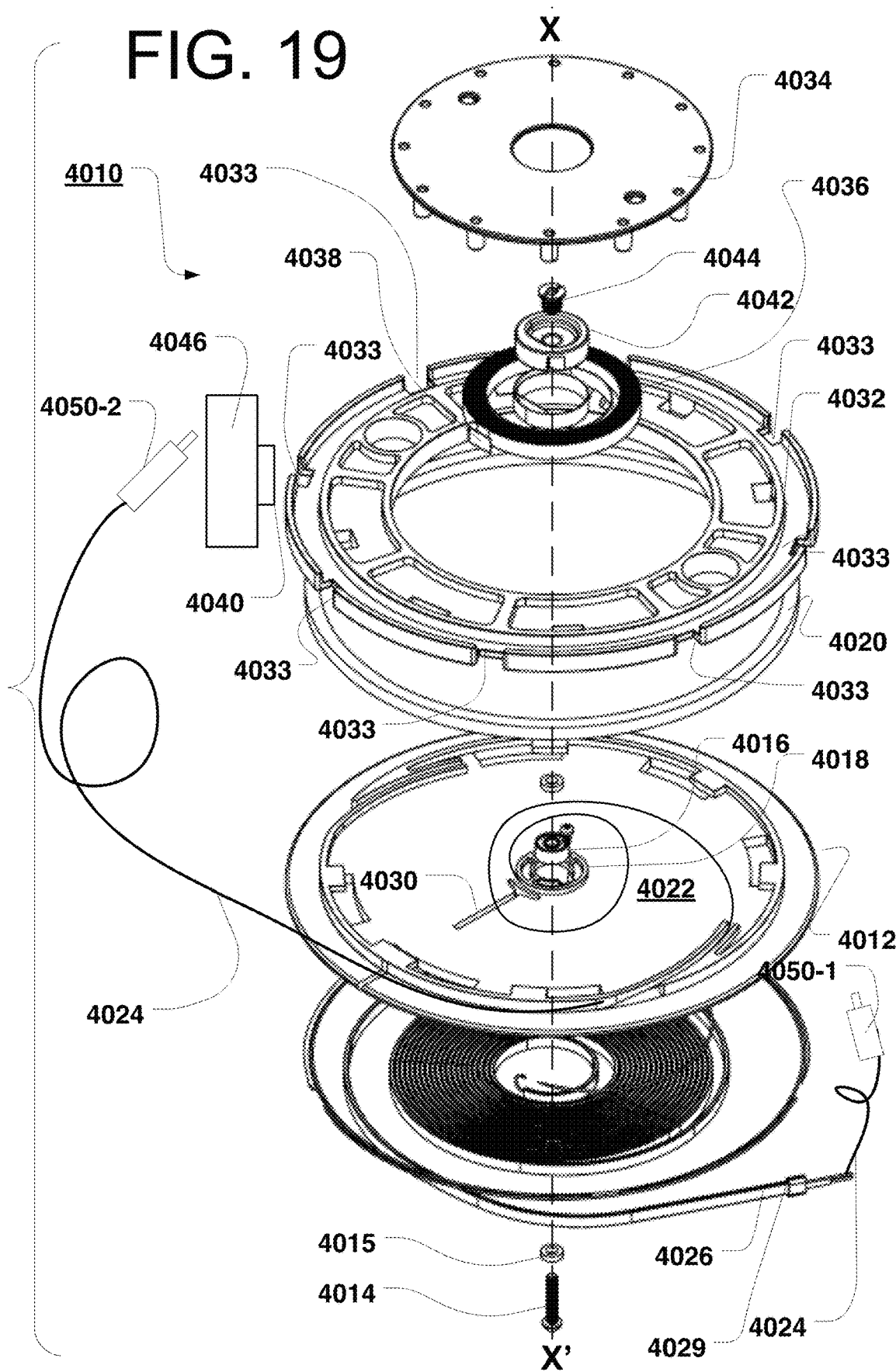

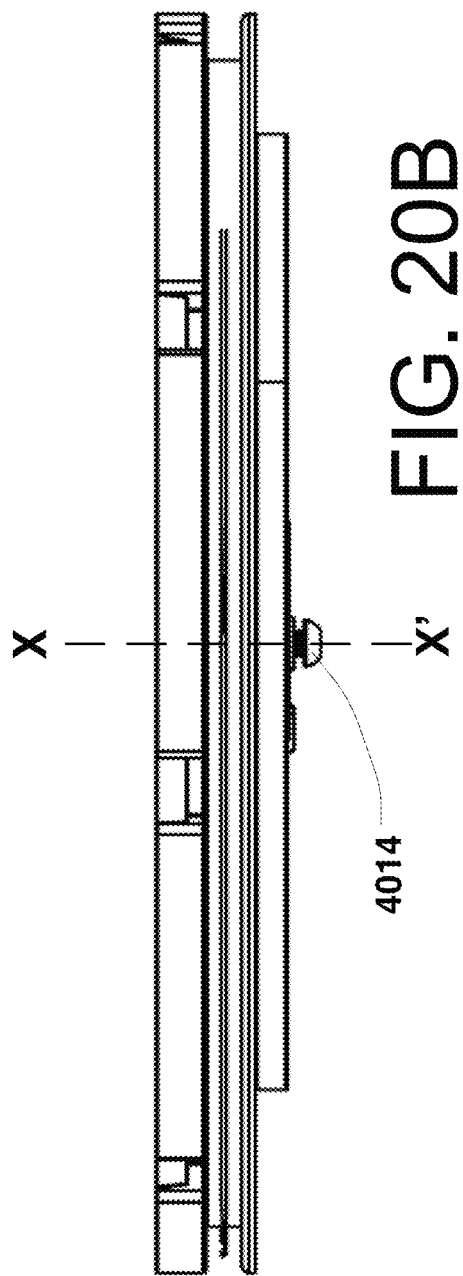

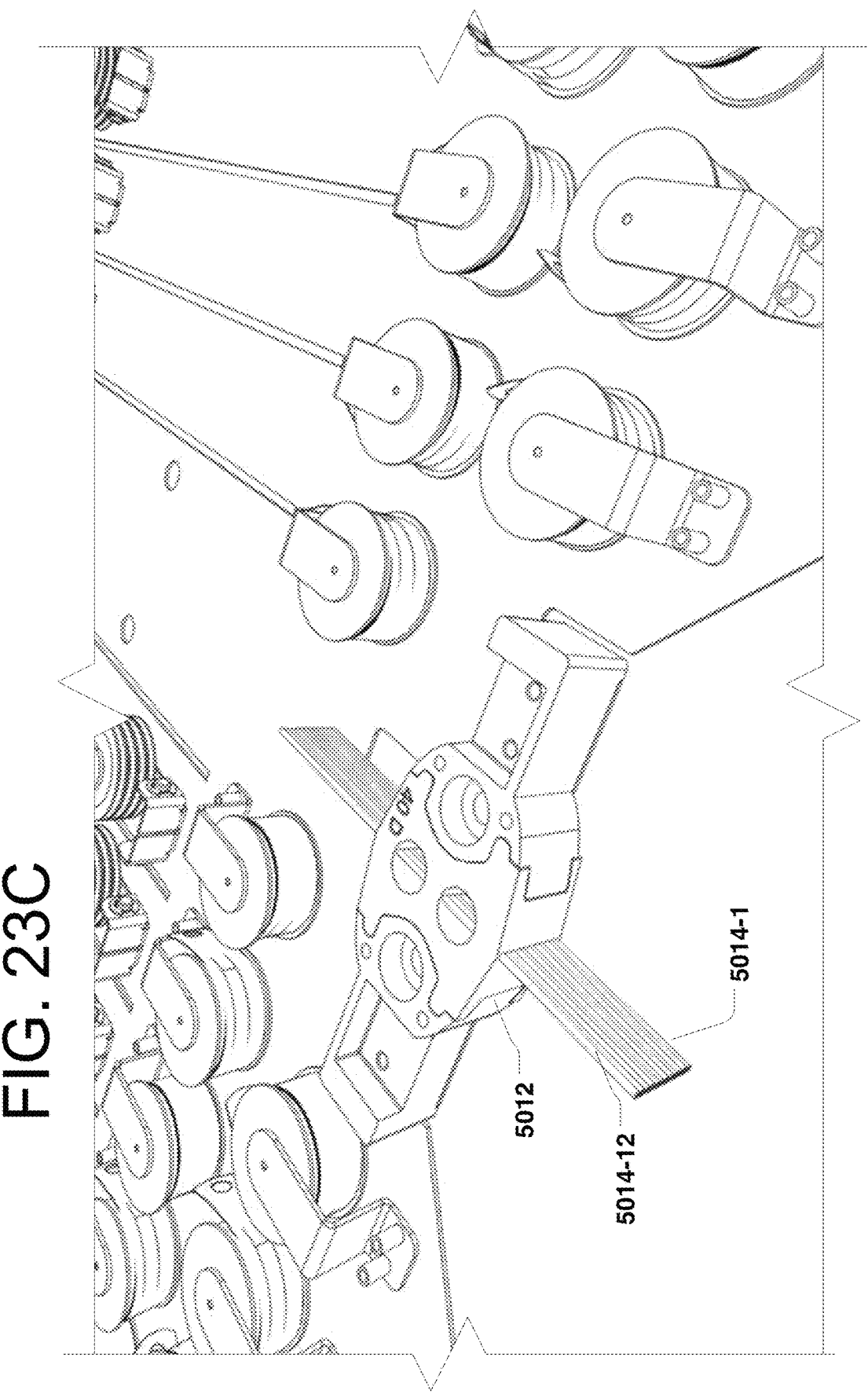

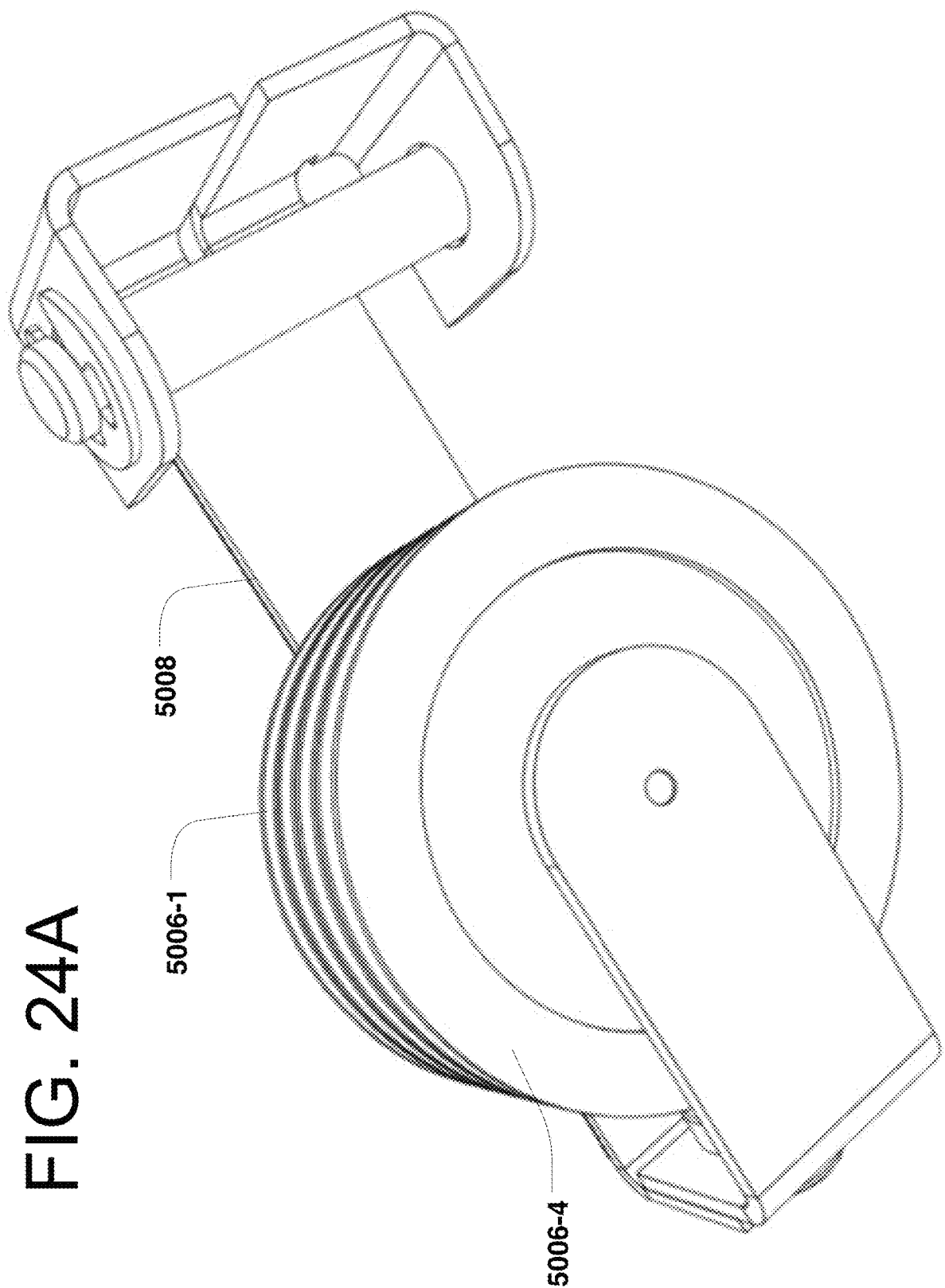

2602 EXTEND OPTICAL FIBER CABLES FROM THE ARRAYED SPOOLS BY ROBOT ACTUATOR

2604 SLIDE OPTICAL FIBER CABLES THROUGH ONE OF ARRAY OF FLEXIBLE GUIDES

2608 ROTATE ROLLER ATTACHED TO ROTARY ENCODER TO GENERATE ENCODER PULSES

2610 COUNT ENCODER PULSES

2612 PULL OPTICAL FIBER CABLE WRAPPED AROUND SPOOLS IN MULTIPLE CIRCUITS ON A SLED TRAVELING BETWEEN TWO ENDPOINTS

2614 ROTATE ARRAYED SPOOL(S) ON THE SLED WITH DIFFERENT ROTATION SPEEDS

2616 TRANSLATE SLED ALONG A STRAIGHT PATH DUE DYNAMIC EXTENSION FORCE OF OPTICAL FIBER CABLES WRAPPED AROUND SPOOLS OF SLED

2618 PULL SPRING(S) ATTACHED AT ONE END TO THE SLED FROM HOUSING TO IMPART RESTORING FORCE THAT MAINTAINS PRECISE TENSION

FIG. 26

FIBER OPTIC TENSIONING REEL SUB-SYSTEM IN ROBOTIC FIBER OPTIC CROSS-CONNECT SYSTEMS, SUB-SYSTEMS, DEVICES AND METHODS

REFERENCE TO RELATED APPLICATIONS

This patent claims the benefit of U.S. Provisional Patent Application 62/924,291, filed Oct. 22, 2019, U.S. Provisional Patent Application 62/898,353, filed Sep. 10, 2019, U.S. Provisional Patent Application 62/897,168, filed Sep. 6, 2019, and U.S. Provisional Patent Application 62/896,050, filed Sep. 5, 2019, and U.S. Provisional Patent Application 63/073,842, filed Sep. 2, 2020, the entire contents of each of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to systems, sub-systems, devices and methods to reconfigure a multiplicity of fiber optic cables within large scale robotic cross-connect systems providing low loss, software-defined fiber optic connections between a large number of pairs of ports. More particularly, this invention relates to elements of such cross-connect systems, including a high-reliability gripper for an actuated fiber optic connector system, a high performance, narrow form factor, telescopic robotic arm for an actuated fiber optic connector system, a fiber end face cleaning module having actuated, consistent fabric feed, and high-performance fiber optic tensioning reel elements and roller assemblies to manage excess lengths of fiber optic cables therein.

BACKGROUND

Large scale automated fiber optic cross-connect switches and software-defined patch-panels enable data centers and data networks with fiber optic interconnect fabrics to be fully automated, wherein the physical network topologies are software-defined or programmable, for improved efficiencies and cost savings.

Advances in the mathematics of topology and Knot and Braid Theory (U.S. Pat. Nos. 8,068,715, 8,463,091, 8,488,938, 8,805,155, 9,411,308; and 10,042,122 to Kewitsch—hereinafter the "Kewitsch KBS Patents") have solved the fiber entanglement challenge for dense collections of interconnect strands undergoing arbitrary and unlimited reconfigurations. Since this Knots, Braids and Strands (KBS) technology scales linearly in the number of interconnect strands, significant benefits over cross-bar switches (such as density and hardware simplicity) are realized. An exemplary high-reliability robot cross-connect system is described in Telescent's U.S. Pat. No. 10,345,526, the entire contents of which are hereby fully incorporated herein by reference for all purposes.

Systems featuring autonomous patch panel systems and implementing KBS algorithms in accordance, e.g., with the Kewitsch KBS Patents referenced above typically utilize a pick and place robotic actuation system with a gripper at the end of the robotic arm to grab, transport and clean a fiber optic connector and the self-tensioned, retractable fiber optic strand extending from a central backbone in the system. The robotic arm is of a narrow width and extended depth to allow it to descend into the dense fiber optic interconnect volume with no mechanical interference and no contact with surrounding fibers, yet still having sufficient rigidity to experience minimal deflection under transverse forces including magnetic repulsion and tension originating from the fiber being carried in the gripper therein.

As described in U.S. Pat. No. 10,345,526, a gripper at the end of a robot arm is able to unplug any fiber connector from among an array of fiber connectors inserted along connector rows, then transport it in a deterministic, optimal weaving pattern between the surrounding fiber connectors of the array upon manipulation by a robot arm assembly.

Physical contact connectors, by virtue of the optical contact between radiused ferrule end faces and wear on the connector and adapter housings, can begin to degrade after 1,000s of mating cycles. The durability can be substantially increased by, among other things, providing automatic fiber end-face cleaning capabilities. As described, e.g., in U.S. Pat. No. 8,068,715, the polished fiber end face of a connector may be cleaned prior to insertion by use of an integrated fiber end face cleaning module comprising a fiber cleaning fabric ribbon in spooled form and a drive unit which automatically moves the fabric relative to the fiber end face, thereby cleaning the fiber end faces in a non-wearing fashion.

In a particular embodiment, the fiber end-face of connectors may be automatically processed by the cleaning module during a latter phase in its movement to a destination port. This ensures repeated low-loss fiber optic connections free of contaminants on the delicate end face. The cleaning system may use consumable cleaning fabric on spools, pressurized air, ultrasound, and/or wet chemical means.

The fiber optic connector is mechanically and removably latched within the gripper which is rigidly attached to a telescoping robot arm or the like to position optical fiber connections. The cleaning module may be positioned adjacent the robot arm, just beneath the robot mounting platform near the top-most travel limit of the robot arm so that the arm can translate the end face of the optical fiber connector across and in contact with the cleaning fabric.

In an embodiment shown in U.S. Pat. No. 8,068,715, cleaning fabric is provided in a spooled strip form and retained on spool cartridges within a slide-in tray module located below the bottom-most row of the input terminal array. Dispensing of unused cleaning tape may be controlled by motor(s). The cleaning module may eject used cleaning cartridges and insert replacement tape. Cleaning of a connector may be achieved by contacting a fiber's end face to the tape (e.g., supported by elastomeric backing) and by relative movement of the end face relative to the tape.

Moreover, the excess lengths of the fiber optical cables moveable by the robot and gripper within the automated cross-connect system are automatically retained by an arrangement of spools for fiber retention and guides on a common substrate. While the tensioning spools/reels described in the Kewitsch patents operate as required, improvements are desired including those relating to improvements in compactness, hardware simplicity and operative reliability, singly or in combination.

Retraction of any particular flexible circuit may be accomplished by an internal power spring within each spool, which transfers torque to a take-up spool and maintains a required tension on the fiber optic circuit. In an alternate embodiment, rotation of the take-up spool may be achieved by a motorized means using a shared retraction motor drive unit and clutch mechanism to transfer a torque to each spool. Such tensioning reduces slack cable within the interconnect volume. In a further example, the automated cross-connect system uses an arrangement of spaced apart pulleys to retain a variable amount of optical fiber, separated into a set of fixed pulleys and a set of moveable spring loaded pulleys, with a variable length of optical fiber cable wound therebetween and with a tension that is a fraction of the spring force. This arrangement of pulleys enables a variable length of fiber to be stored and tensioned therein.

SUMMARY

The present invention is specified in the claims as well as in the below description. Preferred embodiments are particularly specified in the dependent claims and the description of various embodiments. Cross-connect systems are comprised of gripper, robot, cleaning cartridge and fiber tensioning and storage sub-systems as disclosed herein.

Gripper Sub-System

One general aspect includes in a fiber optic cross-connect in which a gripper selectively transports fiber optic connectors between different positions. The gripper also includes a stepper motor drive, responsive to command signals and mounted on a support structure. The gripper also includes a dual drum connected to the stepper motor drive and rotatable about a first axis, said dual drum may include a top drum portion and a bottom drum portion. The gripper also includes a plurality of bearing shafts slidably engaged in spaced apart relation in the support structure along axes perpendicular to the first axis. The gripper also includes a pair of spaced apart terminal blocks fixedly mounted on opposite ends of the bearing shafts. The gripper also includes a length of drive string connected to the dual drum. The gripper also includes where a first portion of said drive string is positioned to wind about the bottom drum portion when the drum is rotated in first direction, and where an end of said first portion of said drive string is connected to a first of said terminal blocks. The gripper also includes where a second portion of said drive string is positioned to unwind about the top drum portion when the drum is rotated in a first direction, and where an end of said second portion of said drive string is connected to a spring attached to a second of said terminal blocks. The gripper also includes where rotation of the drum in said first direction causes the pair of spaced apart terminal blocks to move together.

Implementations may include one or more of the following features, alone and/or in combination(s):
  The gripper assembly where the drive string has a diameter of about 0.73 mm.
  The gripper assembly where the drive string may include a multifilament yarn spun liquid crystal polymer.
  The gripper assembly where the drive string is braided.
  The gripper assembly where the drive string has at least 57 kg (125-pound) tensile strength.
  The gripper assembly where the drum has rounded flanges.
  The gripper assembly where the spring enables about 6 mm of compression.
  The gripper assembly where the drum has a mandrel and where the drive string passes through a hole in the mandrel to go from the top drum portion to the bottom drum portion.
  The gripper assembly where a portion of the drive string is bonded to the mandrel.

Another general aspect includes an electrically actuated fiber optic connector gripper device that attaches to a robot arm and generates insertion forces sufficient to transfer a first connector with a first ferrule in or out of a union coupler receptacle with potentially an opposing connector with a ferrule. The electrically actuated fiber optic connector gripper device also includes a central member attachable to the robot arm. The device also includes a stepper motor affixed to central member. The device also includes a gearbox with a rotatable shaft coupled to the stepper motor. The device also includes a two-section drum, with a clockwise spool section and an adjacent counterclockwise spool section, having a common rotation axis coupled to the shaft of the gearbox. The device also includes a string attached to the drum and wound in opposite sense onto the clockwise spool section and the counterclockwise spool section. The device also includes where the string exits the spool sections in substantially anti-parallel directions perpendicular to rotation access of spool, the string affixed at a first end to a flexible spring member and affixed at a second end to a fixed clamp, where the first end and the second end are part of a connector carrier that slides relative to central member and retains the first connector, where the connector carrier moves in a first direction when a length of string winds onto the clockwise spool section, and a substantially identical length of string simultaneously unwinds from the counterclockwise spool section, and moves in the opposite direction when the length of string unwinds from the clockwise spool and a substantially identical length of string simultaneously winds onto the counterclockwise spool.

Implementations may include one or more of the following features, alone and/or in combination(s):
  The device where the gripper device generates insertion forces greater than 5 N.
  The string may include a high strength, small diameter, flexible string.
  The device in which the central member and the connector carrier are substantially planar, rigid, and parallel to one another.
  Electrical signals that pass between the central member and the carrier are transferred through a flexible multi-conductor element.
  The carrier includes a solenoid constructed and adapted to lock the first connector into the carrier and to unlock the first connector from the carrier when electrically energized.

Another general aspect includes a gripper device with first and second translating members for plugging and unplugging spring-loaded ferrules of fiber optic connectors from mating connector receptacles that require a torque impulse when plugging and unplugging the connectors. The gripper device also includes an actuator attached to first member. The device also includes a rotating shaft exiting the actuator. The device also includes a gearbox with a gearbox shaft attached to the shaft, the gearbox increasing the torque output by the actuator. The device also includes a double drum for winding and unwinding a flexible, low stretch drive string under low static tension. The device also includes the drive string is connected to a compliant element, and where the torque impulse imposed on gearbox when translating a second member is reduced by the compliant spring.

Implementations may include one or more of the following features, alone and/or in combination(s):
  The device where the first and second translating members translate substantially parallel to one another and are connected with a pair of spaced apart linear bearings.

The second member includes one or more pulleys around which the drive string is wrapped.

The opposite ends of drive string are attached to the first member.

The opposite ends of drive string are attached to the second member and the compliant element is a spring.

Another general aspect includes an electro-mechanical interface for a fiber connector gripper at the end of a robot arm. The electro-mechanical interface also includes an electrical connection for power, motor and sensor lines between the robot arm and the gripper, between a pair of opposing gripper and arm circuit board assemblies, including an array of pins on gripper circuit board and pin receptacles on arm circuit board. The electro-mechanical interface also includes a mechanical connection in which the gripper has a pair of guide receptacles and the robot arm has a pair of posts, where the pair of guide receptacles are plugged onto the pair of posts, and where the posts and receptacles are locked into one another with spring loaded detent that engages a pocket on wall of posts. The electro-mechanical interface also includes an actuable locking clip to retain detent into depression and maintain a rigid connection between gripper and robot arm, even during motion and vibration.

Another general aspect includes a method of unplugging a fiber optic connector within a robotic fiber cross-connect system with a gripper including sensing elements at the end of a robot arm extendable along an extension axis. The method also includes translating a first connector row of said stacked array of connector rows so that said first connector row is centrally offset from other connector rows of said stacked array of connector rows. The method also includes translating the gripper at the end of the robot arm in a direction normal to the connector row substrate, to pass between connector track extensions onto a selected, programmably centered connector row. The method also includes monitoring the sensing element of gripper. The method also includes based on said monitoring, detecting that the gripper is in close engagement with a target connector track element of the first connector row. The method also includes stopping the translation of gripper upon the change in state. The method also includes translating the gripper parallel to connector track element in a direction to engage the fiber optic connector. The method also includes stopping the translation when the gripper sensing elements detect that the fiber optic connector is engaged within the gripper. The method also includes locking the fiber optic connector within the gripper with a solenoid. The method also includes translating the gripper parallel to connector track element and opposite the direction to unplug the fiber optic connector. The method also includes stopping the translation when the gripper sensing elements detect that the fiber optic connector is sufficiently withdrawn to be clear of the connector receptacles. The method also includes translating the gripper at the end of the robot arm in a direction normal to the connector row substrate, to pass between connector track extensions.

Implementations may include one or more of the following features, alone and/or in combination(s):

The method where the translating the gripper parallel to common plane to plug in fiber is over a distance of about 12 mm.

The method where the gripper sensing elements are photo-interrupter integrated circuits.

The method where the translating the gripper includes energizing a stepper motor with a series of electrical pulses.

The method where the translating the connector row corresponds to a linear distance of 10 to 30 mm.

Another general aspect includes a method of plugging in a fiber optic connector within a robotic fiber cross-connect system with a gripper including sensing elements at the end of a robot arm extendable along an extension axis. The method also includes translating one connector row so it centrally offset from others. The method also includes translating the gripper with the fiber optic connector therein at the end of the robot arm in a direction normal to the common plane, to pass between connector track extensions onto a selected, programmably centered connector row. The method also includes monitoring the sensing element of gripper. The method also includes detecting a change in state of a sensing element, which indicates that the gripper is in close engagement with a target connector track element of the offset connector row. The method also includes stopping the translation of gripper upon the change in state. The method also includes translating the gripper parallel to common plane in a direction to plug in the fiber optic connector into connector receptacle. The method also includes stopping the translation when the gripper sensing elements detect that the fiber optic connector is plugged into the connector receptacle. The method also includes unlocking the fiber optic connector within the gripper by activating a solenoid. The method also includes translating the gripper parallel to connector track element opposite the direction to plug-in the fiber optic connector. The method also includes stopping the translation when the gripper sensing elements detect that gripper is sufficiently withdrawn to be clear of the fiber optic connector. The method also includes translating the gripper at the end of the robot arm in a direction normal to the connector row, to pass between connector track extensions.

Implementations may include one or more of the following features, alone and/or in combination(s):

The method where the translating the gripper parallel to common plane to plug in fiber is over a distance of about 12 mm.

The method where the gripper sensing elements are photo-interrupter integrated circuits.

The method where the gripper includes energizing a stepper motor with a series of electrical pulses.

The method where the translating the connector row corresponds to a linear distance of 10 to 30 mm.

Another general aspect includes an electro-mechanical interface for a fiber connector gripper at the end of a robot arm to engage any of a multiplicity of fiber optic connector tracks. The electro-mechanical interface also includes a multiplicity of electrical connections for power, motor and sensor lines between the robot arm and the gripper, between a pair of opposing gripper and arm circuit board assemblies, including an array of pins on a gripper circuit board and pin receptacles on an arm circuit board. The electro-mechanical interface also includes a mechanical connection in which the gripper detachably connects to the robot arm. The electro-mechanical interface also includes where the connection exhibits a pre-determined level of mechanical compliance to allow the gripper to accommodate a slight misalignment of the fiber optic connector track.

Another general aspect includes a gripper device with first and second translating members for plugging and unplugging spring-loaded ferrules of fiber optic connectors from mating connector receptacles. The gripper device also includes an actuator attached to first member. The device also includes a rotating shaft exiting the actuator. The device also includes a gearbox with a gearbox shaft attached to the shaft, the gearbox increasing the torque output by the actuator. The device also includes a double drum for winding and unwinding a flexible, low stretch drive string under low static tension. The device also includes the second translating member for engaging the fiber optic connector, the second member including connector engagement elements that include connector scooping ramp features and roller elements where the connector experiences low frictional forces when gripper slides over connector during connector engagement or disengagement, where the drive string transfers forces from the first translating member to the second translating member.

Implementations may include one or more of the following features, alone and/or in combination(s):

The gripper device in which the roller elements may include 1 mm diameter rollers with a set of ball bearing attached at both ends of the rollers.

The gripper device where the actuator is a miniature dc stepper motor with a gearbox.

The gripper device where the flexible, low stretch drive string is between 0.5 and 1 mm in diameter.

The gripper device where the flexible string is braided to minimize fraying.

Below is a list of gripper embodiments. Those will be indicated with the letters "G." Whenever such embodiments are referred to, they will be done by referring to "G" embodiments.

G1. In a fiber optic cross-connect in which a robot selectively transports fiber optic connectors between different positions, a fiber optic connector gripper assembly, connectable to said robot, the gripper assembly comprising: a stepper motor drive, responsive to command signals and mounted on a support structure; a dual drum connected to the stepper motor drive and rotatable about a first axis, said dual drum comprising a top drum portion and a bottom drum portion; a plurality of bearing shafts slidably engaged in spaced apart relation in the support structure along axes perpendicular to the first axis; a pair of spaced apart terminal blocks fixedly mounted on opposite ends of the bearing shafts; and a length of drive string connected to the dual drum, wherein a first portion of said drive string is positioned to wind about the bottom drum portion when the drum is rotated in first direction, and wherein an end of said first portion of said drive string is connected to a first of said terminal blocks, and wherein a second portion of said drive string is positioned to unwind about the top drum portion when the drum is rotated in a first direction, and wherein an end of said second portion of said drive string is connected to a spring attached to a second of said terminal blocks, and wherein rotation of the drum in said first direction causes the pair of spaced apart terminal blocks to move together.

G2. The gripper assembly of embodiment(s) G1, wherein the drive string has a diameter of about 0.73 mm.

G3. The gripper assembly of any of the preceding embodiment(s), wherein the drive string comprises a multifilament yarn spun liquid crystal polymer.

G4. The gripper assembly of any of the preceding embodiment(s), wherein the drive string is braided.

G5. The gripper assembly of any of the preceding embodiment(s), wherein the drive string has at least 57 kg (125-pound) tensile strength.

G6. The gripper assembly of any of the preceding embodiment(s), wherein the drum has rounded flanges.

G7. The gripper assembly of any of the preceding embodiment(s), wherein the spring enables about 6 mm of compression.

G8. The gripper assembly of any of the preceding embodiment(s), wherein the drum has a mandrel and wherein the drive string passes through a hole in the mandrel to go from the top drum portion to the bottom drum portion.

G9. The gripper assembly of embodiment(s) G8, wherein a portion of the drive string is bonded to the mandrel.

G10. An electrically actuated fiber optic connector gripper device that attaches to a robot arm and generates insertion forces sufficient to transfer a first connector with a first ferrule in or out of a union coupler receptacle with potentially an opposing, spring loaded ferrule therein, comprised of: a central member attachable to the robot arm; a stepper motor affixed to central member; a gearbox with a rotatable shaft coupled to the stepper motor; a two-section drum, with a clockwise spool section and an adjacent counterclockwise spool section, having a common rotation axis coupled to the shaft of the gearbox; and a string attached to the drum and wound in opposite sense onto the clockwise spool section and the counterclockwise spool section, wherein the string exits the spool sections in substantially anti-parallel directions perpendicular to rotation access of spool, the string affixed at a first end to a flexible spring member and affixed at a second end to a fixed clamp, wherein the first end and the second end are part of a connector carrier that slides relative to central member and retains the first connector, wherein the connector carrier moves in a first direction when a length of string winds onto the clockwise spool section, and a substantially identical length of string simultaneously unwinds from the counterclockwise spool section, and moves in the opposite direction when the length of string unwinds from the clockwise spool and a substantially identical length of string simultaneously winds onto the counterclockwise spool.

G11. The device of embodiment(s) G10 wherein the gripper device generates insertion forces greater than 5 N.

G12. The device of any of the preceding embodiment(s) G10-G11, wherein the string comprises a high strength, small diameter, flexible string.

G13. The device of any of the preceding embodiment(s) G10-G12 in which the central member and the connector carrier are substantially planar, rigid, and parallel to one another.

G14. The device of any of the preceding embodiment(s) G10-G13, wherein electrical signals that pass between the central member and the carrier are transferred through a flexible multi-conductor element.

G15. The device of any of the preceding embodiment(s) G10-G14, wherein the carrier includes a solenoid constructed and adapted to lock the first connector into the carrier and to unlock the first connector from the carrier when electrically energized.

G16. A gripper device with first and second translating members for plugging and unplugging spring-loaded ferrules of fiber optic connectors from mating connector receptacles that require a torque impulse when plugging and unplugging the connectors, the device comprising: an actuator attached to first member; a rotating shaft exiting the actuator; a gearbox with a gearbox shaft attached to the shaft, the gearbox increasing the torque output by the actuator; and a double drum for winding and unwinding a flexible, low stretch drive string under low static tension, wherein the drive string is connected to a compliant element, and wherein the torque impulse imposed on gearbox when translating a second member is reduced by the compliant spring.

G17. The device of embodiment(s) G16, wherein the first and second translating members translate substantially parallel to one another and are connected with a pair of spaced apart linear bearings.

G18. The device of any of the preceding embodiment(s) G16-G17, wherein the second member includes one or more pulleys around which the drive string is wrapped.

G19. The device of any of the preceding embodiment(s) G16-G18, wherein the opposite ends of drive string are attached to the first member.

G20. The device of any of the preceding embodiment(s) G16-G19, wherein the opposite ends of drive string are attached to the second member and the compliant element is a spring.

G21. An electro-mechanical interface for a fiber connector gripper at the end of a robot arm, the interface comprising: an electrical connection for power, motor and sensor lines between the robot arm and the gripper, between a pair of opposing gripper and arm circuit board assemblies, including an array of pins on gripper circuit board and pin receptacles on arm circuit board; a mechanical connection in which the gripper has a pair of guide receptacles and the robot arm has a pair of posts, wherein the pair of guide receptacles are plugged onto the pair of posts, and wherein the posts and receptacles are locked into one another with spring loaded detent that engages a pocket on wall of posts; and an actuable locking clip to retain detent into depression and maintain a rigid connection between gripper and robot arm, even during motion and vibration.

G22. A method of unplugging a fiber optic connector within a robotic fiber cross-connect system with a gripper including sensing elements at the end of a robot arm extendable along an extension axis, and with a stacked array of connector rows that translate normal to the extension axis, each connector row comprised of connector track extensions with connector receptacles and a substrate, the method comprising: translating a first connector row of said stacked array of connector rows so that said first connector row is centrally offset from other connector rows of said stacked array of connector rows; translating the gripper at the end of the robot arm in a direction normal to the connector row substrate, to pass between connector track extensions onto a selected, programmably centered connector row; monitoring the sensing element of gripper; based on said monitoring, detecting that the gripper is in close engagement with a target connector track element of the first connector row; stopping the translation of gripper upon the change in state; translating the gripper parallel to connector track element in a direction to engage the fiber optic connector; stopping the translation when the gripper sensing elements detect that the fiber optic connector is engaged within the gripper; locking the fiber optic connector within the gripper with a solenoid; translating the gripper parallel to connector track element and opposite the direction to unplug the fiber optic connector; stopping the translation when the gripper sensing elements detect that the fiber optic connector is sufficiently withdrawn to be clear of the connector receptacles; and translating the gripper at the end of the robot arm in a direction normal to the connector row substrate, to pass between connector track extensions.

G23. A method in accordance with embodiment(s) G22, wherein the translating the gripper parallel to common plane to plug in fiber is over a distance of about 12 mm.

G24. A method in accordance with embodiment(s) G22 or G23, wherein the gripper sensing elements are photo-interrupter integrated circuits.

G25. A method in accordance with any of embodiment(s) G22-G24 wherein the step of translating the gripper includes energizing a stepper motor with a series of electrical pulses.

G26. A method in accordance with embodiment(s) any of embodiment(s) G22-G25 wherein the step of translating the connector row corresponds to a linear distance of 10 to 30 mm.

G27. A method of plugging in a fiber optic connector within a robotic fiber cross-connect system with a gripper including sensing elements at the end of a robot arm extendable along an extension axis, and with a stacked array of connector rows that translate normal to the extension axis, each connector row comprised of connector track extensions with connector receptacles in a common plane, the method comprising: translating one connector row so it centrally offset from others, translating the gripper with the fiber optic connector therein at the end of the robot arm in a direction normal to the common plane, to pass between connector track extensions onto a selected, programmably centered connector row; monitoring the sensing element of gripper; detecting a change in state of a sensing element, which indicates that the gripper is in close engagement with a target connector track element of the offset connector row; stopping the translation of gripper upon the change in state; translating the gripper parallel to common plane in a direction to plug in the fiber optic connector into connector receptacle; stopping the translation when the gripper sensing elements detect that the fiber optic connector is plugged into the connector receptacle; unlocking the fiber optic connector within the gripper by activating a solenoid; translating the gripper parallel to connector track element opposite the direction to plug-in the fiber optic connector; stopping the translation when the gripper sensing elements detect that gripper is sufficiently withdrawn to be clear of the fiber optic connector; and translating the gripper at the end of the robot arm in a direction normal to the connector row, to pass between connector track extensions.

G28. A method in accordance with embodiment(s) G27, wherein the step of translating the gripper parallel to common plane to plug in fiber is over a distance of about 12 mm.

G29. A method in accordance with embodiment(s) G27 or G28, wherein the gripper sensing elements are photo-interrupter integrated circuits.

G30. A method in accordance with any of embodiment(s) G27-G29 wherein the step of translating the gripper includes energizing a stepper motor with a series of electrical pulses.

G31. A method in accordance with any of embodiment(s) G27-G30 wherein the step of translating the connector row corresponds to a linear distance of 10 to 30 mm.

G32. An electro-mechanical interface for a fiber connector gripper at the end of a robot arm to engage any of a multiplicity of fiber optic connector tracks, the interface comprising: a multiplicity of electrical connections for power, motor and sensor lines between the robot arm and the gripper, between a pair of opposing gripper and arm circuit board assemblies, including an array of pins on a gripper circuit board and pin receptacles on an arm circuit board; and a mechanical connection in which the gripper detachably connects to the robot arm, wherein the connection exhibits a predetermined level of mechanical compliance to allow the gripper to accommodate a slight misalignment of the fiber optic connector track.

G33. A gripper device with first and second translating members for plugging and unplugging spring-loaded ferrules of fiber optic connectors from mating connector receptacles, that requires a torque impulse when plugging and unplugging the connectors using a drive train configured to minimize wear and maximize lifetime and torque efficiency, the gripper device comprising: an actuator attached to first member; a rotating shaft exiting the actuator; a gearbox with a gearbox shaft attached to the shaft, the gearbox increasing the torque output by the actuator; and a double drum for winding and unwinding a flexible, low stretch drive string under low static tension; and the second translating member for engaging the fiber optic connector, the second member including connector engagement elements that include connector scooping ramp features and roller elements wherein the connector experiences low frictional forces when gripper slides over connector during connector engagement or disengagement, wherein the drive string transfers forces from the first translating member to the second translating member.

G34. A gripper device in accordance with embodiment(s) G33, in which the roller elements comprise 1 mm diameter rollers with a set of ball bearing attached at both ends of the rollers.

G35. A gripper device in accordance with embodiment(s) G33 or G34, wherein the actuator is a miniature dc stepper motor with a gearbox.

G36. A gripper device in accordance with any of embodiment(s) G33-G35, wherein the flexible, low stretch drive string is between 0.5 and 1 mm in diameter and is braided to minimize fraying.

Robot Arm Sub-System

One general aspect includes a robotic arm assembly. The robotic arm assembly also includes an inner stage removeable coupled to fiber optic connector. The assembly also includes a middle stage with the inner stage slidable in said middle stage. The assembly also includes a rolling element attached to end of middle stage. The assembly also includes an outer stage with the middle stage slidable in said outer stage. The assembly also includes a flexible member connecting the inner stage, wrapping around the rolling element of middle stage, and connected to the outer stage. The assembly also includes a motor drive that couples translation motion to the middle stage. The assembly also includes a first set of roller assemblies between inner and middle stages. The assembly also includes a second set of roller assemblies between the middle and outer stages.

Implementations may include one or more of the following features, alone and/or in combination(s):

The robotic arm assembly where the first plurality of roller assemblies includes hardened and ground rollers, and where the middle stage is slidable with low friction within the outer stage.

The robotic arm assembly where the lubrication element and the spring are held in place against the middle stage by the outer stage.

The robotic arm assembly where the lubrication element may include an oil-impregnated plastic element.

The robotic arm assembly where the middle stage may include case-hardened, non-magnetic stainless steel.

The robotic arm assembly where the middle stage is about 12.5 cm wide, about 50 cm deep, and about 75 cm long.

The robotic arm assembly where the middle stage has a minimum wall thickness of about 1 to 2 mm. The robotic arm assembly where a preload force on the first plurality of roller assemblies is about 10-20 N.

One general aspect includes a telescopic robot arm. The telescopic robot arm includes an outer housing with internal facing, opposing pairs of spring loaded and fixed rollers. The arm also includes an intermediate, straight hollow member that is guided by internal facing rollers within the outer housing to follow a first straight path. The arm also includes an inner, straight solid member with opposing pairs of spring loaded and fixed external facing rollers. The arm also includes where the outside of the intermediate member is guided by the internal facing rollers and the solid member is guided within the intermediate member by the external facing rollers to follow a second path parallel to first path. The arm also includes where the solid member is translated by a first flexible, elongated, low creep element that is attached to the solid member, follows a 180 degree path over a roller affixed to a proximal end of intermediate member, and is affixed to a point on the outer housing.

Implementations may include one or more of the following features, alone and/or in combination(s):

The telescopic robot arm where the telescopic robot arm can be removed and replaced while preserving alignment and with features to mount a gripper at a distal end of the inner member of the robot arm.

The telescopic robot arm where tension of the first and second flexible elements is maintained.

The telescopic robot arm where the extension and retraction of the telescopic robot arm is driven by a length of timing belt connected at fixed proximal and distal ends of the intermediate, hollow member, where the timing belt wraps around a drive pulley that is coupled to a rotating motor.

The telescopic robot arm where extension and retraction of the telescopic robot arm is driven by a motorized lead screw or ball screw with a translating nut connected at fixed proximal end of the intermediate, hollow member.

The telescopic robot arm where the direction of travel of the telescopic arm is normal to force of gravity and additionally may include a second flexible element to extend and retract the solid member upon translation of the intermediate hollow member.

The telescopic robot arm with lubrication elements attached to the outer housing and in contact with the outer surfaces of the intermediate hollow member in a vicinity of the internal facing, opposing pairs of rollers.

The telescopic robot arm where the direction of travel of the telescopic arm is parallel to force of gravity where a weight of the solid member results in it extending and a motor is used to counteract gravity to retract it.

One general aspect includes a telescopic robot module for automating a fiber optic cross-connect system with a narrow, extended reach telescopic arm having a telescopic arm extension direction, comprised of outer, middle and inner stages that translate relative to one another along a common axis, flexibly coupled wherein a multiplicity of electrical signals and mechanical motion is transferred from outer stage to inner stage through a fixed length, conductive first flexible element, a second flexible element connected at opposite ends to outer and inner stages and passing through pulley on first end of the middle stage, a third flexible element connected at opposite ends to outer and inner stage and passing through pulley on second end of the middle stage.

Implementations may include one or more of the following features, alone and/or in combination(s):

The telescopic robot module where an actuator with housing fixed to outer stage and moveable end coupled to middle stage to impart motion to the middle stage and inner stage along the direction parallel to telescopic arm extension direction.

The telescopic robot module where the inner stage moves twice as far as the middle stage.

The telescopic robot module where the outer stage is attached to a moving platform that translates the telescope arm in a direction normal to the telescopic arm extension direction.

One general aspect includes a telescopic, robot arm device that extends to a length. The telescopic arm also includes an outer housing with internal facing, opposing pairs of spring loaded and fixed rollers. The telescopic arm also includes an intermediate, straight hollow member that is guided by internal facing rollers within the outer housing to follow a first straight path. The telescopic arm also includes an inner, straight solid member with opposing pairs of spring loaded and fixed external facing rollers. The telescopic arm also includes where the outside of intermediate member is guided by the internal facing rollers and the solid member is guided within the intermediate member by the external facing rollers to follow a second path parallel to first path. The telescopic arm also includes where a first contact pressure of the internal facing rollers is at least three times a second contact pressure of the external facing rollers, where compliance of the arm is substantially constant over its length of travel.

Implementations may include one or more of the following features, alone and/or in combination(s):

The telescopic, robot arm device including spring loaded lubrication blocks that contact outer surfaces of the intermediate, straight hollow member in a vicinity of internal facing rollers.

The telescopic, robot arm device where outer and inner surfaces of the intermediate, straight hollow member are hardened stainless steel.

Below is a list of robotic arm and related embodiments. Those will be indicated with the letters "RA." Whenever such embodiments are referred to, they will be done by referring to "RA" embodiments.

RA37. A robotic arm assembly, in a fiber optic cross-connect in which a robot selectively transports fiber optic connectors between distinct positions, the robotic arm assembly comprising: an inner stage removeable coupled to fiber optic connector; a middle stage with the inner stage slidable in said middle stage; a rolling element attached to end of middle stage; an outer stage with the middle stage slidable in said outer stage; a flexible member connecting the inner stage, wrapping around the rolling element of middle stage and connected to the outer stage; a motor drive that couples translation motion to the middle stage; a first set of roller assemblies between inner and middle stages; and a second set of roller assemblies between the middle and outer stages.

RA38. The robotic arm assembly of embodiment(s) RA37, wherein the first plurality of roller assemblies includes hardened and ground rollers, and wherein the middle stage is slidable with low friction within the outer stage.

RA39. The robotic arm assembly of embodiment(s) RA37 or RA38, further including a spring-loaded roller lubrication mechanism comprising:
one or more lubrication elements; and a spring positioned behind each lubrication element, wherein the lubrication element and the spring are held in place against the middle stage by the outer stage.

RA40. The robotic arm assembly of embodiment(s) RA39, wherein the lubrication element comprises an oil-impregnated plastic element.

RA41. The robotic arm assembly of any of the previous embodiment(s) RA37-RA40, wherein the middle stage comprises case-hardened, non-magnetic stainless steel.

RA42. The robotic arm assembly of any of the previous embodiment(s) RA37-RA41, wherein the middle stage is about 12.5 cm wide, about 50 cm deep, and about 75 cm long.

RA43. The robotic arm assembly of any of the previous embodiment(s) RA37-RA42, wherein the middle stage has a minimum wall thickness of about 1 to 2 mm.

RA44. The robotic arm assembly of any of the previous embodiment(s) RA37-RA43, wherein a preload force on the first plurality of roller assemblies is about 10-20 N.

RA45. A telescopic robot arm comprising: an outer housing with internal facing, opposing pairs of spring loaded and fixed rollers; and an intermediate, straight hollow member that is guided by internal facing rollers within the outer housing to follow a first straight path; and an inner, straight solid member with opposing pairs of spring loaded and fixed external facing rollers, wherein the outside of the intermediate member is guided by the internal facing rollers and the solid member is guided within the intermediate member by the external facing rollers to follow a second path parallel to first path, and wherein the solid member is translated by a first flexible, elongated, low creep element that is attached to the solid member, follows a 180 degree path over a roller affixed to a proximal end of intermediate member, and is affixed to a point on the outer housing.

RA46. The telescopic robot arm of embodiment(s) RA45, wherein the telescopic robot arm can be removed and replaced while preserving alignment and with features to mount a gripper at a distal end of the inner member of the robot arm.

RA47. A telescopic robot arm in accordance with embodiment(s) RA45 or RA46 above, with a second flexible, elongated, low creep element that is attached to the proximal end of the solid member, extends away from the solid member in a direction parallel but opposite to the first flexible element, wrapped to and around a freely rotating pulley at a distal end of intermediate member, and affixed to a point on the outer housing wherein tension of the first and second flexible elements is maintained.

RA48. The telescopic robot arm in accordance with any of the previous embodiment(s) RA45-RA47 above, wherein the extension and retraction of the telescopic robot arm is driven by a length of timing belt connected at fixed proximal and distal ends of the intermediate, hollow member, wherein the timing belt wraps around a drive pulley that is coupled to a rotating motor.

RA49. The telescopic robot arm in accordance with any of the previous embodiment(s) RA45-RA48 above, wherein the extension and retraction of the telescopic robot arm is driven by a motorized lead screw or ball screw with a translating nut connected at fixed proximal end of the intermediate, hollow member.

RA50. The telescopic robot arm in accordance with any of the previous embodiment(s) RA45-RA49 above, with lubrication elements attached to the outer housing and in contact with the outer surfaces of the intermediate hollow member in a vicinity of the internal facing, opposing pairs of rollers.

RA51. The telescopic robot arm in accordance with any of the previous embodiment(s) RA45-RA50 above, wherein the direction of travel of the telescopic arm is parallel to force of gravity wherein a weight of the solid member results in it extending and a motor is used to counteract gravity to retract it.

RA52. The telescopic robot arm in accordance with any of the previous embodiment(s) RA45-RA51 above, wherein the direction of travel of the telescopic arm is normal to force of gravity and additionally comprising a second flexible element to extend and retract the solid member upon translation of the intermediate hollow member.

RA53. A telescopic robot module for automating a fiber optic cross-connect system with a narrow, extended reach telescopic arm having a telescopic arm extension direction, comprised of outer, middle and inner stages that translate relative to one another along a common axis, flexibly coupled wherein a multiplicity of electrical signals and mechanical motion is transferred from outer stage to inner stage through a fixed length, conductive first flexible element, a second flexible element connected at opposite ends to outer and inner stages and passing through pulley on first end of the middle stage, a third flexible element connected at opposite ends to outer and inner stage and passing through pulley on second end of the middle stage.

RA54. A telescopic robot module in accordance with embodiment(s) RA53, wherein an actuator with housing fixed to outer stage and moveable end coupled to middle stage to impart motion to the middle stage and inner stage along the direction parallel to telescopic arm extension direction.

RA55. A telescopic robot module in accordance with embodiment(s) RA53 or RA54, wherein the inner stage moves twice as far as the middle stage.

RA56. A telescopic robot module in accordance with any of the previous embodiment(s) RA53-RA55, wherein the outer stage is attached to a moving platform that translates the telescope arm in a direction normal to the telescopic arm extension direction.

RA57. A telescopic, robot arm device that extends to a length, the robot arm comprising: an outer housing with internal facing, opposing pairs of spring loaded and fixed rollers; an intermediate, straight hollow member that is guided by internal facing rollers within the outer housing to follow a first straight path; an inner, straight solid member with opposing pairs of spring loaded and fixed external facing rollers; and wherein the outside of intermediate member is guided by the internal facing rollers and the solid member is guided within the intermediate member by the external facing rollers to follow a second path parallel to first path, wherein a first contact pressure of the internal facing rollers is at least three times a second contact pressure of the external facing rollers, wherein compliance of the arm is substantially constant over its length of travel.

RA58. A telescopic, robot arm device in accordance with embodiment(s) RA57, including spring loaded lubrication blocks that contact outer surfaces of the intermediate, straight hollow member in a vicinity of internal facing rollers.

RA59. A telescopic, robot arm device in accordance with embodiment(s) RA57 or RA58, wherein outer and inner surfaces of the intermediate, straight hollow member are hardened stainless steel.

Fiber Optic Tensioning Reel Sub-System

One general aspect includes a tensioning spool apparatus for storage of optical fiber exhibiting reduced variation of tension during a retraction cycle versus an extension cycle of fiber over a predefined range of spool rotation cycles. The tensioning spool apparatus also includes (a) a first spiral element may include a linear spring, a length of optical fiber characterized by an insertion loss dependent on its bend radius along a length of element, and an outer sheath with the linear spring and the fiber therein, where the first spiral element is sufficiently flexible to reduce adjacent turn interaction force and frictional binding under bending, while being at the same time sufficiently stiff to prevent buckling of spiral during unwinding and ensure that a bend radius of the optical fiber is at all locations and for all configurations greater than a minimum bend radius specified for the optical fiber. The apparatus also includes (b) a second spiral element may include a flat coiled metallic spring, where the second spiral element produces greater average torque relative to an average torque produced by the first spiral element. The apparatus also includes (c) a flat, non-rotating substrate in a first plane. The apparatus also includes the first spiral element in a second plane. The apparatus also includes the second spiral element in a third plane. The apparatus also includes the first, second and third planes are parallel, and the second plane lies between the first and third planes, and where. The apparatus also includes the average torque transferred to the tensioning spool to drive rotation is equal to a sum of the average torque of the first and second spiral elements, the variation of the tension resulting primarily from friction between adjacent turns of the first spiral element, an outer surface of the sheath having a low coefficient of friction with itself to minimize the variation in tension.

Implementations may include one or more of the following features, alone and/or in combination(s):

An apparatus where the tension varies between 10 gm-f and 80 gm-f.

An apparatus where the low coefficient of friction is nominally less than or equal to 0.25.

An apparatus where the minimum bend radius is approximately 5 mm.

One general aspect includes a tensioning reel system optical fiber may include of two helical springs comprising a first spring and a second spring, rotating about a common axis and producing an additive torque about a common axis, the first spring fixed to a central mandrel and the second spring fixed to an outer ring, wherein the first spring produces greater torque than the second spring, the second spring is a multi-component assembly including an optical fiber, a straight wire and an outer sheath, and the first spring does not include an optical fiber.

Implementations may include one or more of the following features, alone and/or in combination(s):
- A tensioning reel system where the helical springs rotate by identical angles about a common axis as the tensioning reel rotates.
- A tensioning reel system where the helical springs both unwind or wind about a common axis as the tensioning reel rotates.
- A tensioning reel system where the helical springs both wind to a smaller average diameter as the optical fiber is extended from the reel system.
- A tensioning reel system where the system may include a plurality of reel assemblies mounted on a sheet metal tray, each of the plurality of reel assemblies being a tensioning spool apparatus.
- A tensioning reel system where the plurality of reel assemblies may include 12 to 24 reel assemblies on the tray.

Below is a list of tensioning reel embodiments. Those will be indicated with the letters "TR." Whenever such embodiments are referred to, they will be done by referring to "TR" embodiments.

TR60. A tensioning spool apparatus for storage of optical fiber exhibiting reduced variation of tension during a retraction cycle versus an extension cycle of fiber over a predefined range of spool rotation cycles, the optical fiber dynamically extended under tension from the spool, the apparatus comprising: (A) a first spiral element comprising a linear spring, a length of optical fiber characterized by an insertion loss dependent on its bend radius along a length of element, and an outer sheath with the linear spring and the fiber therein, wherein the first spiral element is sufficiently flexible to reduce adjacent turn interaction force and frictional binding under bending, while being at the same time sufficiently stiff to prevent buckling of spiral during unwinding and ensure that a bend radius of the optical fiber is at all locations and for all configurations greater than a minimum bend radius specified for the optical fiber; (B) a second spiral element comprising a flat coiled metallic spring, wherein the second spiral element produces greater average torque relative to an average torque produced by the first spiral element; and (C) a flat, non-rotating substrate in a first plane, wherein the first spiral element in a second plane, the second spiral element in a third plane, and the first, second and third planes are parallel, and the second plane lies between the first and third planes, and wherein the average torque transferred to the tensioning spool to drive rotation is equal to a sum of the average torque of the first and second spiral elements, the variation of said tension resulting primarily from friction between adjacent turns of the first spiral element, an outer surface of the sheath having a low coefficient of friction with itself to minimize the variation in tension.

TR61. An apparatus in accordance with embodiment(s) TR60, wherein the tension varies between 10 gm-f and 80 gm-f.

TR62. An apparatus in accordance with embodiment(s) TR60 or TR61, wherein the low coefficient of friction is nominally less than or equal to 0.25.

TR63. An apparatus in accordance with embodiment(s) TR60, wherein the minimum bend radius is approximately 5 mm.

TR64. A tensioning reel system optical fiber comprised of two helical springs, comprising a first spring and a second spring, rotating about a common axis and producing an additive torque about a common axis, the first spring fixed to a central mandrel and the second spring fixed to an outer ring, wherein the first spring produces greater torque than the second spring, the second spring is a multi-component assembly including an optical fiber, a straight wire and an outer sheath, and the first spring does not include an optical fiber.

TR65. A tensioning reel system in accordance with embodiment(s) TR64, wherein the helical springs rotate by identical angles about a common axis as the tensioning reel rotates.

TR66. A tensioning reel system in accordance with embodiment(s) TR64 or TR65, wherein the helical springs both unwind or wind about a common axis as the tensioning reel rotates.

TR67. A tensioning reel system in accordance with any of embodiment(s) TR64 or TR65, including a circular mandrel on which optical fiber can be repeatedly wound and unwound, wherein the helical springs both wind to a smaller average diameter as the optical fiber is extended from the reel system.

TR68. A system comprising a plurality of reel assemblies mounted on a sheet metal tray, each of said plurality of reel assemblies being a tensioning spool apparatus according to any of embodiment(s) TR60 or TR68.

TR69. The system of embodiment(s) TR68, wherein the plurality of reel assemblies comprises 12 to 24 reel assemblies on said tray.

Fiber Optic Tensioning Pulley Sub-System

One general aspect includes a system of fiber optic cable length buffers that tension fiber optic cables. The system of fiber optic cable length buffers also includes a central, stacked linear array of flexible, low friction through guides attached to a common substrate. The system also includes a multiplicity of the length buffers arrayed on the common substrate. The system also includes where the length buffers each include a spring-loaded moving sled with a stacked multiplicity of freely rotating pulleys on a moving common shaft, and a spaced-apart fixed common shaft with an equal multiplicity of freely rotating pulleys thereon. The system also includes where a fiber optic cable wraps in a repeated circuit around opposing sets of pulleys on the moving common shaft and on the fixed common shaft and the fiber optic cable is routed through one of the low friction through guides to a fiber optic connector at a distal fiber end.

Implementations may include one or more of the following features, alone and/or in combination(s):
- The system of fiber optic cable length buffers where a length of fiber extendable from the length buffers is approximately equal to a number of circuits multiplied by the maximum distance between the moving and fixed common shaft.
- The system where the spring-loaded moving sled is attached to a pair of power springs at one end and attached to the common substrate at the other end and extends in opposition from their fixed housing.
- The system where an average tension of the fiber optic cable is equal to a total retraction force of the pair of power springs divided by a number of circuits.
- The system where the distal fiber end is terminated in a connector that is connected and/or disconnected by a robot system.
- The system where the distal fiber end connector end face is cleanable by the robot system swiping the end face across cleaning fabric.

The system where the outer diameter of the individual low friction through guides is less than or equal to 1.0 mm to enable a high density of arrayed fiber optical cable length buffers.

The system where the outer diameter of the fiber optic cable is less than or equal to 0.5 mm to enable a high density of arrayed fiber optical cable length buffers.

Another general aspect includes a method of maintaining tension of optical fiber cables extendable from arrayed spools. The method of maintaining tension of optical fiber cables also includes extending a first optical fiber cable of the optical fiber cables from the arrayed spools by robot actuator. The method also includes sliding the first optical fiber cable through one of an array of flexible guides. The method also includes rotating a roller attached to a rotary encoder to generate encoder pulses. The method also includes counting the encoder pulses. The method also includes pulling the optical fibers cable wrapped around spools in multiple circuits on a sled traveling between two endpoints. The method also includes rotating arrayed spools on the sled with different rotation speeds. The method also includes translating a sled along a straight path due to dynamic extension force of optical fiber cables wrapped around spools of the sled. The method also includes pulling one or more springs attached at one end to the sled from their housing to impart a restoring force that maintains the tension.

Implementations may include one or more of the following features, alone and/or in combination(s):

The method where the tension is in the range of 20 gm-f to 50 gm-f on average, and where the tension increases as a length of the first optical fiber cable extended increases.

The method where the method may include comparing a number of encoder pulses to a calculated extension length to verify that the first fiber optic cable is properly extended or retracted.

The method where the method may include driving the robot actuator so that the travel of the sled is a fraction of the travel of the robot actuator.

Another general aspect includes a fiber optic cable length buffer device that auto-tensions a moveable end of an optical fiber cable that is extendable from the length buffer and opposite a fixed end of the optical fiber cable. The fiber optic cable length buffer device also includes a spring-loading translating sled with a multiplicity of freely rotating pulleys about a common first shaft affixed to the translating sled. The device also includes a spaced-apart fixed common second shaft with an equal multiplicity of freely rotating pulleys thereon. The device also includes where the fiber optic cable wraps in a repeated circuit around opposite pairs of pulleys on the common first shaft and on the common second shaft, and the moveable end of fiber optic cable is routed through a low friction through guide to a fiber optic connector, the force produced by spring-loading on sled equal to an integer multiple of the tension force imparted on the moveable end of the optical fiber cable.

Implementations may include one or more of the following features, alone and/or in combination(s):

The buffer device where a ratio of a pulley's outer diameter to the shaft's outer diameter is about 10 to 1.

The buffer device where a tension force imparted on the moveable end of the optical fiber cable is in the range of 10 gm-f to 50 gm-f.

The buffer device where the optical fiber cable has a low friction, wear resistant protective covering with outer diameter of 0.25 to 0.5 mm.

The buffer device where the optical fiber cable is may include of one or more individual optical fibers.

Below is a list of tensioning pulley embodiments. Those will be indicated with the letters "TP." Whenever such embodiments are referred to, they will be done by referring to "TP" embodiments.

TP70. A system of fiber optic cable length buffers that tension fiber optic cables, each fiber optic cable with distal and proximal ends and extendable from the length buffer, the system comprising: a central, stacked linear array of flexible, low friction through guides attached to a common substrate; and a multiplicity of the length buffers arrayed on the common substrate, wherein the length buffers each include a spring-loaded moving sled with a stacked multiplicity of freely rotating pulleys on a moving common shaft, and a spaced-apart fixed common shaft with an equal multiplicity of freely rotating pulleys thereon, and wherein a fiber optic cable wraps in a repeated circuit around opposing sets of pulleys on the moving common shaft and on the fixed common shaft and said fiber optic cable is routed through one of the low friction through guides to a fiber optic connector at a distal fiber end.

TP71. The system of fiber optic cable length buffers of embodiment(s) TP70, wherein a length of fiber extendable from the length buffers is approximately equal to a number of circuits multiplied by the maximum distance between the moving and fixed common shaft.

TP72. The system of fiber optic cable length buffers of embodiment(s) TP70 or TP71, wherein the spring-loaded moving sled is attached to a pair of power springs at one end and attached to the common substrate at the other end and extends in opposition from their fixed housing.

TP73. The system of fiber optic cable length buffers of any of the preceding embodiment(s) TP70-TP72, wherein an average tension of the fiber optic cable is equal to a total retraction force of the pair of power springs divided by a number of circuits.

TP74. The system of fiber optic cable length buffers of any of the preceding embodiment(s) TP70-TP73, wherein the distal fiber end is terminated in a connector that is connected and/or disconnected by a robot system.

TP75. The system of fiber optic cable length buffers of any of the preceding embodiment(s) TP70-TP74, wherein the distal fiber end connector end face is cleanable by the robot system swiping the end face across cleaning fabric.

TP76. The system of fiber optic cable length buffers of any of the preceding embodiment(s) TP70-TP75, wherein the outer diameter of the individual low friction through guides is less than or equal to 1.0 mm to enable a high density of arrayed fiber optical cable length buffers.

TP77. The system of fiber optic cable length buffers of any of the preceding embodiment(s) TP70-TP76, wherein the outer diameter of the fiber optic cable is less than or equal to 0.5 mm to enable a high density of arrayed fiber optical cable length buffers.

TP78. A method of maintaining tension of optical fiber cables extendable from arrayed spools, the method comprising: extending a first optical fiber cable of the optical fiber cables from the arrayed spools by robot actuator; sliding the first optical fiber cable through one of an array of flexible guides; rotating a roller attached to a rotary encoder to generate encoder pulses; counting the encoder pulses; pulling the optical fiber cable wrapped around spools in multiple circuits on a sled traveling between two endpoints; rotating arrayed spools on the sled with different rotation speeds; translating a sled along a straight path due to dynamic tension force of optical fiber cables wrapped around spools of the sled; and pulling one or more springs attached at one end to the sled from their housing to impart a restoring force that maintains the tension.

TP79. The method of embodiment(s) TP78 wherein the tension is in the range of 20 gm-f to 50 gm-f on average, and wherein the tension increases as a length of the first optical fiber cable extended increases.

TP80. The method of embodiment(s) TP78 or TP78, further comprising: comparing a number of encoder pulses to a calculated extension length to verify that the first fiber optic cable is properly extended or retracted.

TP81. The method of any of the preceding embodiment(s) TP78-TP80, further comprising: driving the robot actuator so that the travel of the sled is a fraction of the travel of the robot actuator.

TP82. A fiber optic cable length buffer device that auto-tensions a moveable end of an optical fiber cable that is extendable from the length buffer and opposite a fixed end of the optical fiber cable, wherein the length buffer comprises: a spring-loading translating sled with a multiplicity of freely rotating pulleys about a common first shaft affixed to the translating sled; and a spaced-apart fixed common second shaft with an equal multiplicity of freely rotating pulleys thereon, wherein the fiber optic cable wraps in a repeated circuit around opposite pairs of pulleys on the common first shaft and on the common second shaft, and the moveable end of fiber optic cable is routed through a low friction through guide to a fiber optic connector, the force produced by spring-loading on sled equal to an integer multiple of the tension force imparted on the moveable end of the optical fiber cable.

TP83. The buffer device of embodiment(s) TP82, wherein a ratio of a pulley's outer diameter to the shaft's outer diameter is about 10 to 1.

TP84. The buffer device of embodiment(s) TP82 or TP83, wherein a tension force imparted on the moveable end of the optical fiber cable is in the range of 10 gm-f to 50 gm-f.

TP85. The buffer device of any of the preceding embodiment(s) TP82-TP84, wherein the optical fiber cable has a low friction, wear resistant protective covering with outer diameter of 0.25 to 0.5 mm.

TP86. The buffer device of any of the preceding embodiment(s) TP82-TP85, wherein the optical fiber cable is comprised of one or more individual optical fibers.

Cleaning Cartridge Sub-System

One general aspect comprises a device that includes a drive mechanism; a pressure sensor; a source spool of fabric; a take-up spool operatively connected to the drive mechanism; and a plurality of guide rollers to guide the fabric past the pressure sensor to the take-up spool. The device also includes where contact of a fiber connector tip on the pressure sensor causes the drive mechanism, after a predetermined delay, to rotate the take-up spool and advance a predetermined amount of the fabric from the source spool to the take-up spool.

Implementations may include one or more of the following features, alone and/or in combination(s):

The device may include: a linear actuator; a lever arm; and a time-delay circuit, and where a voltage change across the pressure sensor triggers the time-delay circuit to, after the predetermined delay, switch on drive current to the linear actuator for a predetermined amount of time, where the linear actuator drives the lever arm which rotates a drive shaft through opposing one-way needle bearings.

The device where the predetermined delay is 3 to 4 seconds.

The device where the predetermined amount of the fabric is about 1.5 mm to 3 mm of the fabric.

The device where the fabric may include a cleaning fabric.

The device where the device may include an encoder, connected to the source spool, to determine/confirm advancement of the fabric from the source spool to the take-up spool.

The device where the encoder detects the advance of fabric. The device where a signal from the encoder is processed to provide an estimate of remaining fabric on the source spool, and/or an indication of finished fabric on the source spool.

The device where the drive mechanism may include a clutch. The device where the device is constructed and adapted to attach to a robot module in an automated fiber optic cross-connect system.

Another general aspect includes a method in an automated fiber optic cross-connect system. The method also includes a gripper engaging a fiber connector tip with a cleaning fabric and activating a touch sensor. The method also includes a voltage change across the touch sensor triggering a time-delay circuit. The method also includes after a predetermined delay, the time-delay circuit switching on drive current to a linear actuator for a predetermined amount of time. The method also includes the linear actuator driving a lever which rotates a drive shaft through opposing one-way needle bearings, where rotation of the drive shaft rotates a fabric feed roller.

Implementations may include one or more of the following features, alone and/or in combination(s):

The method where the predetermined delay is about 3-5 seconds.

The method where the predetermined amount of time is about 5 seconds.

The method where the rotation of the drive shaft causes the cleaning fabric to advance about 1.5 mm to 3 mm.

Another general aspect includes a cleaning cartridge system for dispensing and usage monitoring of fiber end face cleaning fabric. The cleaning cartridge system also includes a spool of cleaning fabric. The system also includes an actuator that drives a fabric advance roller. The system also includes a pressure sensor that detects when a fiber end face is in contact with fabric and outputs a contact-indicating signal. The system also includes a clutch attached to a shaft of the spool to maintain tension on the cleaning fabric. The system also includes a rotary encoder attached to shaft of the spool to measure advance of the cleaning fabric. The system also includes an internal control circuit that drives the actuator to advance the cleaning fabric in time-relation to the contact-indicating signal. The system also includes an external controller that measures encoder output signal to verify proper advance of the cleaning fabric and consumption of the cleaning fabric over time.

Implementations may include one or more of the following features, alone and/or in combination(s):

The cleaning cartridge system further including an optical inspection microscope to verify cleanliness of an optical fiber end face after cleaning.

The cleaning cartridge system further including an optical time-domain reflectometer, optical power meter and detector, or optical coherence domain reflectometer to measure insertion loss and/or backreflection at the fiber end face and verify cleanliness of an optical fiber end face after cleaning by ensuring backreflection is less than −45 dB and/or insertion loss less than 0.5 dB.

Another general aspect includes a method of cleaning an optical fiber end face with a cleaning fabric in an automated cross-connect system that reconfigures optical fiber end faces among a multiplicity of receiving receptacles. The method also includes energizing an electrical actuator. The method also includes rotating a fabric advance roller to translate fabric ribbon. The method also includes unspooling fabric ribbon partially from fabric ribbon source spool. The method also includes advancing a pre-determined section of fabric to present an unused section of fabric at a cleaning element. The method also includes counting encoder pulses generated when advancing the fabric. The method also includes waiting for the fabric advance to complete based on an encoder pulse count. The method also includes contacting the optical fiber end face substantially normal to a surface of the fabric. The method also includes detecting contact of the optical fiber end face on fabric using a force or pressure sensor. The method also includes swiping the optical fiber end face in a direction substantially normal to fabric ribbon length. The method also includes withdrawing the cleaned optical fiber end face from cleaning element. The method also includes plugging the optical fiber end face into one of the multiplicity of receiving receptacles.

Implementations may include one or more of the following features, alone and/or in combination(s):
The method where the method may include measuring a backreflection of the cleaned optical fiber end face to verify cleaning.
The method where the method may include repeating acts in the method if the backreflection of the cleaned optical fiber end face exceeds a given threshold.
The method where the repeating may include repeating all acts in the method.
The method where the given threshold equals −50 dB.
The method where the method may include inspecting the optical fiber end face for cleanliness using an optical microscope and image processing system to identify contamination.
The method where the method may include repeating steps in the process if the image processing system determines that the optical fiber end face is not adequately cleaned.
The method where the repeating may include repeating all steps in the process.

One general aspect includes a method of maintaining low loss physical fiber optic connections in an automated cross-connect system that reconfigures optical fiber end faces among a multiplicity of receiving receptacles. The method of maintaining low loss physical fiber optic connections also includes (a) cleaning the fiber optic connection. The method may also include (b) plugging in the fiber optic connection into one of the multiplicity of receiving receptacles. The method may also include (c) testing a resulting connection by launching a pulse through the fiber optic connection and measuring a backreflection corresponding to the resulting connection. The method may also include (d) determining a backreflection level from the fiber optic connection and checking that the backreflection level is less than −50 dB, and if the backreflection is greater than −50 dB, repeating acts (a)-(d).

Implementations may include one or more of the following features, alone and/or in combination(s): The method where the pulse has a duration of less than 10 ns.
The method where the pulse is at a wavelength between 1300 nm and 1650 nm.

Below is a list of cleaning cartridge embodiments. Those will be indicated with the letters "CC." Whenever such embodiments are referred to, they will be done by referring to "CC" embodiments.

CC87. A device comprising: a drive mechanism; a pressure sensor; a source spool of fabric; a take-up spool operatively connected to the drive mechanism; and a plurality of guide rollers to guide the fabric past the pressure sensor to the take-up spool, wherein contact of a fiber connector tip on the pressure sensor causes the drive mechanism, after a predetermined delay, to rotate the take-up spool and advance a predetermined amount of the fabric from the source spool to the take-up spool.

CC88. The device of claim CC87, further comprising: a linear actuator; a lever arm; and a time-delay circuit, and wherein a voltage change across the pressure sensor triggers the time-delay circuit to, after said predetermined delay, switch on drive current to the linear actuator for a predetermined amount of time, wherein the linear actuator drives the lever arm which rotates a drive shaft through opposing one-way needle bearings.

CC89. The device of claims CC87 or CC88, wherein the predetermined delay is 3 to 4 seconds.

CC90. The device of claims CC87 or CC88, wherein the predetermined amount of the fabric is about 1.5 mm to 3 mm of the fabric.

CC91. The device of claims CC87 or CC88, wherein the fabric comprises a cleaning fabric.

CC92. The device of CC87 or CC88, further comprising an encoder, connected to the source spool, to determine/confirm advancement of the fabric from the source spool to the take-up spool.

CC93. The device of claim CC92, wherein the encoder detects the advance of fabric.

CC94. The device of claim CC92, wherein a signal from the encoder is processed to provide an estimate of remaining fabric on the source spool, and/or an indication of finished fabric on the source spool.

CC95. The device of claims CC87 or CC88, wherein the drive mechanism comprises a clutch.

CC96. The device of claim CC87, constructed and adapted to attach to a robot module in an automated fiber optic cross-connect system.

CC97. A method, in an automated fiber optic cross-connect system, the method comprising: a gripper engaging a fiber connector tip with a cleaning fabric and activating a touch sensor; a voltage change across the touch sensor triggering a time-delay circuit; after a predetermined delay, the time-delay circuit switching on drive current to a linear actuator for a predetermined amount of time; and the linear actuator driving a lever which rotates a drive shaft through opposing one-way needle bearings, wherein rotation of the drive shaft rotates a fabric feed roller.

CC98. The method of claim CC97, wherein the predetermined delay is about 3-5 seconds.

CC99. The method of claim CC97, wherein the predetermined amount of time is about 5 seconds.

CC100. The method of claim CC97, wherein rotation of the drive shaft causes the cleaning fabric to advance about 1.5 mm to 3 mm.

CC101. A cleaning cartridge system for dispensing and usage monitoring of fiber end face cleaning fabric, the cartridge system comprising: a spool of cleaning fabric; an actuator that drives a fabric advance roller; a pressure sensor that detects when a fiber end face is in contact with fabric and outputs a contact-indicating signal; a clutch attached to a shaft of the spool to maintain tension on the cleaning fabric; a rotary encoder attached to shaft of the spool to measure advance of the cleaning fabric; an internal control circuit that drives the actuator to advance the cleaning fabric in time-relation to the contact-indicating signal; and an external controller that measures encoder output signal to verify proper advance of the cleaning fabric and consumption of the cleaning fabric over time.

CC102. The cleaning cartridge system of claim CC101, further including an optical inspection microscope to verify cleanliness of an optical fiber end face after cleaning.

CC103. The cleaning cartridge system of claim CC102, further including an optical time-domain reflectometer, optical power meter and detector, or optical coherence domain reflectometer to measure insertion loss and/or backreflection at the fiber end face and verify cleanliness of an optical fiber end face after cleaning by ensuring backreflection is less than −45 dB and/or insertion loss less than 0.5 dB.

CC104. A method of cleaning an optical fiber end face with a cleaning fabric in an automated cross-connect system that reconfigures optical fiber end faces among a multiplicity of receiving receptacles, the method comprising: energizing an electrical actuator; rotating a fabric advance roller to translate fabric ribbon; unspooling fabric ribbon partially from fabric ribbon source spool; advancing a pre-determined section of fabric to present an unused section of fabric at a cleaning element; counting encoder pulses generated when advancing the fabric; waiting for the fabric advance to complete based on an encoder pulse count; contacting the optical fiber end face substantially normal to a surface of the fabric; detecting contact of the optical fiber end face on fabric using a force or pressure sensor; swiping the optical fiber end face in a direction substantially normal to fabric ribbon length; withdrawing the cleaned optical fiber end face from cleaning element; and plugging the optical fiber end face into one of the multiplicity of receiving receptacles.

CC105. The method of claim CC104, further comprising: measuring a backreflection of the cleaned optical fiber end face to verify cleaning.

CC106. The method of claim CC105, further comprising: repeating acts in the method if the backreflection of the cleaned optical fiber end face exceeds a given threshold.

CC107. The method of claim CC106, wherein said repeating comprises repeating all acts in the method.

CC108. The method of claim CC106, wherein the given threshold equals −50 dB.

CC109. The method of claim CC104, further comprising: inspecting the optical fiber end face for cleanliness using an optical microscope and image processing system to identify contamination.

CC110. The method of claim CC109, further comprising: repeating steps in the process if the image processing system determines that the optical fiber end face is not adequately cleaned.

CC111. The method of claim CC110, wherein said repeating comprises repeating all steps in the process.

CC112. A method of maintaining low loss physical fiber optic connections in an automated cross-connect system that reconfigures optical fiber end faces among a multiplicity of receiving receptacles, the method comprising: (A) cleaning the fiber optic connection; (B) plugging in the fiber optic connection into one of the multiplicity of receiving receptacles; (C) testing a resulting connection by launching a pulse through the fiber optic connection and measuring a backreflection corresponding to the resulting connection; and (D) determining a backreflection level from the fiber optic connection and checking that the backreflection level is less than −50 dB, and if the backreflection is greater than −50 dB, repeating acts (A)-(D).

CC113. The method of claim CC112, wherein the pulse has a duration of less than 10 ns.

CC114. The method of claim CC112, wherein the pulse is at a wavelength between 1300 nm and 1650 nm.

System Combination of Replaceable Sub-Systems

One general aspect includes a robotic fiber optic cross-connect system for configuring signal transmission of fiber interconnects across an array of bi-directional connections and comprising a multiplicity of replaceable sub-systems, wherein a reconfiguration utilizes a multi-step process of mechanical rearrangement based on anti-collision algorithm and electronic sensing, and wherein an arbitrary reconfiguration of the array of bi-directional connections takes at least 30 seconds to complete the multi-step process.

Implementations may include one or more of the following features, alone and/or in combination(s):
  The system where each subsystem can be replaced without interruption of transmission of signals through the cross-connect system.
  The system where each subsystem can be replaced within about 60 minutes without interruption of transmission of signals through the cross-connect system.
  The system where the replaceable sub-systems include a controller subsystem, robot subsystem, a gripper subsystem, a cleaning cartridge subsystem, and a fiber tensioning subsystem.

One general aspect includes a robotic fiber optic cross-connect system for configuring connectivity of fiber interconnects across an array of connections. The robotic fiber optic cross-connect system also includes a controller executing a knots, braids and strands (KBS) algorithm and machine instructions. The system also includes a robot subsystem with a translatable platform carrying an extendable robot arm that extends along a first axis with a gripper attached to end of arm. The system also includes a cleaning cartridge attached to a translatable platform. The system also includes a multiplicity of fibers with connectors that are carried by the gripper, each fiber independently tensioned and retracted within an arrayed storage and tensioning device incorporating a multiplicity of spring-powered retractors and a linear backbone of low friction, flexible guides along a second axis. The system also includes where the first axis and the second axis are substantially parallel.

Implementations may include one or more of the following features, alone and/or in combination(s):
  The system where the extendable robot arm is a multi-stage unit with an outer stage attached to translatable platform, a middle stage translating within the outer stage and an inner stage sliding within the middle stage and with a gripper attached at one end of the inner stage.

The system where the system further including a multiplicity of optical power monitor test ports to measure optical power within any fiber interconnect.

The system where the system further including a multiplicity of optical time domain reflectometer test ports to measure insertion loss, backreflection and length along an extended and external optical fiber connected to any fiber interconnect.

The system where the system further including a multiplicity of light source test ports to launch optical power into an extended and external optical fiber connected to any fiber interconnect.

Below is a list of tensioning reel embodiments. Those will be indicated with the letters "COMB." Whenever such embodiments are referred to, they will be done by referring to "COMB" embodiments.

COMB115. A robotic fiber optic cross-connect system for configuring signal transmission of fiber interconnects across an array of bi-directional connections and comprising a multiplicity of replaceable sub-systems, wherein a reconfiguration utilizes a multi-step process of mechanical rearrangement based on anti-collision algorithm and electronic sensing, and wherein an arbitrary reconfiguration of the array of bi-directional connections takes at least 30 seconds to complete the multi-step process.

COMB116. The system of embodiment(s) COMB115, wherein each subsystem can be replaced without interruption of transmission of signals through the cross-connect system.

COMB117. The system of embodiment(s) COMB115 or COMB116, wherein each subsystem can be replaced without interruption of transmission of signals through the cross-connect system.

COMB118. The system of any of the preceding embodiment(s) COMB115-COMB117, wherein each subsystem can be replaced within about 60 minutes without interruption of transmission of signals through the cross-connect system.

COMB119. A system in accordance with any of the preceding embodiment(s) COMB115-COMB118, wherein the replaceable sub-systems include a controller subsystem, robot subsystem, a gripper subsystem, a cleaning cartridge subsystem, and a fiber tensioning subsystem.

COMB120. A robotic fiber optic cross-connect system for configuring connectivity of fiber interconnects across an array of connections, the system comprising: a controller executing a Knots, Braids and Strands (KBS) algorithm and machine instructions; a robot subsystem with a translatable platform carrying an extendable robot arm that extends along a first axis with a gripper attached to end of arm; a cleaning cartridge attached to a translatable platform; and a multiplicity of fibers with connectors that are carried by the gripper, each fiber independently tensioned and retracted within an arrayed storage and tensioning device incorporating a multiplicity of spring-powered retractors and a linear backbone of low friction, flexible guides along a second axis, wherein the first axis and the second axis are substantially parallel.

COMB121. The system of embodiment(s) COMB120, wherein the extendable robot arm is a multi-stage unit with an outer stage attached to translatable platform, a middle stage translating within the outer stage and an inner stage sliding within the middle stage and with a gripper attached at one end of the inner stage.

COMB122. The system of embodiment(s) COMB120 or COMB121, further including a multiplicity of optical power monitor test ports to measure optical power within any fiber interconnect.

COMB123. The system of any of the preceding embodiment(s) COMB120-COMB122, further including a multiplicity of optical time domain reflectometer test ports to measure insertion loss, backreflection and length along an extended and external optical fiber connected to any fiber interconnect.

COMB124. The system of any of the preceding embodiment(s) COMB120-COMB123, further including a multiplicity of light source test ports to launch optical power into an extended and external optical fiber connected to any fiber interconnect.

Embodiment(s) in Combination

Another general aspect includes one or more of the following, alone and/or in combination(s):

any gripper device according to embodiment(s) G1-G36; and/or any robot arm sub-system according to embodiment(s) RA37-RA59; and/or any fiber optic tensioning reel sub-system according to embodiment(s) TR60-TR69; and/or any fiber optic tensioning pulley sub-system according to embodiment(s) TP70-TP86; and/or any cleaning cartridge sub-system according to embodiment(s) CC87-CC114; and/or any system combination of replaceable sub-systems according to embodiment(s) COMB115-COMB124.

DESCRIPTION OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

Gripper Sub-System

FIGS. 1A-1F, 2A-2D, 3, 4A-4E, and 5A-5B depict aspects of a gripper assembly according to exemplary embodiments hereof;

FIGS. 7A-7B illustrate a quick-disconnect electro-mechanical interface for the gripper assembly according to exemplary embodiments hereof.

Robot Arm Sub-System

Figure 8:
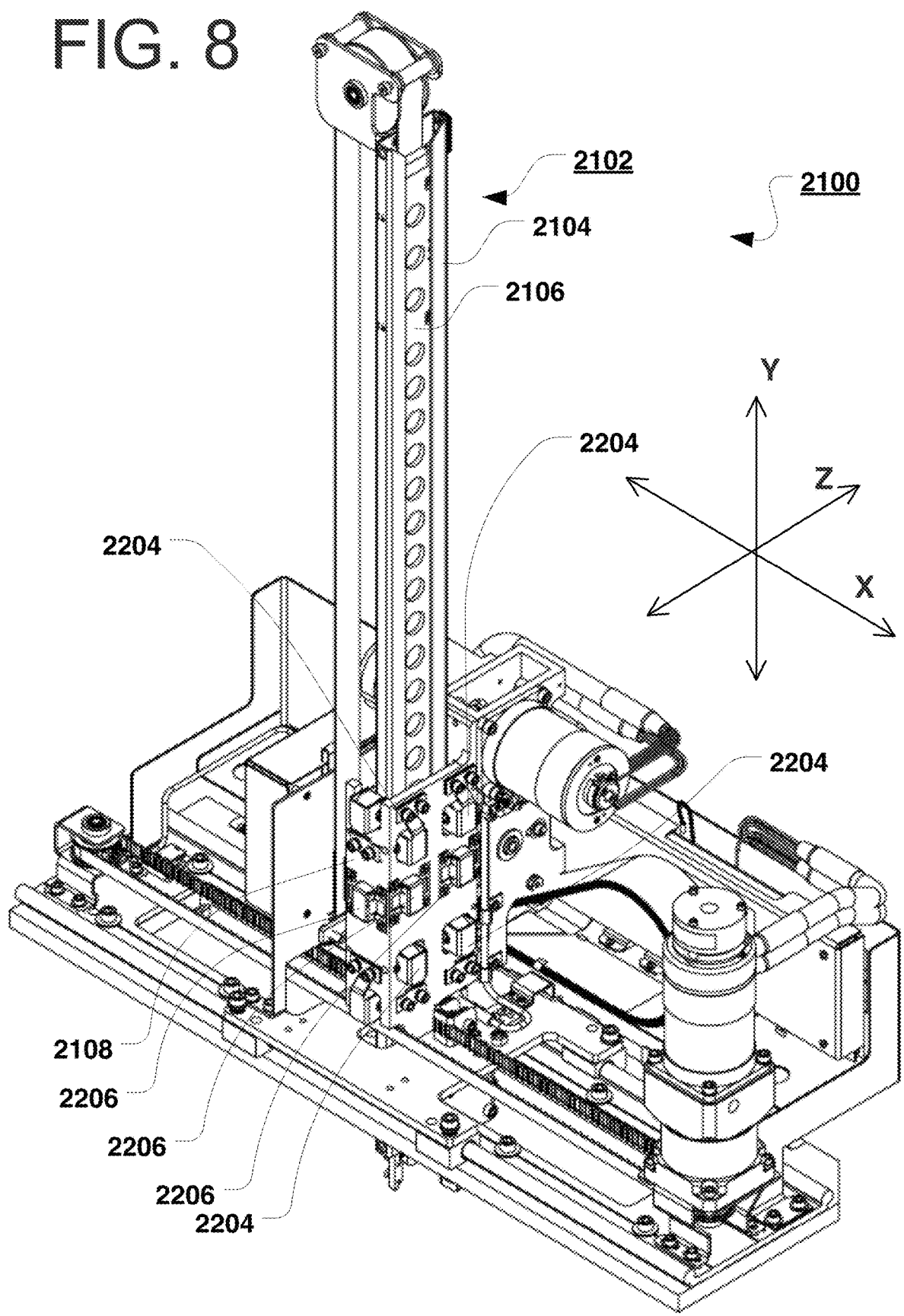
Figure 9A:
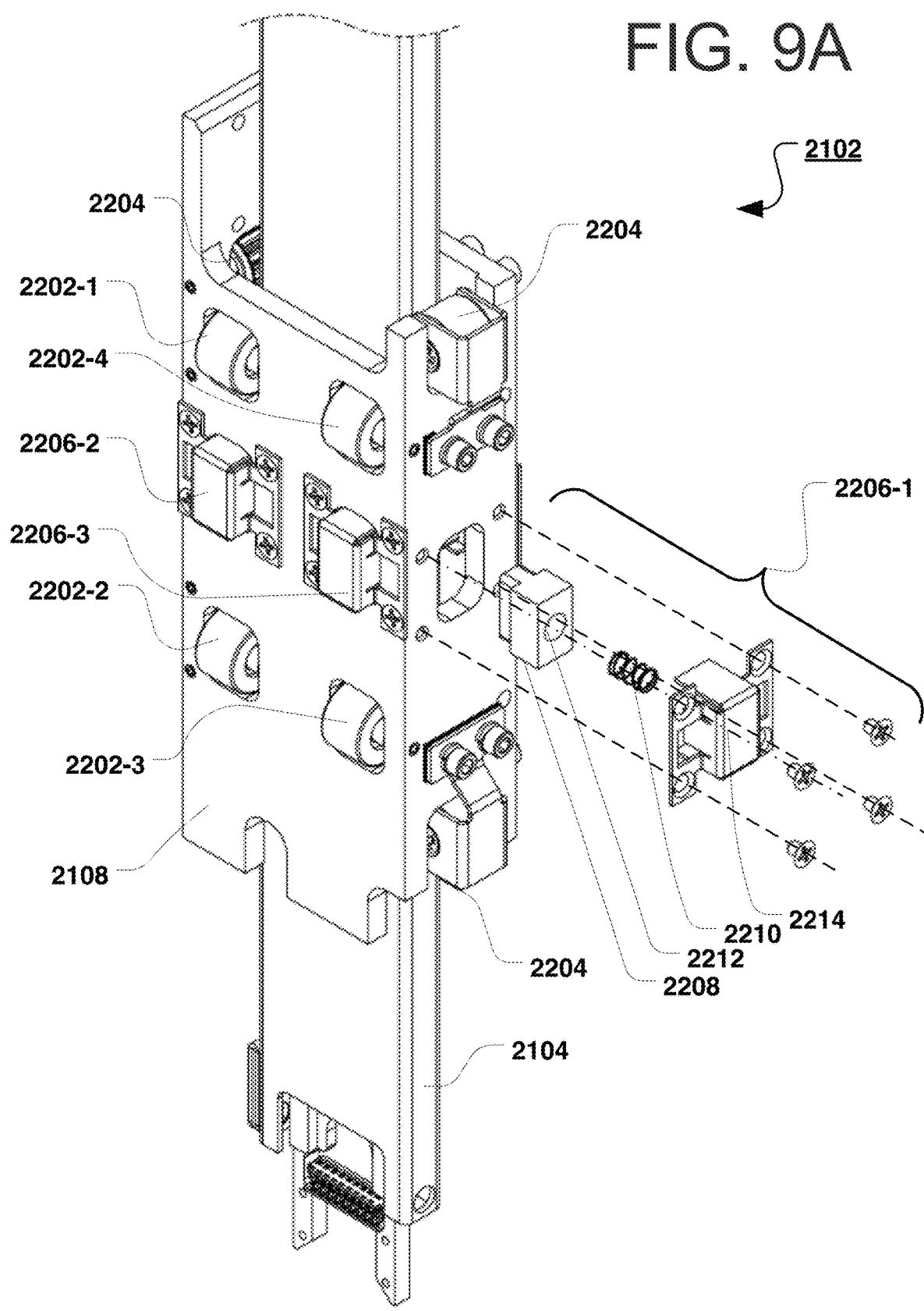
Figure 9B:
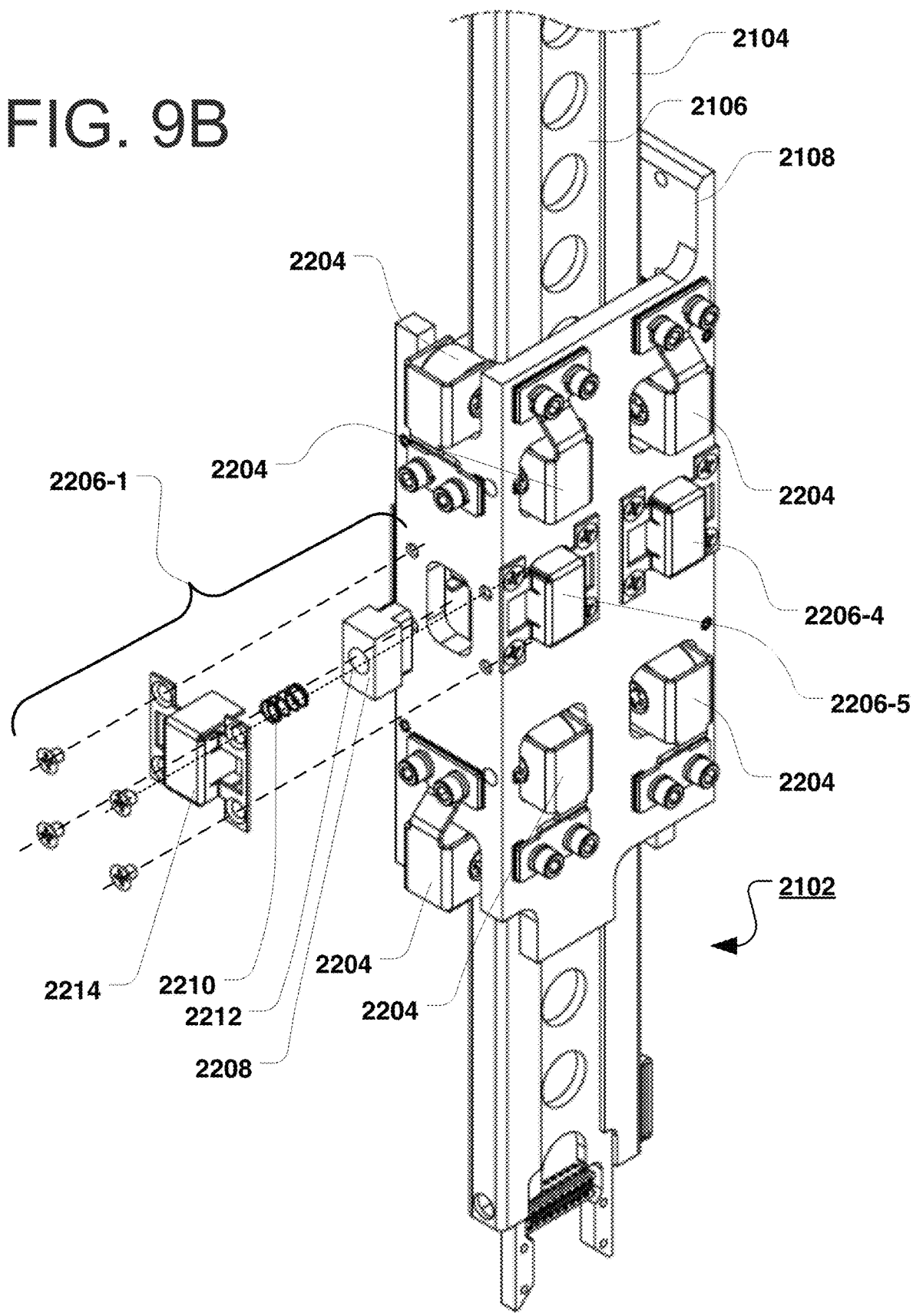
Figure 10A:
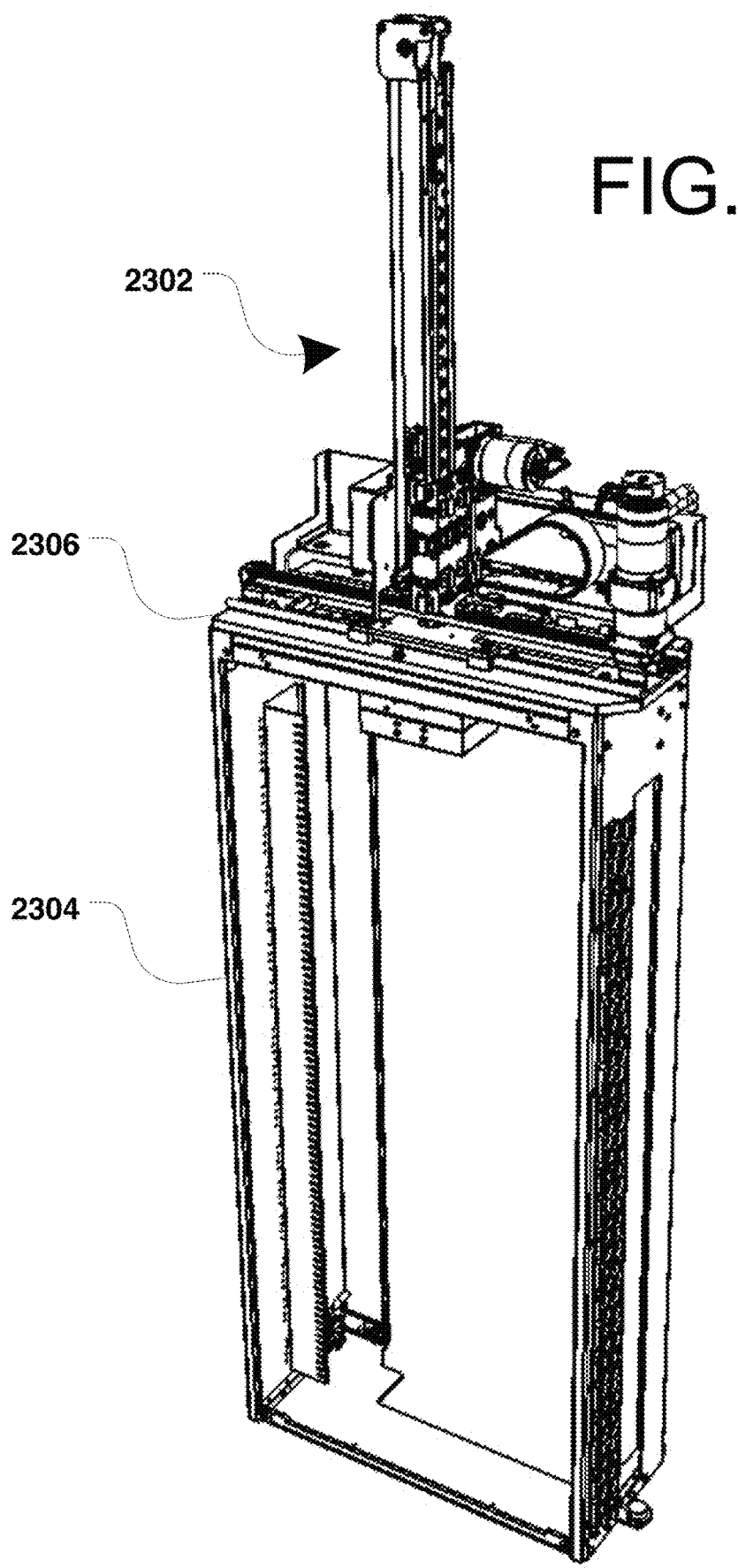
Figure 10B:
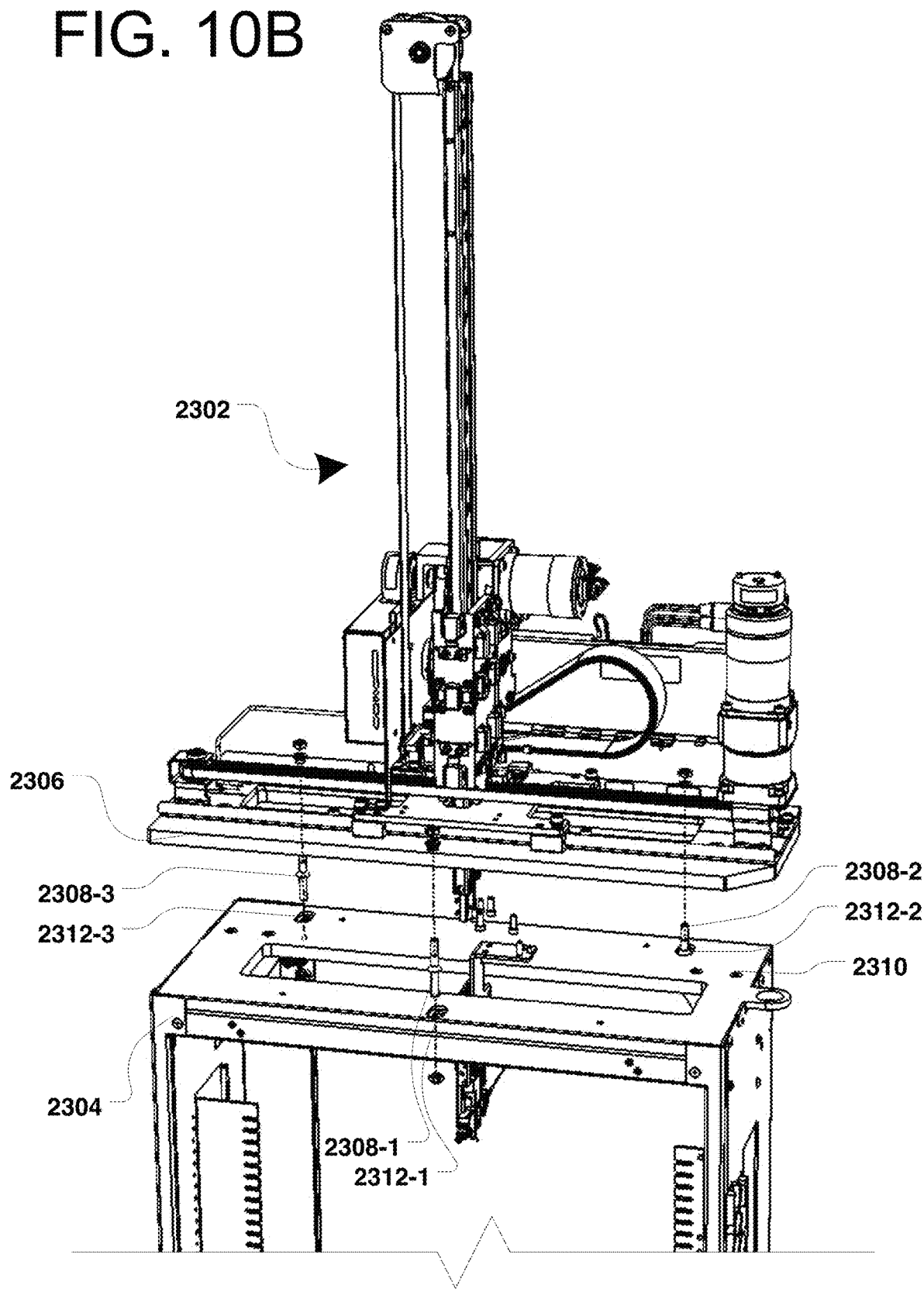
Figure 10C:
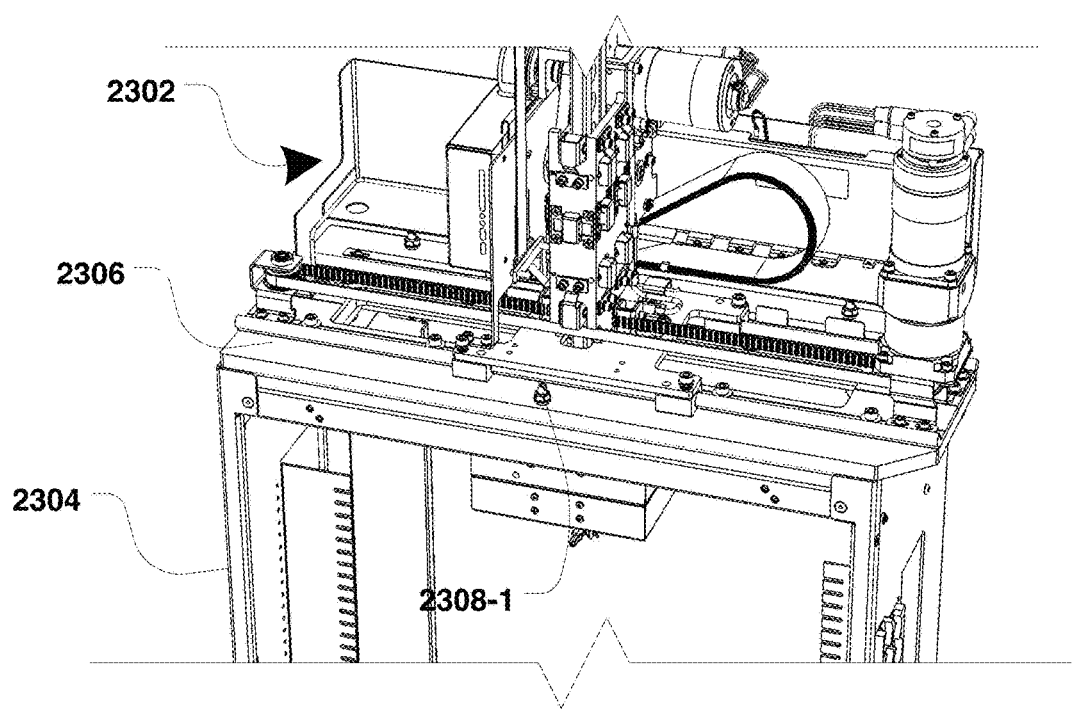
Figure 10D:
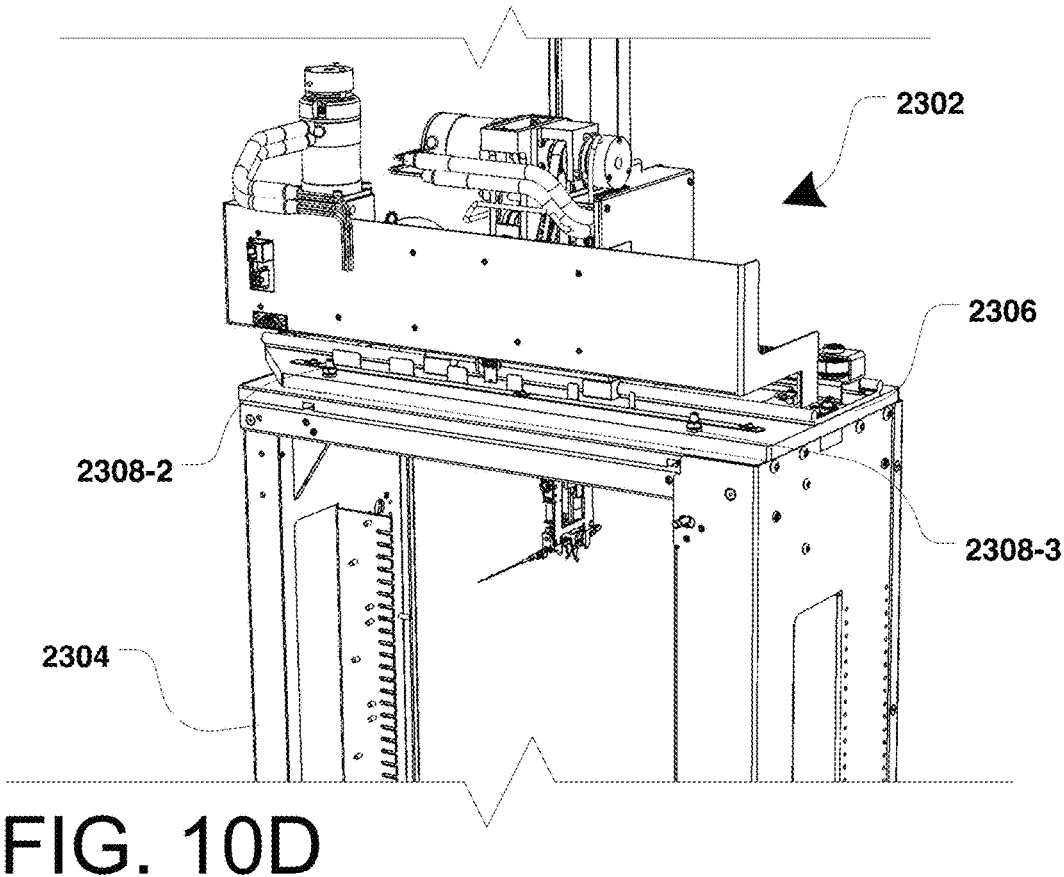
Figure 10E:
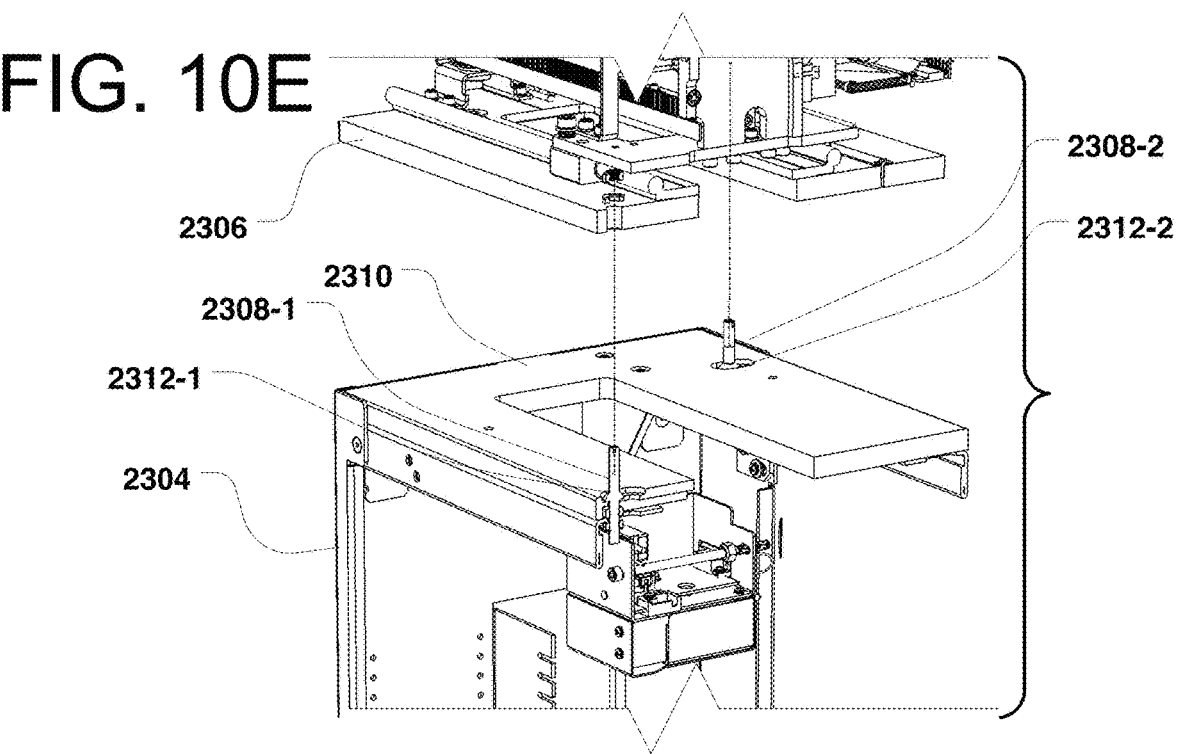
Figure 10F:
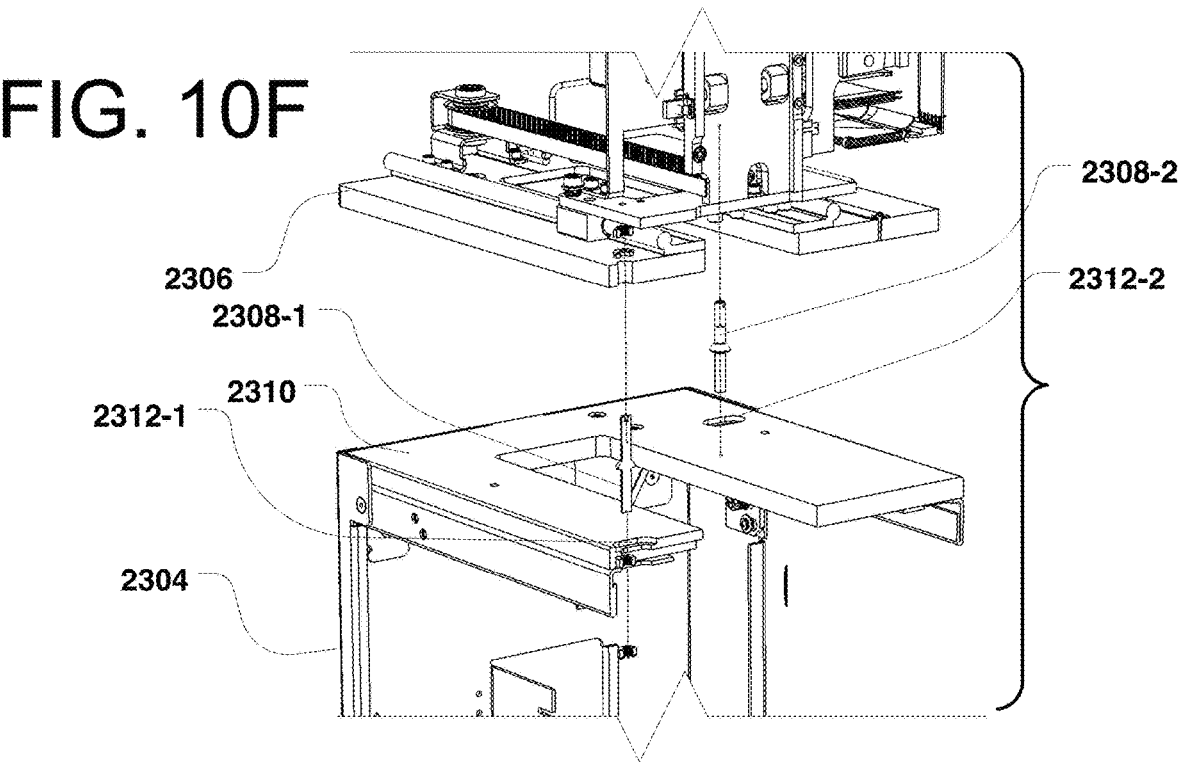
Figure 10G:
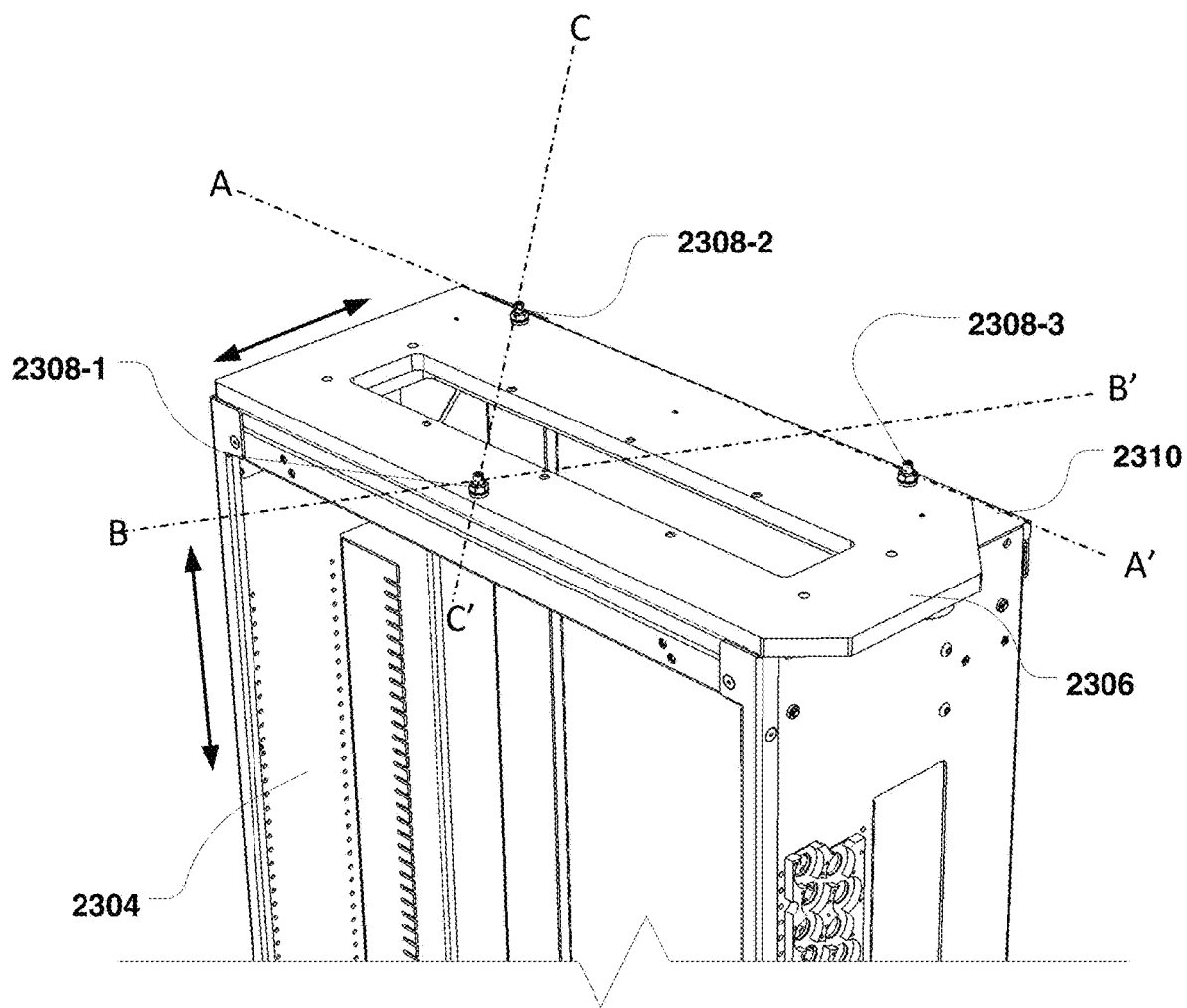
Figure 10H:
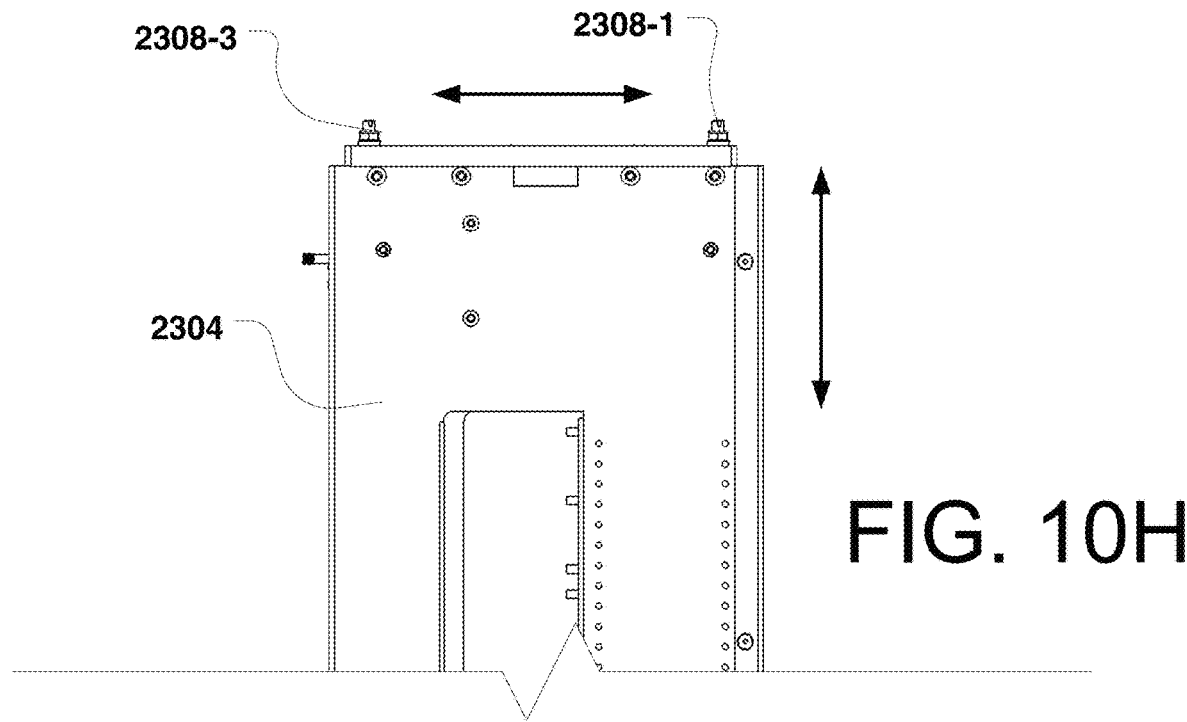
Figure 10I:
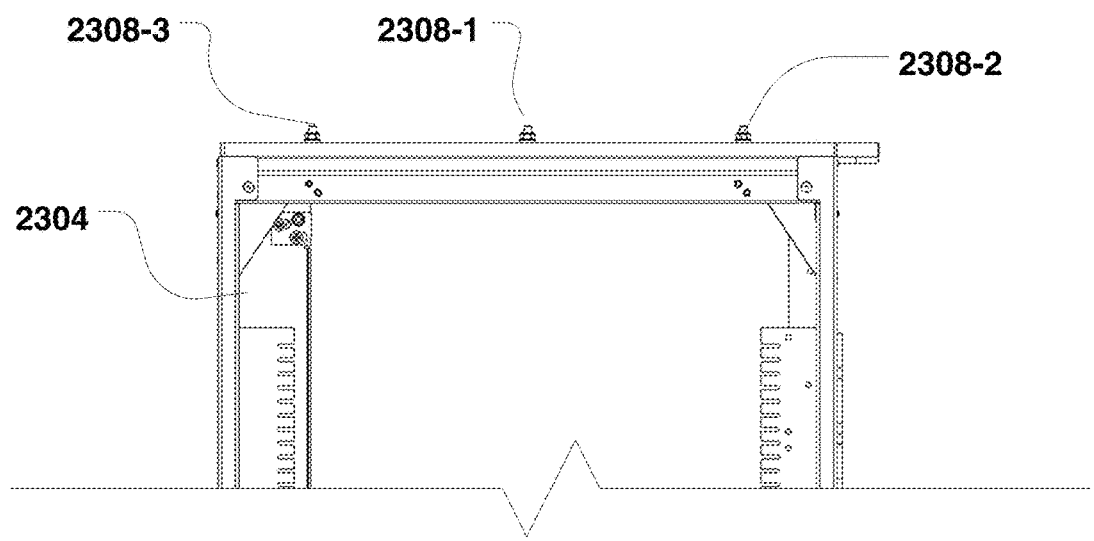
Figure 10J:
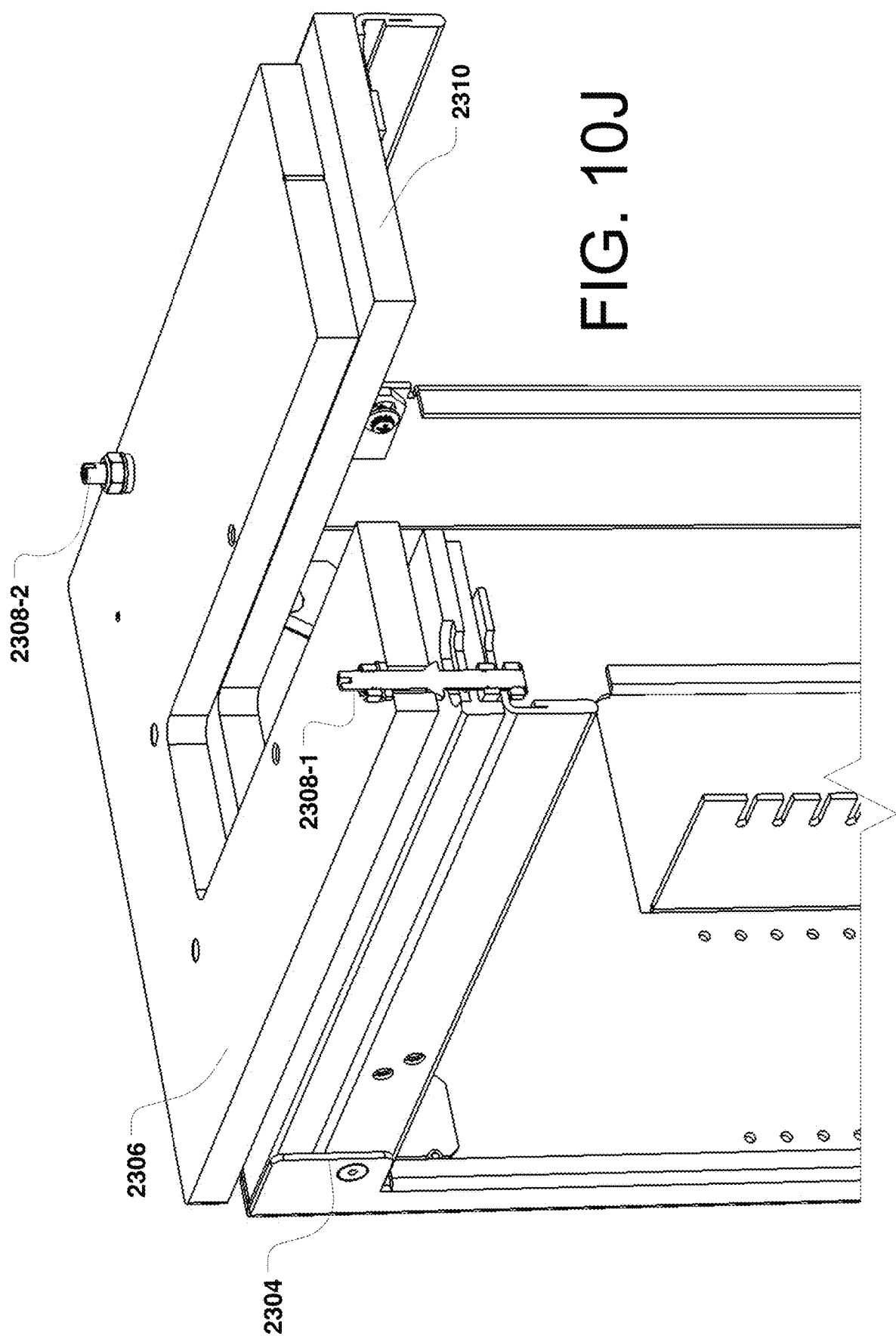
Figure 10K:
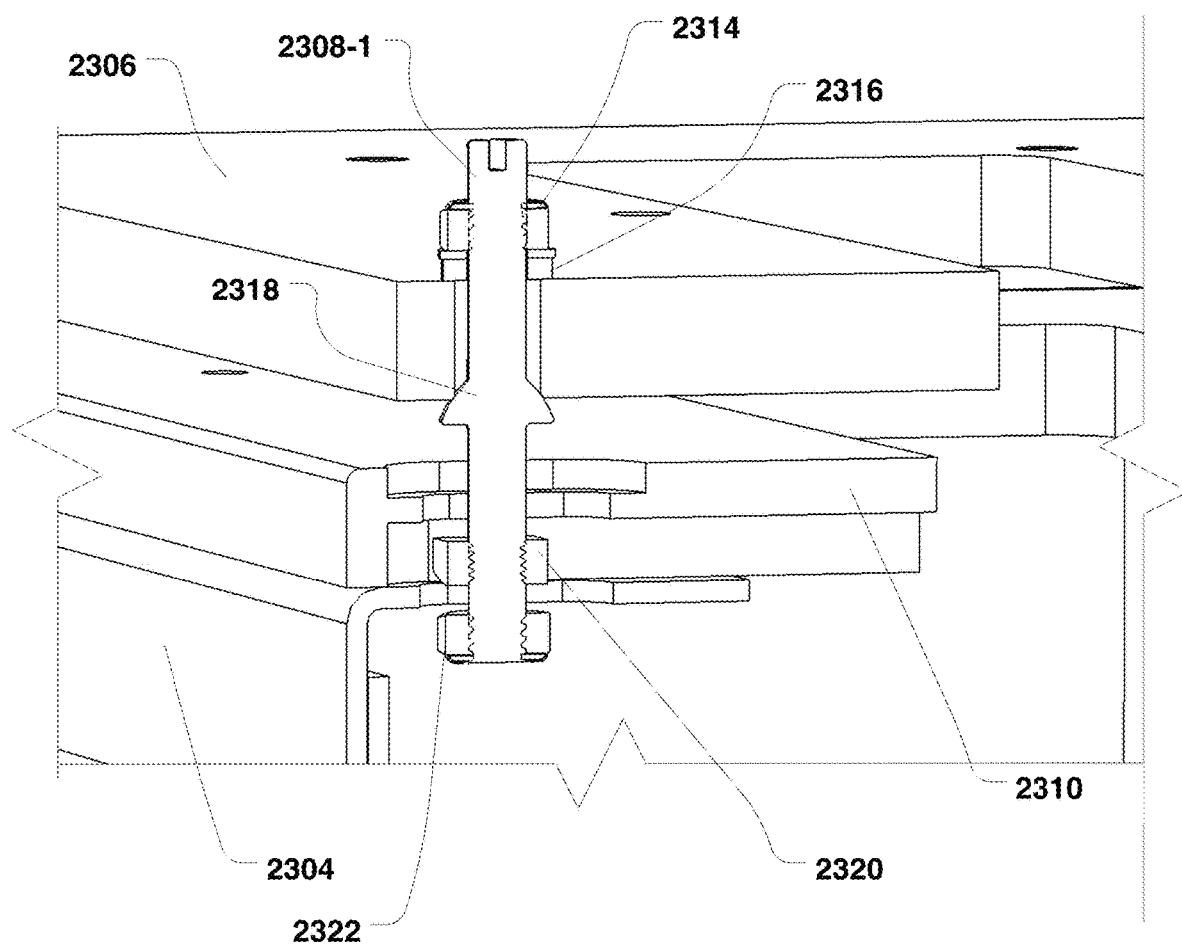
Figure 10L:
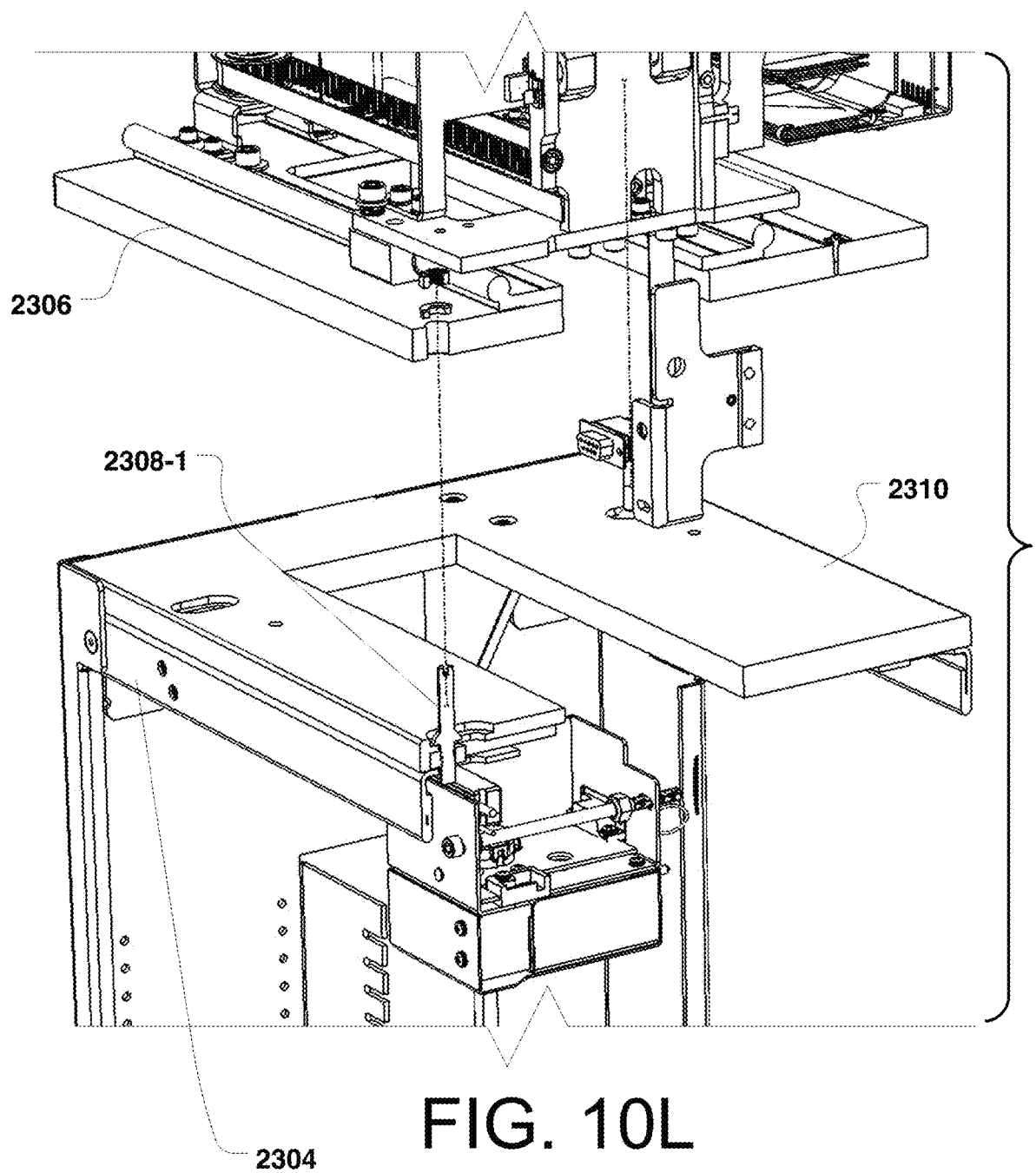

FIGS. 8, 9A, and 9B depict aspects of a robotic arm according to exemplary embodiments hereof;

FIGS. 10A-10L depict aspects of a robot leveling mechanism according to exemplary embodiments hereof; and FIGS. 11A-11D are diagrams of a telescopic robotic arm that extends and retracts along a substantially horizontal direction without the assistance of gravity.

Cleaning Cartridge Sub-System

Figure 17A:
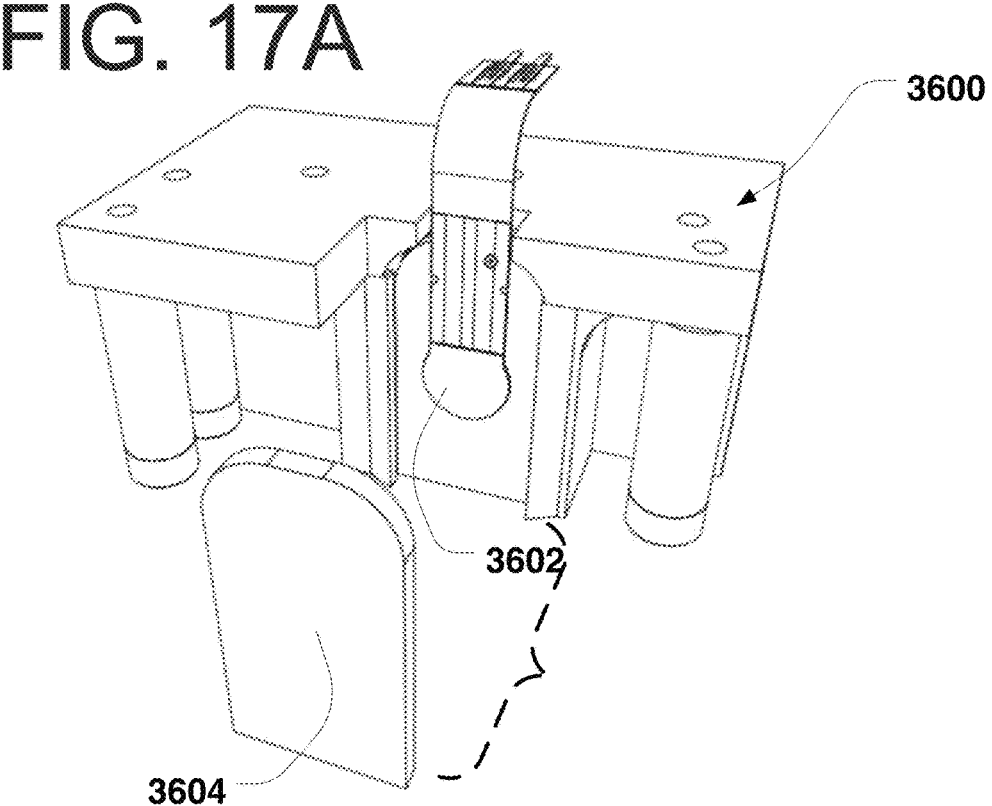
Figure 17B:
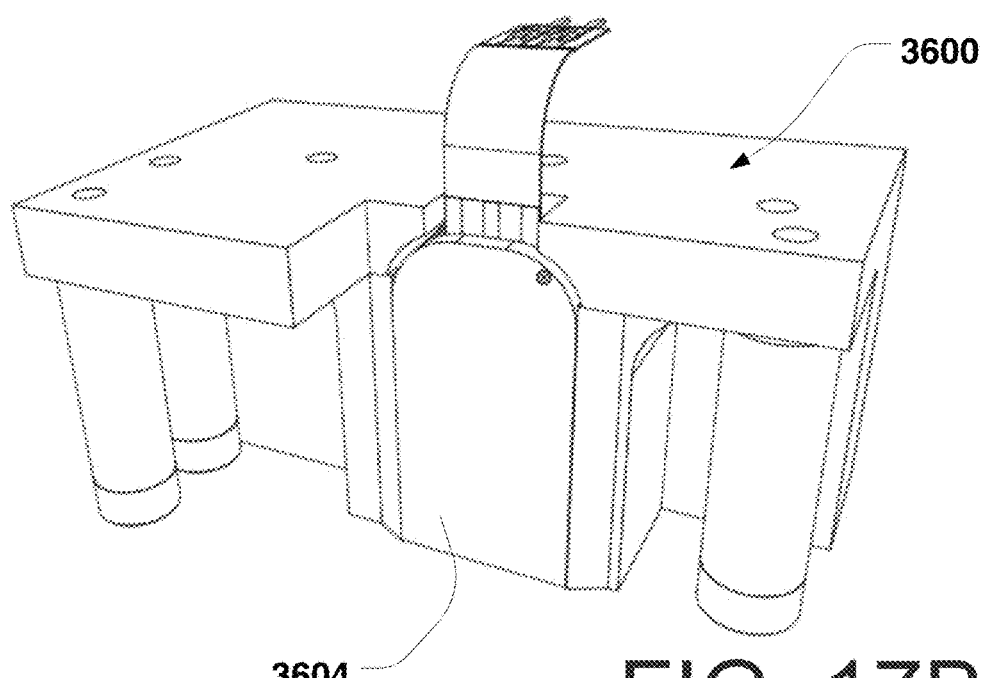
Figure 18:
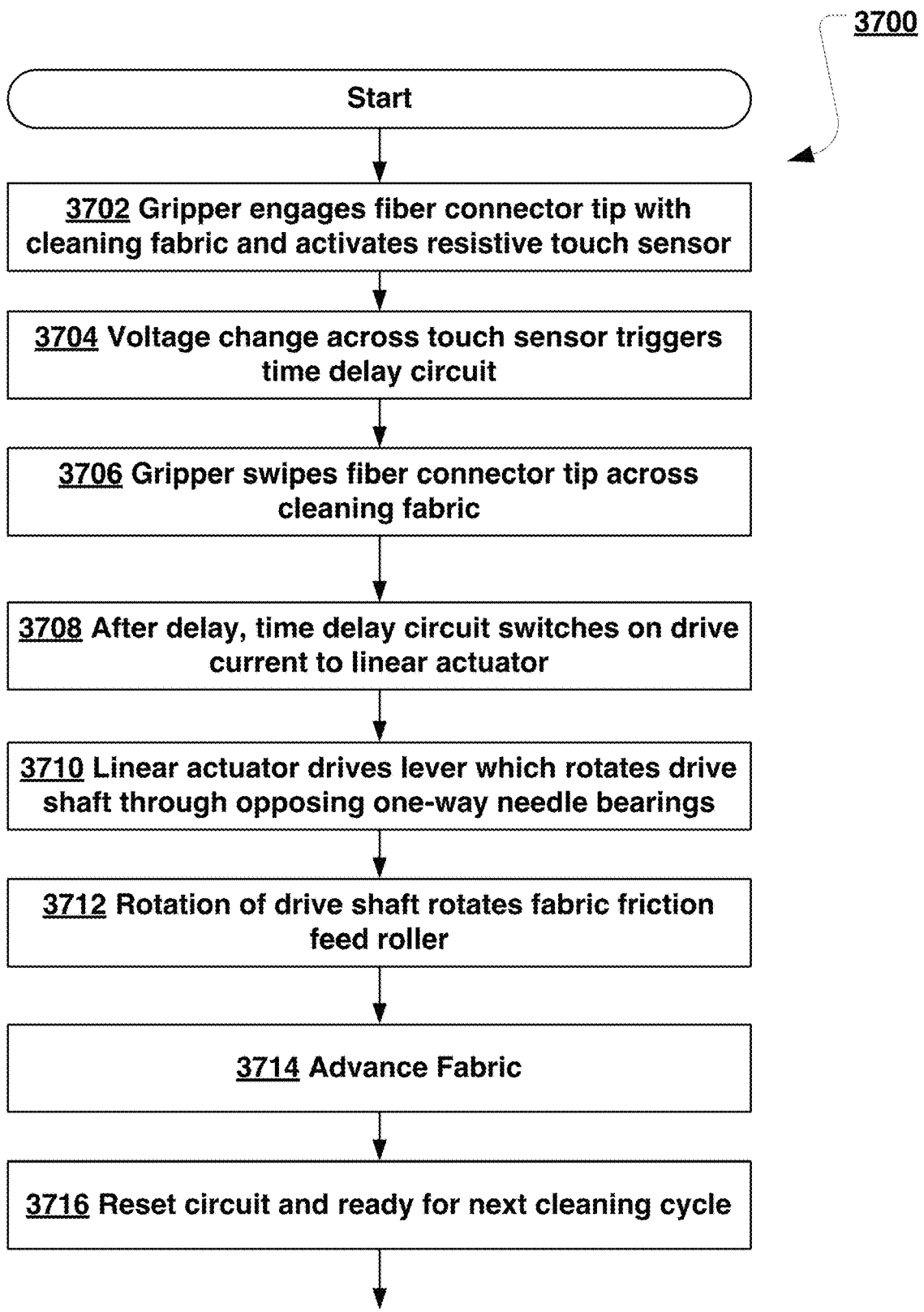

FIGS. 12-13, 14A-14L, 15A-15F, 16, and 17A-17B depict aspects of a cleaning cartridge system according to exemplary embodiments hereof and FIG. 18 is a flowchart depicting operation of a cleaning cartridge system according to exemplary embodiments hereof.

Fiber Optic Tensioning Reel Sub-System

Figure 20A:
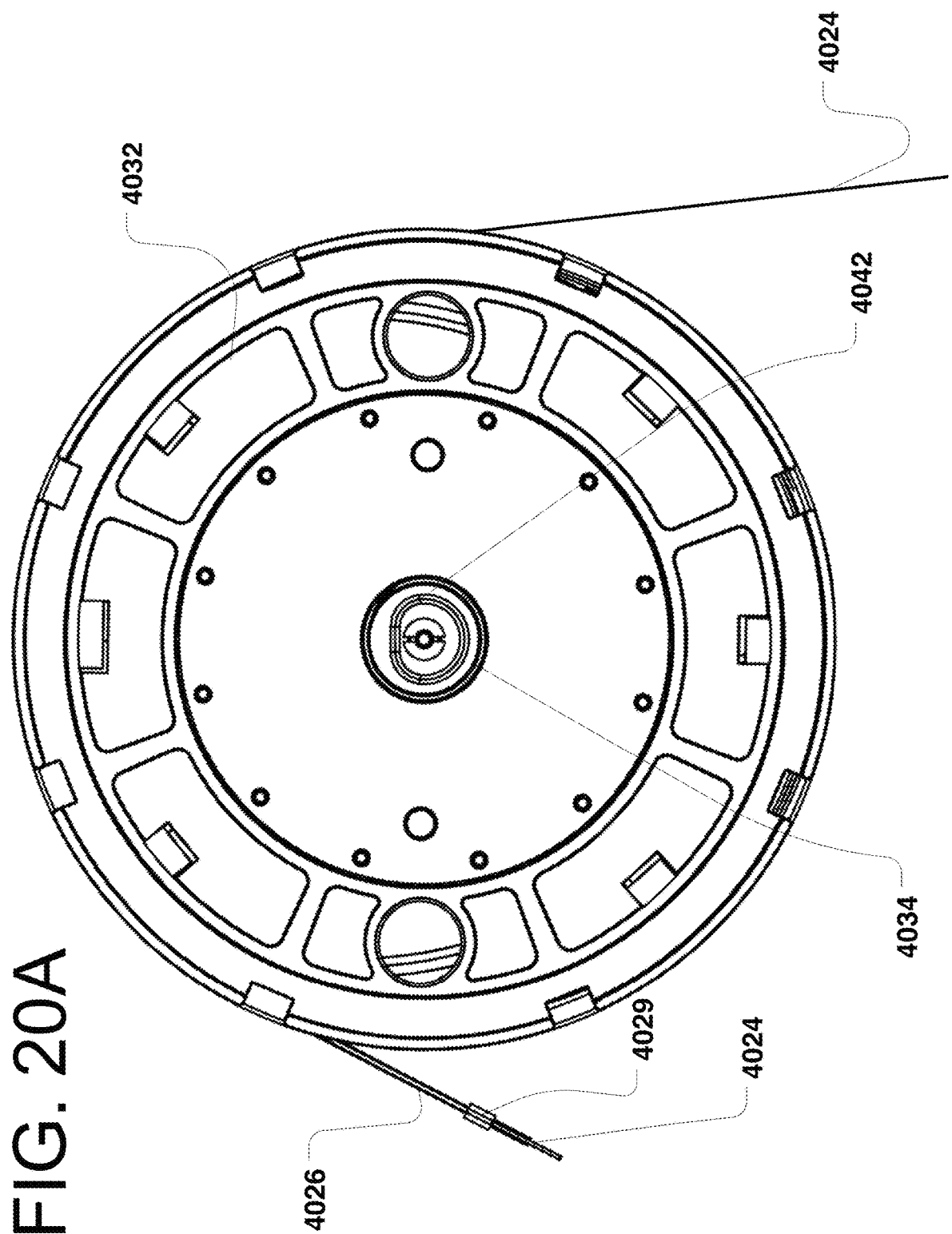
Figure 20C:
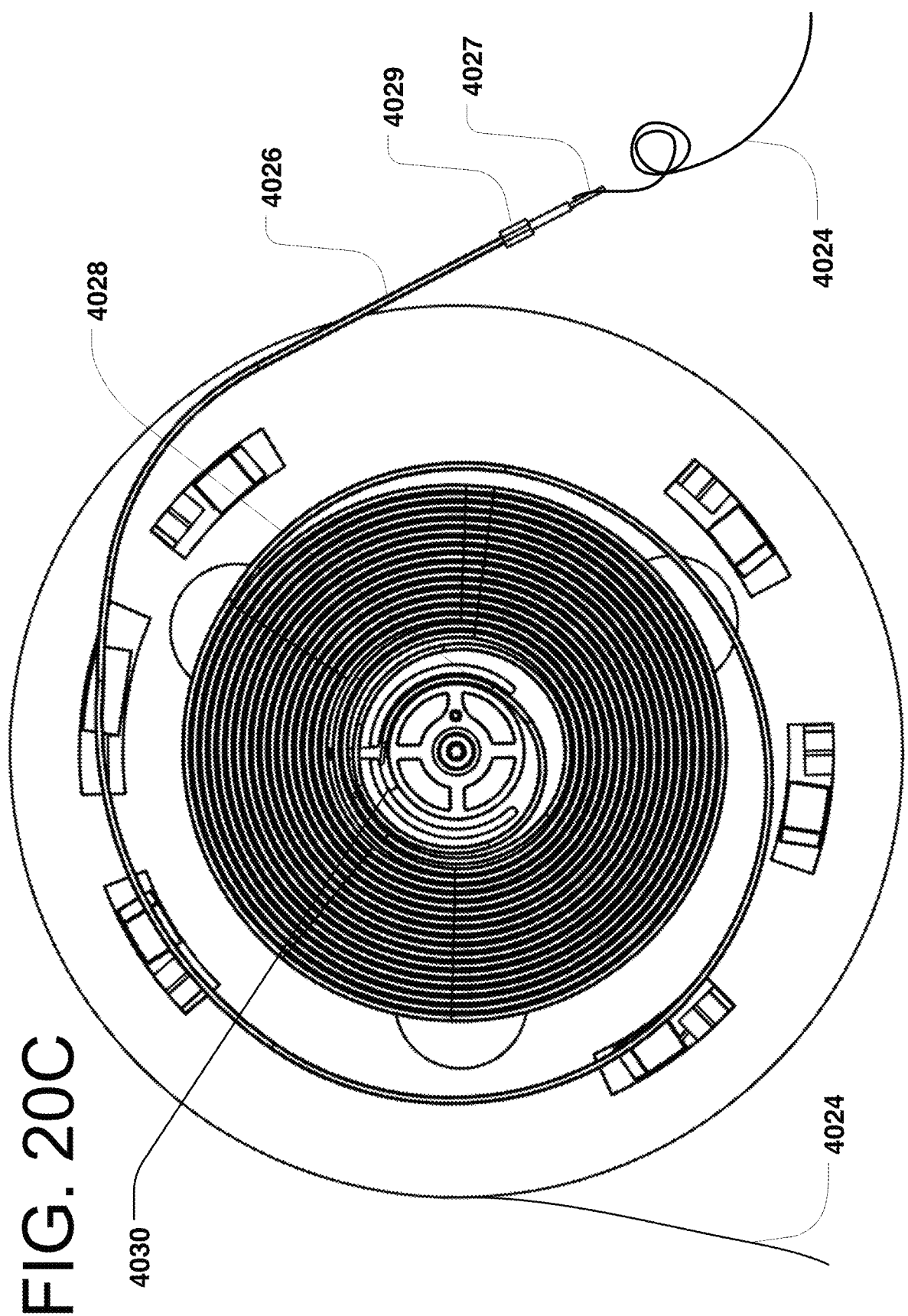
Figure 21:
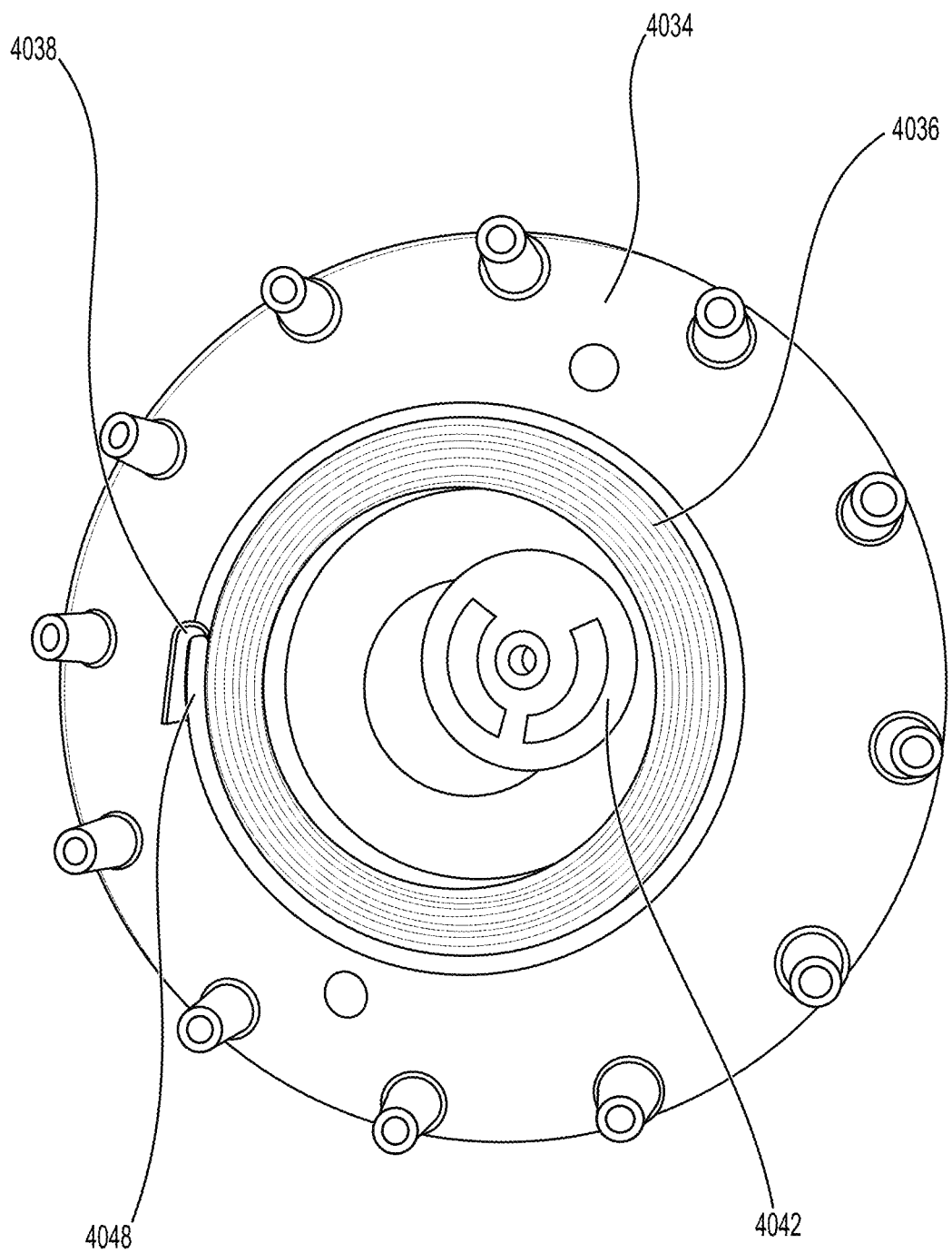
Figure 22:
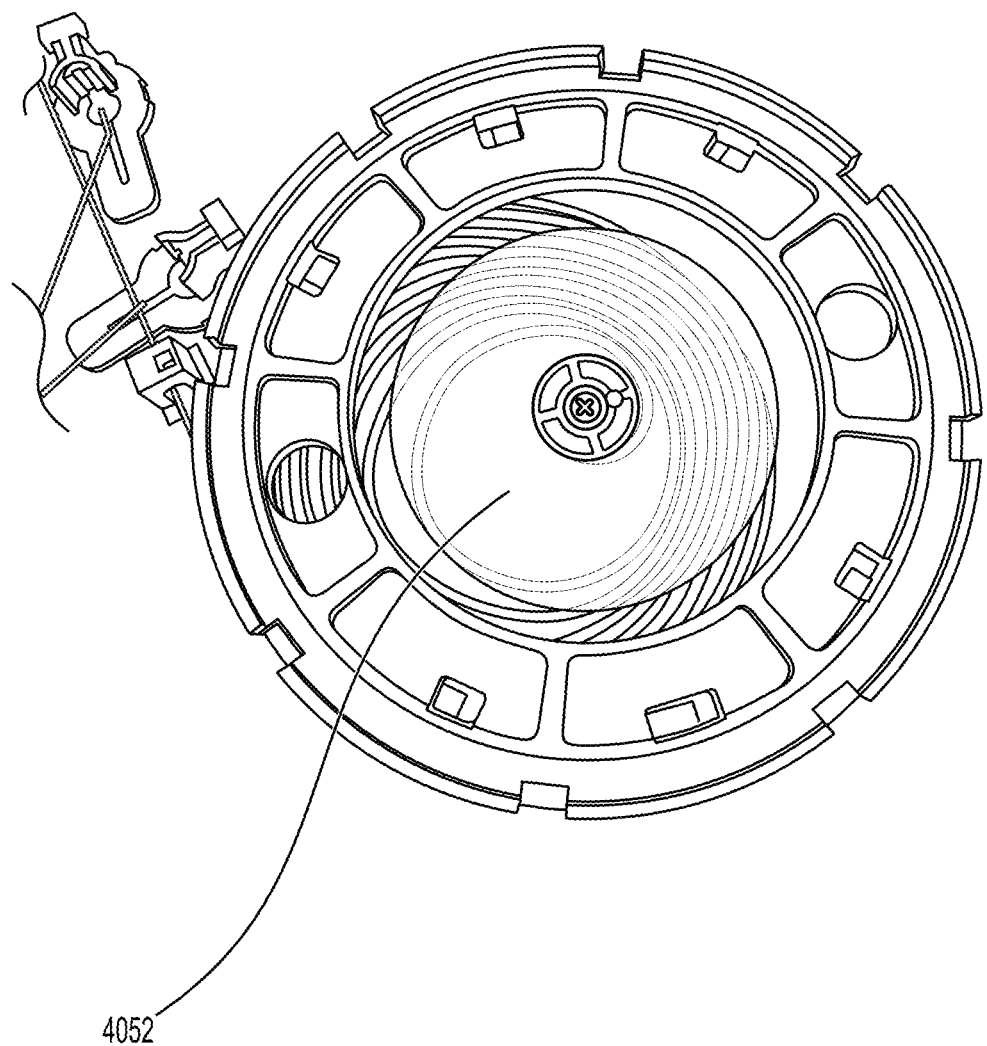

FIG. 19 depicts aspects of an exploded view of a reel system according to exemplary embodiments hereof;

FIGS. 20A-20C depict top, side, and bottom views of aspects of a reel system according to exemplary embodiments hereof; and FIGS. 21-22 depict aspects of a reel system according to exemplary embodiments hereof.

Fiber Optic Tensioning Pulley Sub-System

Figure 23A:
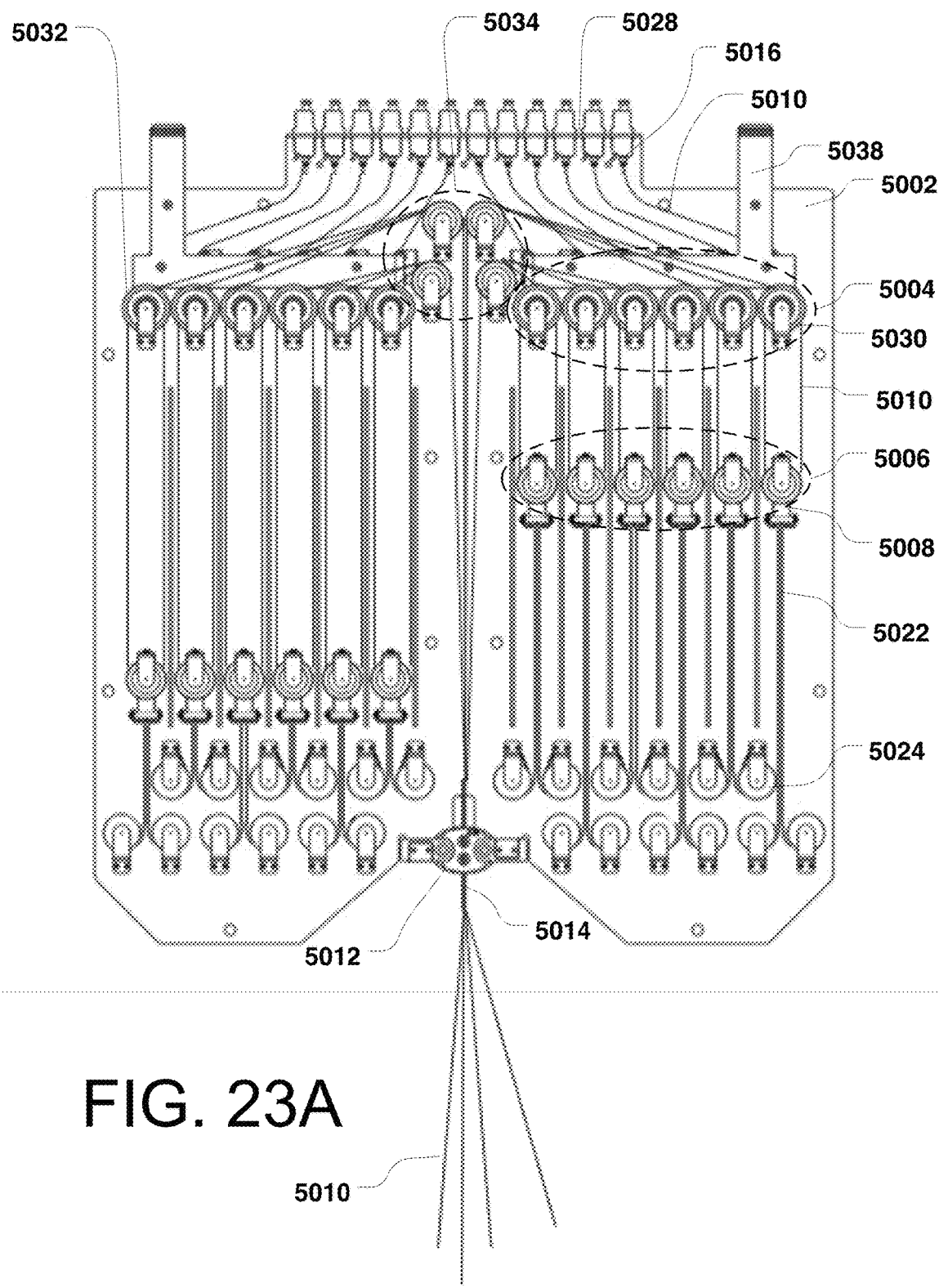
Figure 23B:
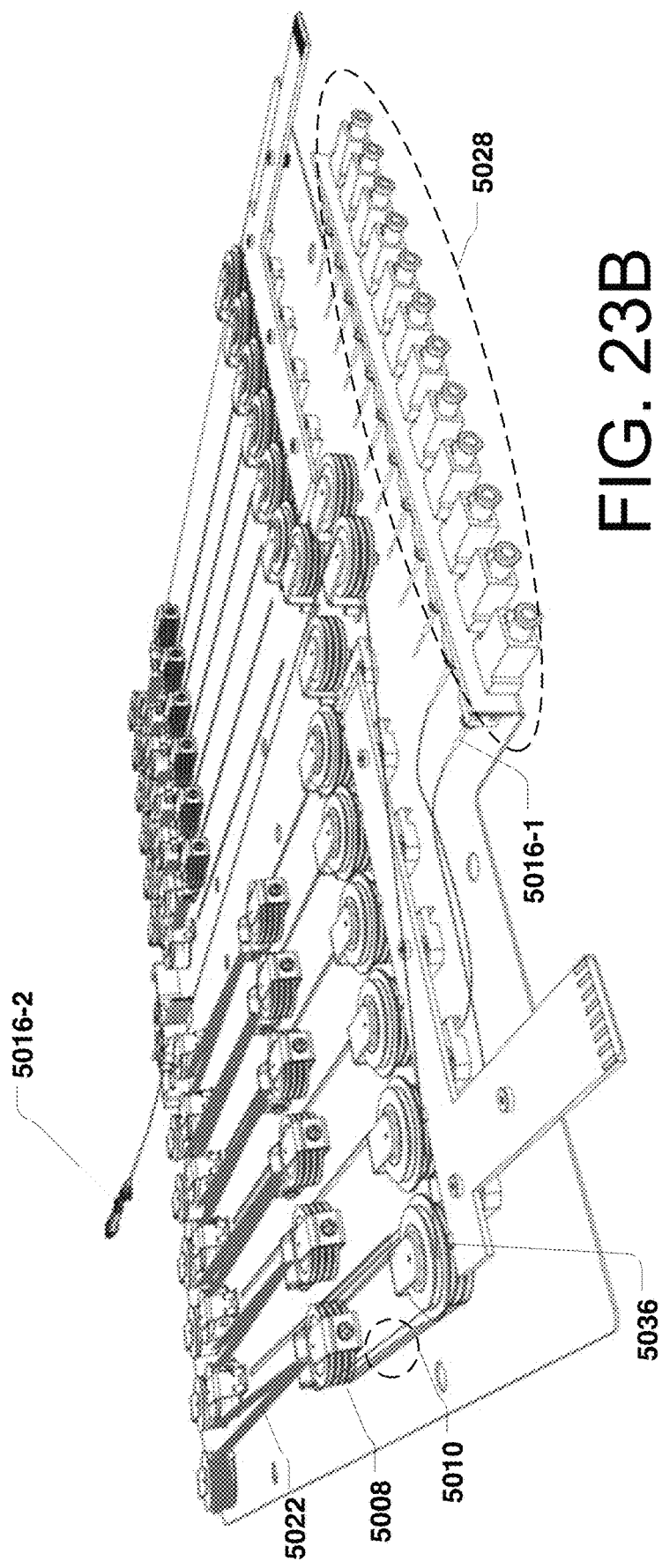
Figure 24B:
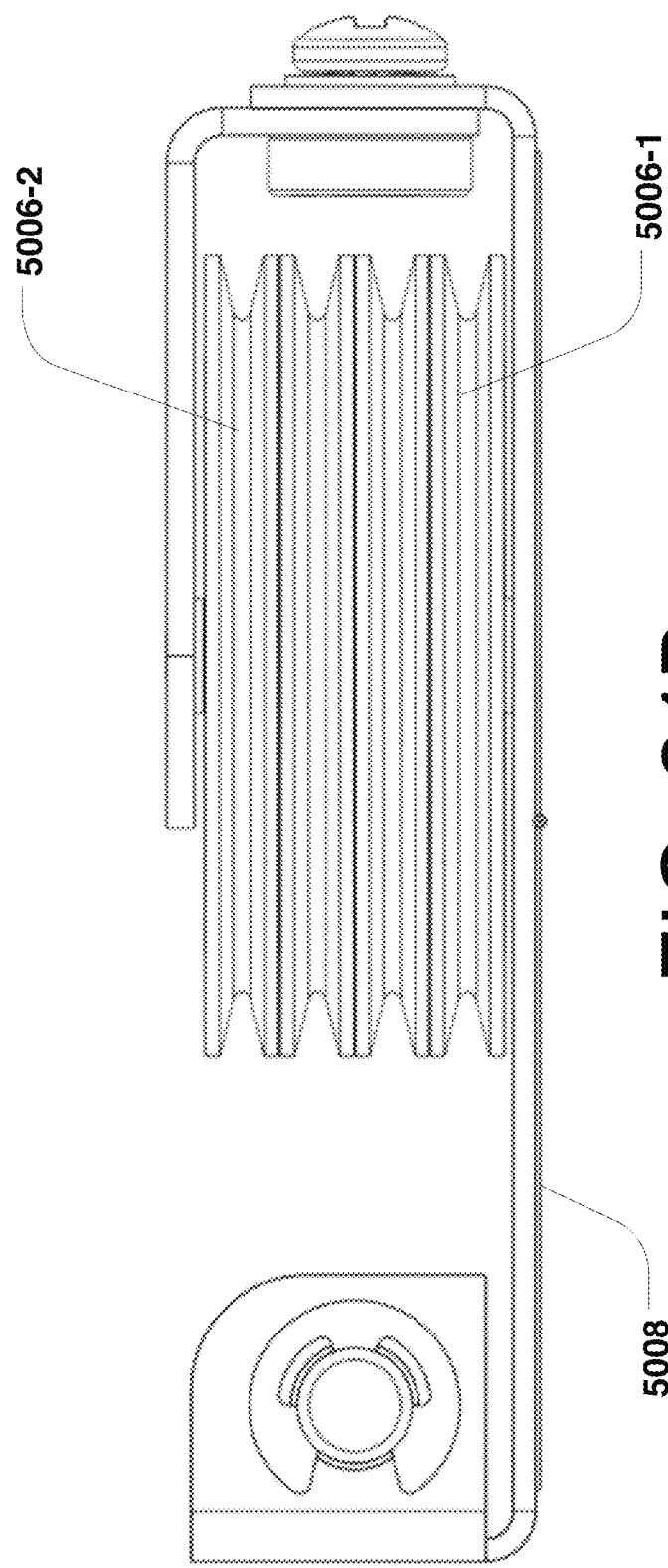
Figure 25A:
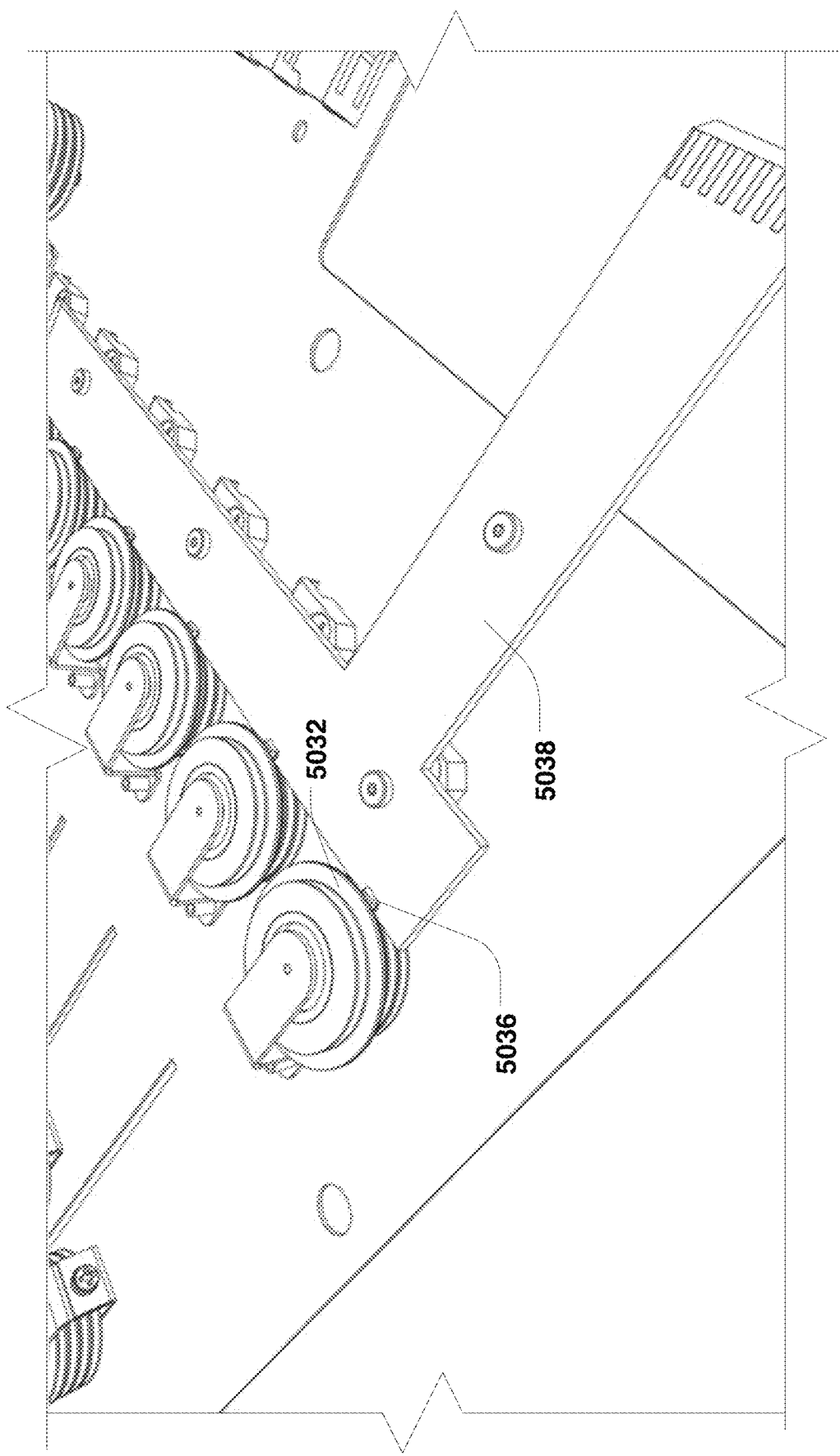
Figure 25B:
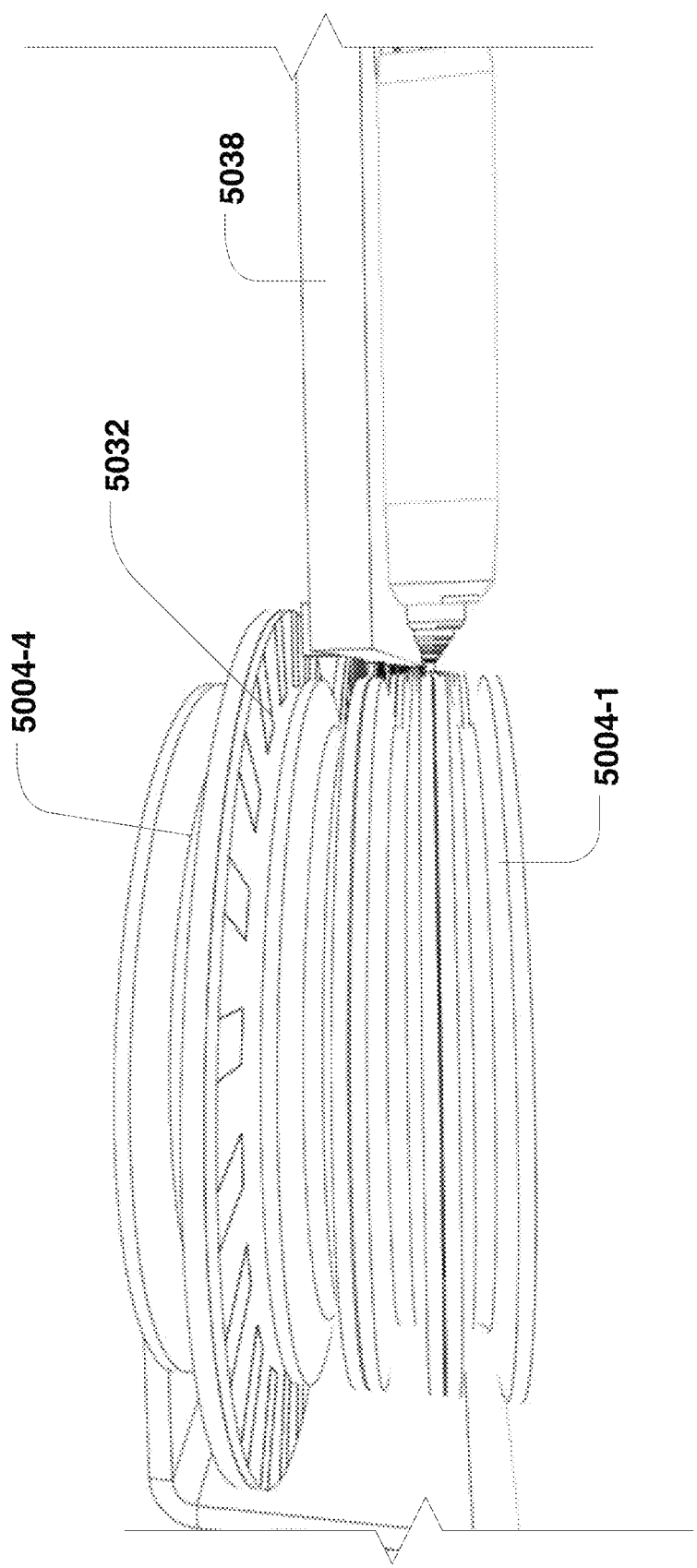

FIGS. 23A-23C illustrate a top and perspective view of aspects of the three-dimensional arrangement of pulleys on a common substrate according to exemplary embodiments hereof;

FIGS. 24A-24B depict aspects of an example moveable pulley system according to exemplary embodiments hereof;

FIGS. 25A-25B depict aspects an example of an electronic pulley rotation detection subsystem; and FIG. 26 is a flow chart of the tensioning process according to exemplary embodiments hereof.

Robotic Cross-Connect System

Figure 27:
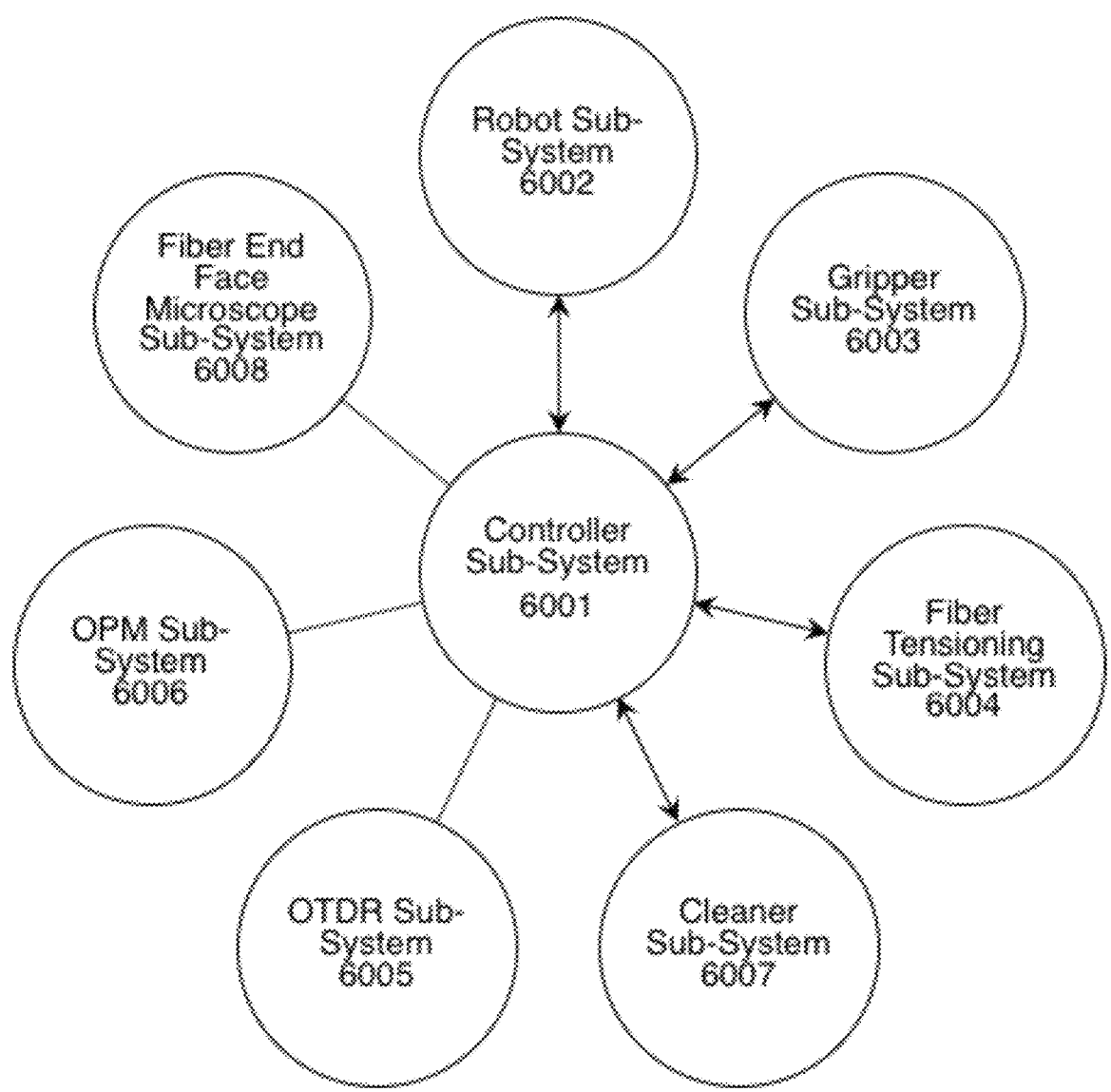

FIG. 27 is a sub-system diagram of the automated cross-connect system according to exemplary embodiments hereof.

DETAILED DESCRIPTION OF THE PRESENTLY PREFERRED EXEMPLARY EMBODIMENTS

A robotic cross-connect system with compact gripper at the end of a telescopic arm to carry a fiber optic connector at the end of an extendable, tensioned fiber retained within a slack management system that prevents entanglement with other tensioned fibers sharing the same volume is disclosed. Methods of plugging, unplugging, cleaning, and tensioning the optical fibers terminated in connectors are also described.

Gripper Sub-System

The gripper sub-system disclosed herein has unique design requirements to ensure that fiber interconnections can be provisioned and reprovisioned over the lifetime of the system without interruption or faults, on demand even after extended periods of inactivity, in a highly compact form factor to fit within the dense fiber interconnect volume inside the cross-connect system. The service lifetime is typically in excess of 10 years. The gripper sub-system must be easily replaceable without the need for skilled labor.

Figure 1A:
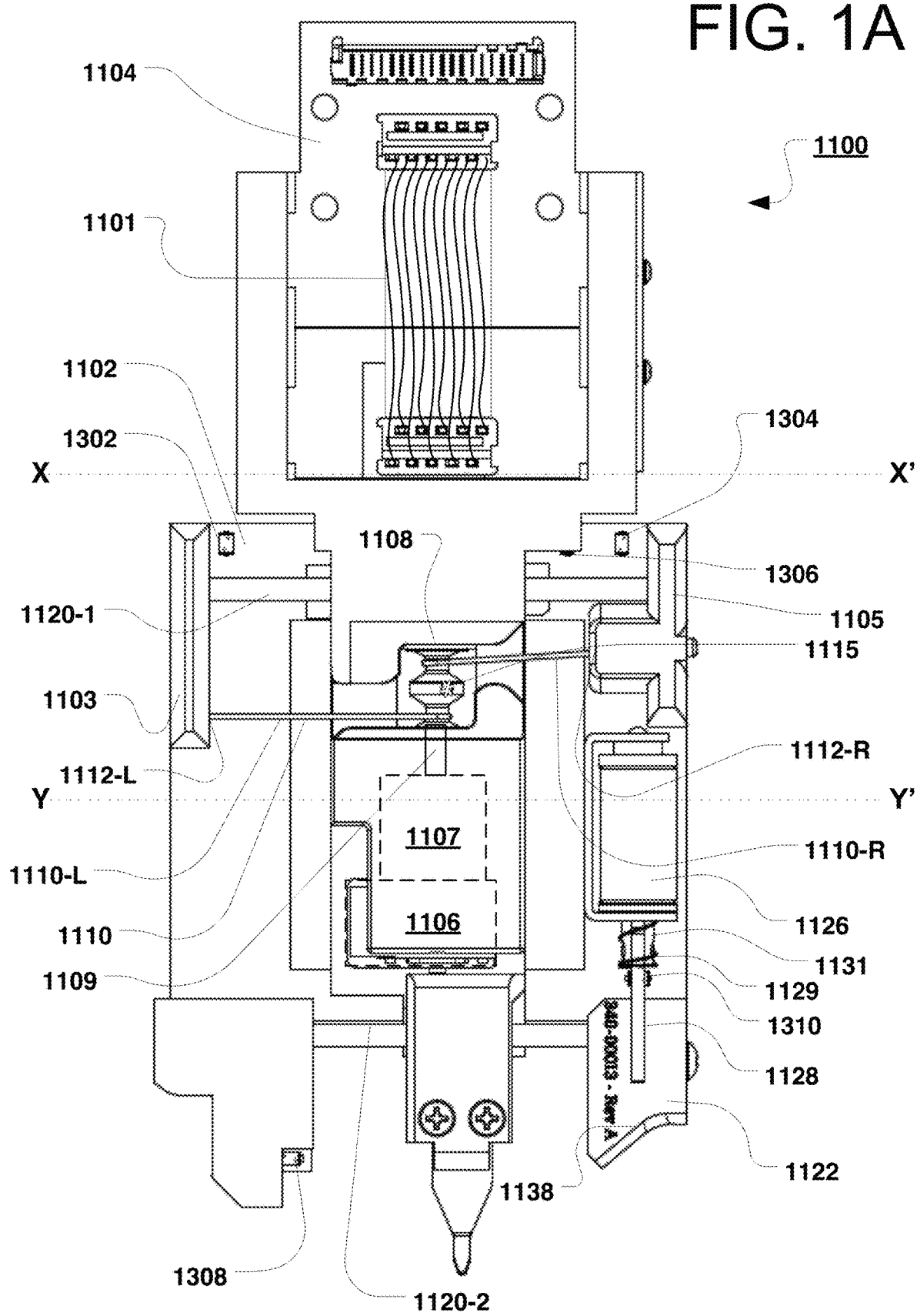
Figure 1B:
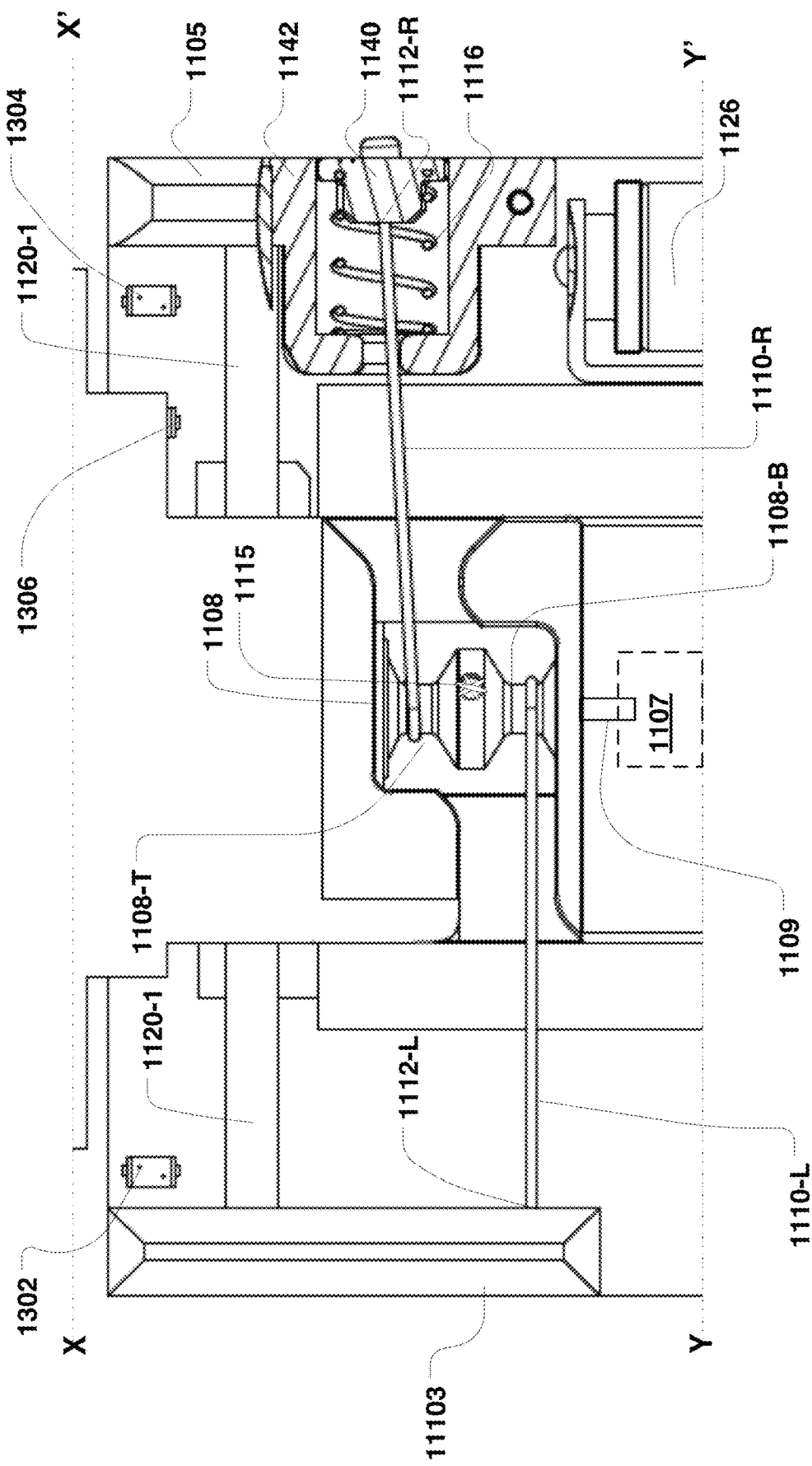
Figure 1C:
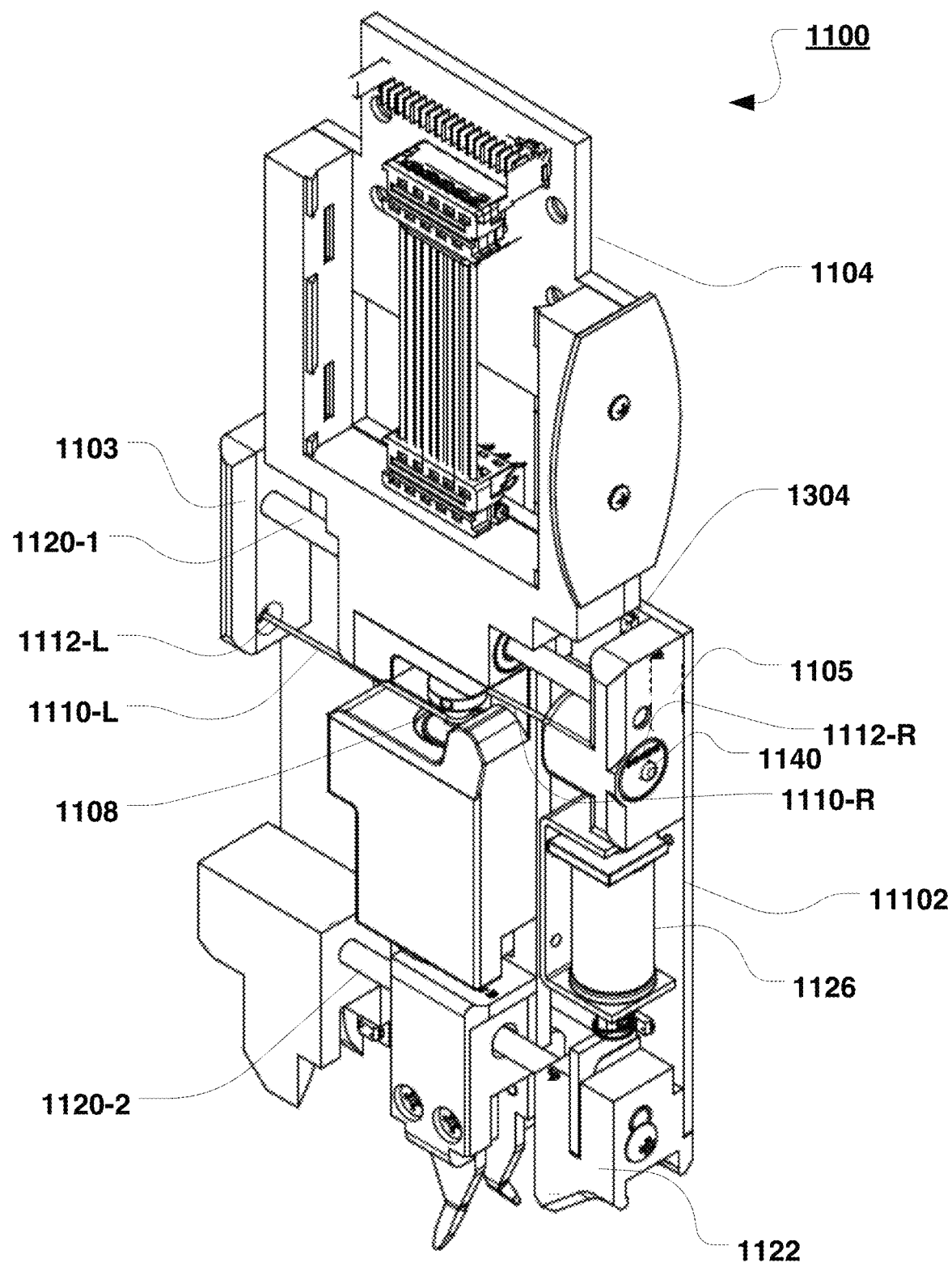
Figure 1D:
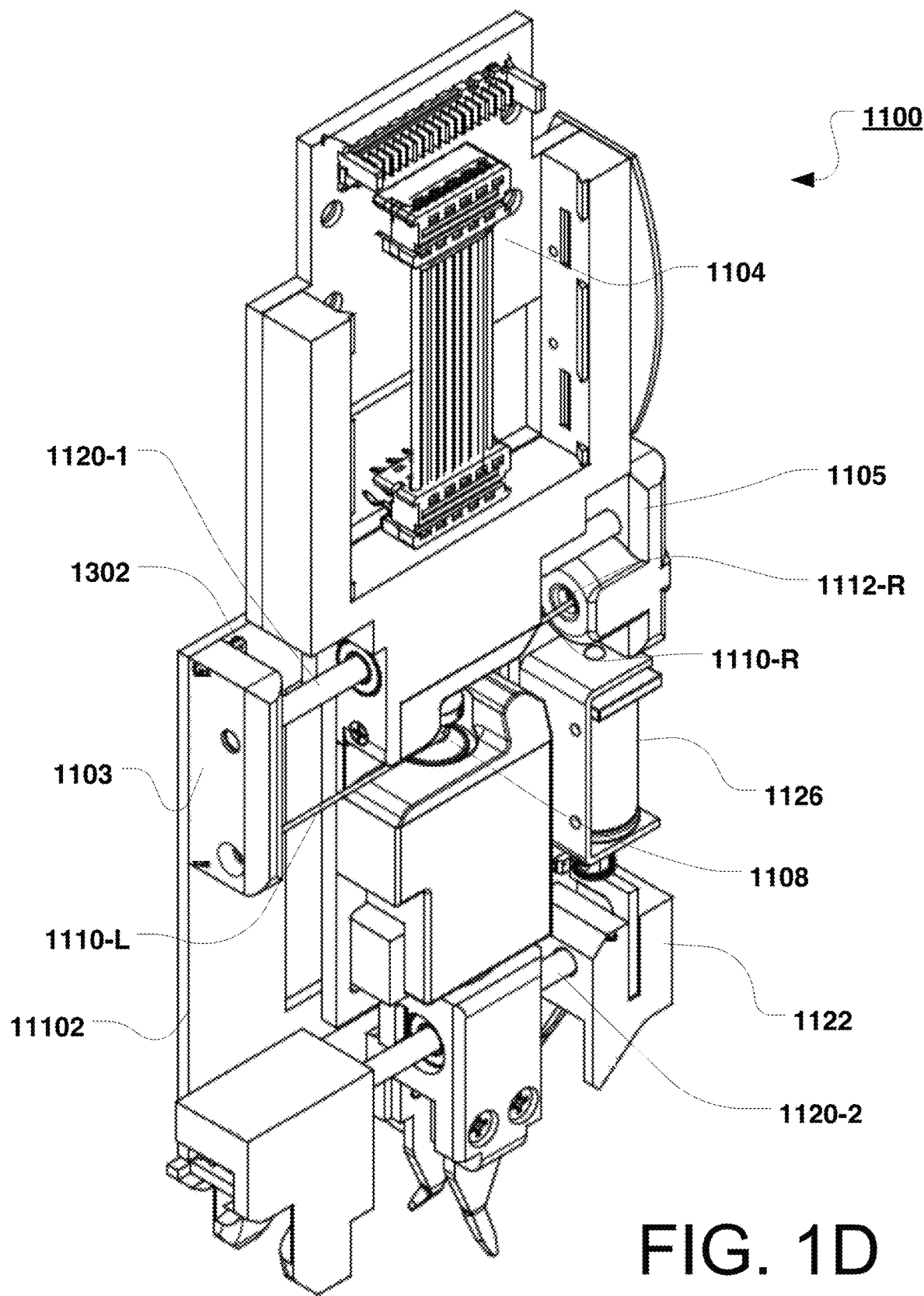
Figure 1E:
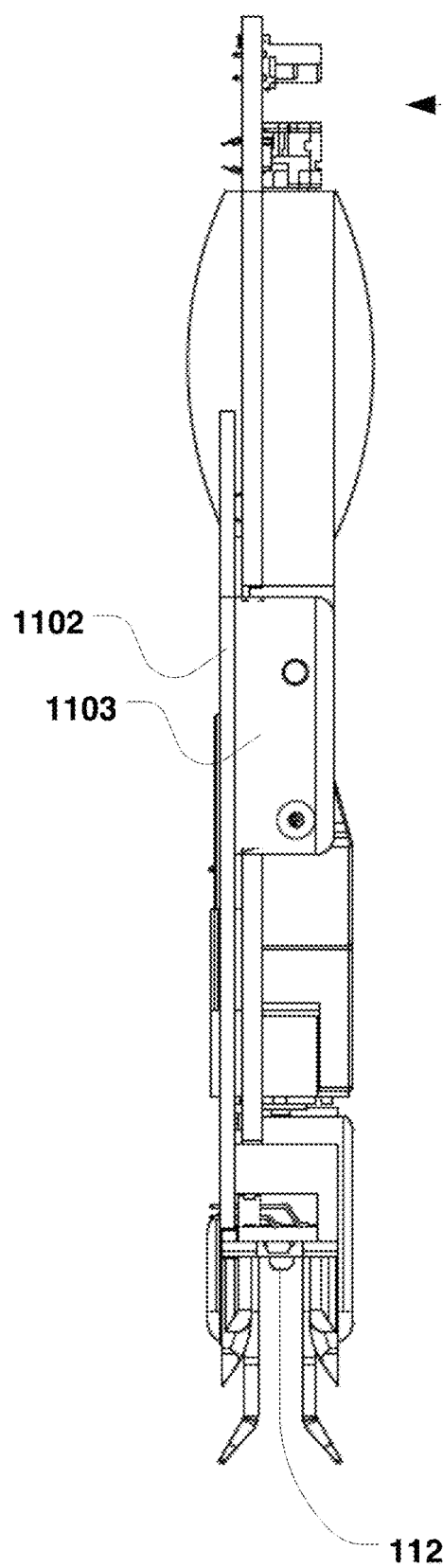
Figure 1F:
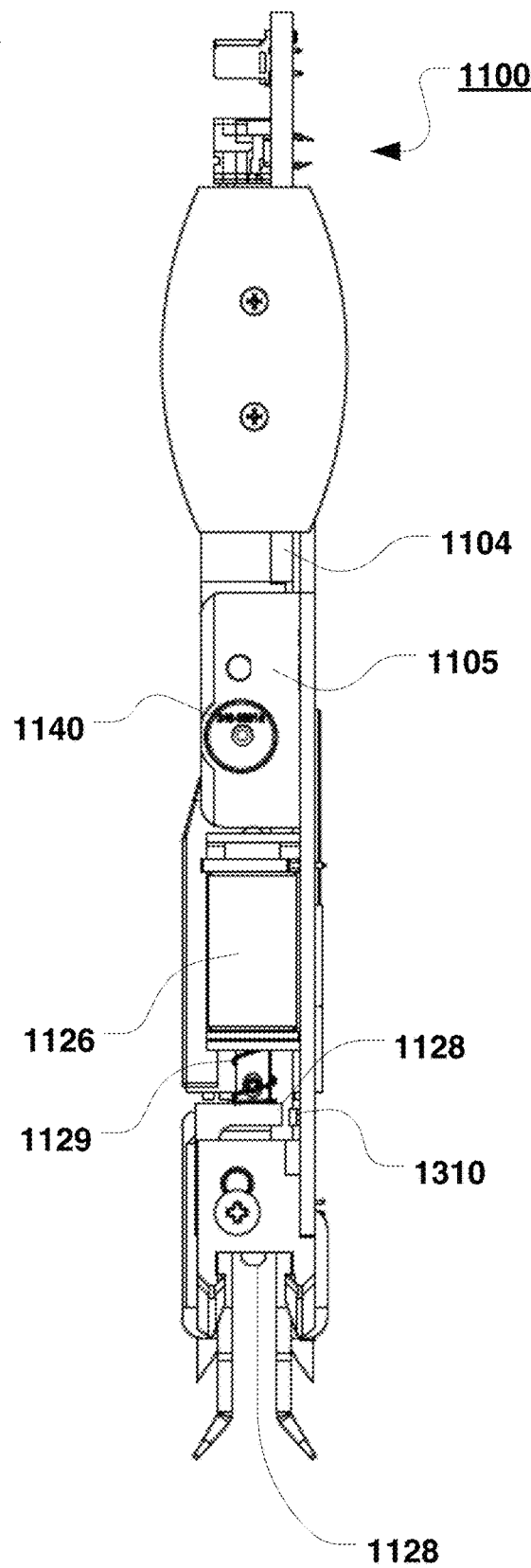
Figure 3:
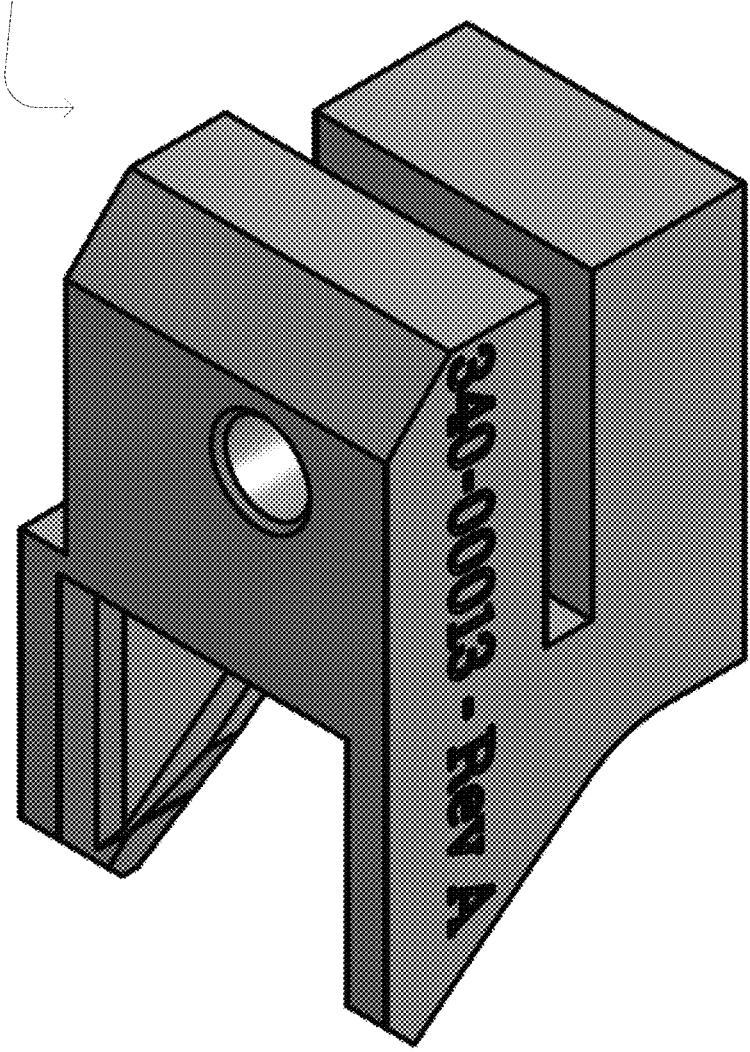

FIG. 1A depicts aspects of a gripper assembly 1100 according to exemplary embodiments hereof. FIG. 1B is an enlarged and partially exposed version of the gripper assembly 1100 of FIG. 1A, between the lines X-X' and Y-Y'. With reference to FIGS. 1A-1F a gripper assembly 1100 for use, e.g., in a high-reliability robot cross-connect system is described. The gripper assembly 1100 may be positioned, e.g., at the end of telescopic arm or the like (not shown), and may be moved, e.g., using a two-axis robotic actuation system, and the gripper is actuated by an external electronic controller (e.g., as shown in U.S. Pat. No. 10,345,526, the entire contents of which are hereby fully incorporated herein by reference for all purposes).

The gripper assembly 1100 comprises two closely adjacent printed circuit boards (PCBs), a lower printed circuit board 1102 and an upper printed circuit board 1104 lying in a narrow vertical plane. The gripper assembly 1100 also includes multiple sensors (including unplug sensor 1302, allocate sensor 1304, unallocate sensor 1306, row sensor 1308, and solenoid latch sensor 1310) and actuators, the signals of which are electrically interfaced to an external circuit through a connector. Electrical signals between the two printed circuit boards may be transferred by a flexible ribbon cable 1101 (shown in FIG. 1A) that is able to flex, and the printed circuit boards translate in direction nominally perpendicular to length of ribbon cable. The individual jacketed wires of the ribbon cable are singulated along a length in a section at the middle of ribbon. This facilitates the relative movement of the wires by reducing the stiffness of cable in the translation direction.

An exemplary gripper assembly 1100 includes a motor 1106, for example a permanent magnet stepper motor with integral gearbox 1107 which rotates a gripper drive dual drum 1108 (via shaft 1109). The dual drum 1108 (e.g., as shown, e.g., in FIGS. 2A-2D) has a top drum 1108-T and a bottom drum 1108-B. The top and bottom drums preferably have the same diameter, and preferably rotate together and at the same rate. The outer diameter of the permanent magnet stepper motor is approximately 12 mm to 15 mm, and it is encased within a heat sink mount with built-in temperature sensing. The diameter of the narrow portions of the drum is approximately 3 mm. The drum is supported at either end by rotary ball bearings 1111-1, 1111-2.

A filament or drive string 1110 passes through a hole 1113 in the drum's mandrel to go from the top drum 1108-T to the bottom drum 1108-B. For example, the midpoint of the string is knotted, and both ends of the string pass through the hole 1113. After exiting the hole 1113, one end of string wraps around bottom drum and the other end wraps around top drum. A knot 1115 anchors the string so the ends cannot be pulled through the hole 1113 and the drive string 1110 does not slip. The smallest dimension of the knot is larger than the diameter of the hole. The string has an outer diameter of 0.5 to 1 mm and is of a braided construction, such that constituent strands are woven together, is highly flexible, and is readily able to wrap about the small diameter drum.

For the purposes of this description, the portion of the drive string 1110 on the right of the drum (in FIG. 1A) is denoted 1110-R, and the portion of the drive string 1110 on the left of the drum 1108 (in FIG. 1A) is denoted 1110-L. An end 1112-L of the drive string 1110 (of string portion 1110-L) is attached to an outer structure 1103 which is mounted (e.g., with two screws) to the printed circuit board 1102. The outer structure 1103 may be 3D printed, molded, or machined. The thickness of the printed circuit boards is generally in the range of 1 mm to 3 mm. The typical thickness of printed circuit board 1102 is approximately 1.5 mm. The circuit board substrate material comprises fiberglass such as FR-4 or a carbon fiber reinforced composite.

As shown in FIG. 1B, an end 112-R of the drive string 1110 (110-R) may be attached to a spring retaining part 1140 which is fitted into one end of the spring 1116 and housed by the spring retaining housing 1142. The spring retaining part 1140 and housing 1142 may be 3D printed, molded, or machined parts. The thickness of circuit board 1104 is approximately 2.5 mm and is relatively thick to provide increased stiffness. The spring 1116 to which the string is attached preferably enables about 5-10 mm of compression before bottoming out. The string is highly inelastic, so the spring provides compliance when or if the gripper motor is driven into a hard stop during operation. In the absence of the spring compliance, the motor's gearbox would be subjected to relatively large forces upon impact. Such forces can potentially wear and ultimately damage the teeth of the individual gears within the gearbox. In a particular example, the gearbox is a planetary gearbox with a reduction ratio of about 100 to 1, wherein the individual gears are injection molded plastic such as nylon, acetal, or PEEK.

The drum 1108 preferably has rounded flanges so that the drive string 1110 does not wear and ultimately fail due to abrasion caused by the string repeatedly rubbing on the drum flanges. The flanges have a diameter of about two times the minimum diameter along the length of the mandrel. In one example, the minimum diameter is 3 mm and the flange diameter is about 6 mm. Reducing the minimum diameter increases the maximum tension that can be applied to the string.

The drive string 1110 is preferably a zero stretch, high strength, flexible drive string for efficient force transfer. A present implementation uses braided Vectran HT string with a diameter of 0.73 mm. This drive string 1110 is, for example, a high-performance multifilament spun yarn made of liquid crystal polymer (LCP). It has high strength and virtually no creep or elongation. The inventor has found that the Vectran string noted above has superior abrasion resistance, low creep, and excellent moisture resistance over a broad range of temperatures. The string has 57 kg (~125 pound) tensile strength.

The gripper assembly 1100 is able to unplug any fiber connector from among an array of fiber connectors inserted along connector rows, then transport that connector (as necessary), and then plug that fiber connector into a connector plug. The direction of movement to plug or unplug fiber connectors is parallel to the long axis of rods 1120-1, 1120-2.

The gripper assembly 1100 may include an engagement portion including a solenoid 1126 with a spring-loaded solenoid latch 1128 to engage with a fiber optic connector. The latch is mechanically coupled to a rear connector engagement element, the engagement element having an internal low friction ramp 1138 and latch blade 1128 (e.g., as shown in FIGS. 5A-5B in which an elongated fiber optic connector 1500 engages with the engagement portion of 1122 in order to connect or disconnect optical fiber 1502). The ramp features are important to the sliding action of the gripper when interacting with a connector and are detailed in FIG. 3 and FIGS. 4A-4E. The solenoid 1126 is electrically actuated by an external controller to raise the latch 1128 as shown in FIG. 5A-5B so that the fiber connector is able to be released from the gripper as the gripper pulls back and leaves the connector in its corresponding port. The latch 1128 is spring loaded with a compression spring 1129 concentric with the moveable solenoid core 1131 so that the fiber connector remained mechanically latched within the gripper even when the gripper is unenergized. The down or equivalently the "engaged" position of the latch is detected with a miniature optical sensor 1310 that transmits and detects light reflected off the latch 1128.

Winding the drive string 1110 on the rotating drum 1108 (by forward operation of the stepper motor 1106) pulls the outer structure 1103, riding on parallel rods 1120-1, 1120-2, to the right (in FIGS. 1A and 1B), towards the structure 1105, by winding portions of drive string 1110-L and unwinding portions of drive string 1110-R around the bottom drum 1108-B and top drum 1108-T, respectively.

Alternatively, winding the drive string 1110 on the rotating drum 1108 in the opposite direction (by reverse operation of the stepper motor 1106) pulls the outer structure 1103, riding on parallel rods 1120-1, 1120-2, to the left, away from the structure 1105, by unwinding portions of drive string 1110-L and winding portions of drive string 1110-R around the bottom drum 1108-B and top drum 1108-T, respectively. The total travel distance from left to right of the outer structure is about 20 mm. The winding drive string mechanism is able to generate a linear force of over 20 Newtons when moving the outer structure 1103 in either direction relative to the printed circuit board 1104 to which motor is attached.

The position of the slidable outer structure 1103 and potentially the optical fiber connector 1500 engaged therein is sensed by a multiplicity of optical sensors (1302, 1304, 1306, 1308, 1310) attached to the circuit board that are detected by controller electronics. The linear force generated by the stepper motor is proportional to the drive current output by the stepper motor driver electronics. The current is adjustable by the controller so that the linear force can vary from zero up to 40 N.

By spring loading the drive string 1110, the string may remain taut and end-stop collisions may be avoided. The ideal spring constant is selected to enable the gripper to generate a plug-in force on connector of about 10 N without fully compressing the compression spring. The compression spring serves as a soft bumper when the gripper reaches the end of travel, thereby guarding against motor and/or gearbox damage.

Figure 6A:
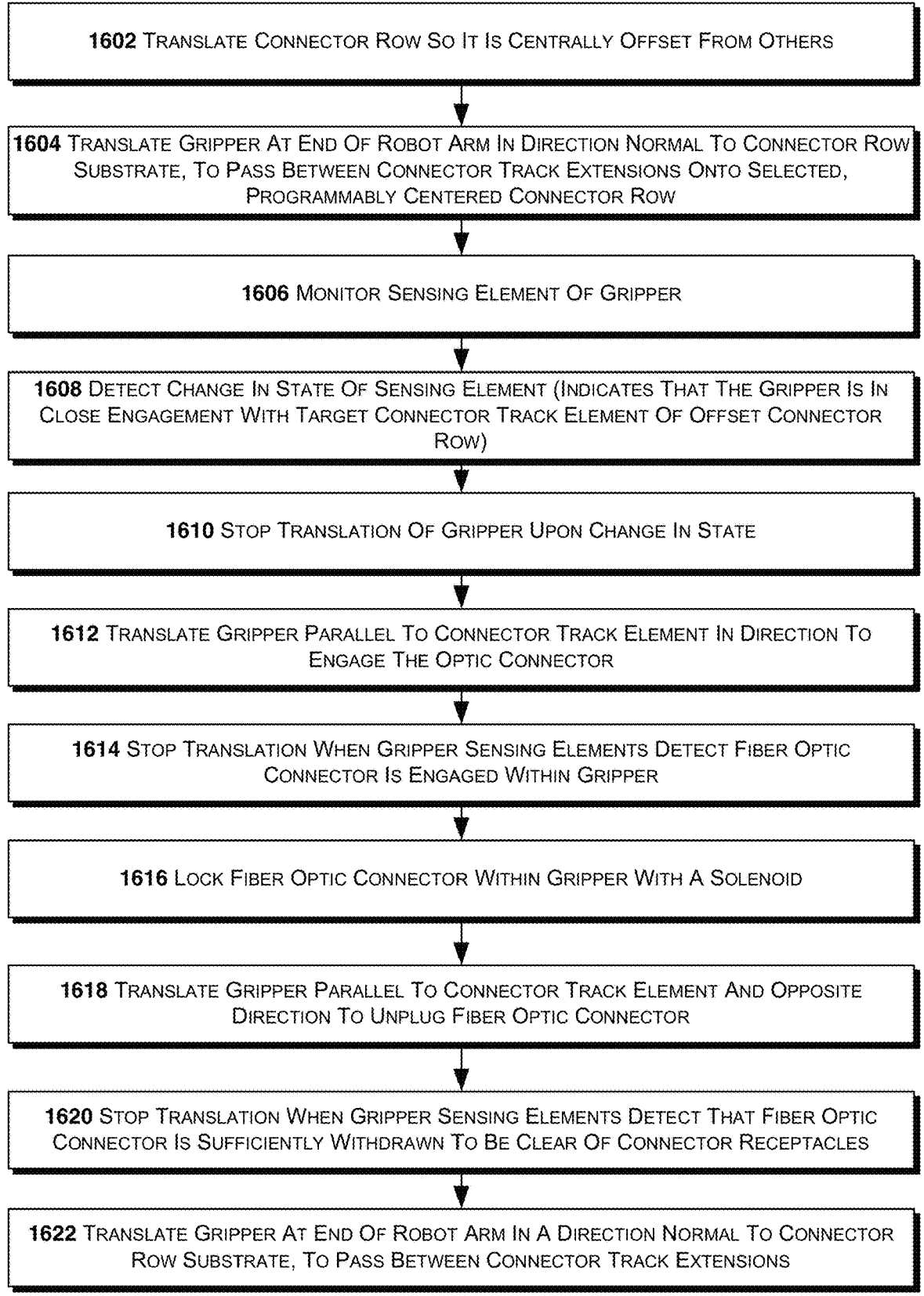
FIG. 6A is a flowchart depicting aspects of an unplug operation of the gripper assembly according to exemplary embodiments hereof.

In a further example, FIG. 6A illustrates the multi-step process under the control of a computer to unplug a fiber connector from an internal port within the NTM so that it can be moved and reconfigured and moved within the multiplicity of surrounding fibers with multiple process validation steps to ensure the successful completion of each step of the process.

With reference to the flowchart in FIG. 6A, the exemplary unplugging process includes translating one connector row, so it is centrally offset from the others (at 1602). The process further includes translating (at 1604) the gripper at the end of the robot arm in a direction normal to connector row substrate, to pass between connector track extensions onto a selected, programmably centered connector row. The process further includes (at 1606) monitoring the sensing element of gripper. The process further includes (at 1608) detecting a change in the state of the sensing element, which indicates that the gripper is in close engagement with a target connector track element of the offset connector row. The process further includes (at 1610) stopping the translation of gripper upon the change in state. The process further includes (at 1612) translating the gripper parallel to connector track element in a direction to engage the fiber optic connector. The process further includes (at 1614) stopping the translation when the gripper sensing elements detect that the fiber optic connector is engaged within the gripper. The process further includes (at 1616) locking the fiber optic connector within the gripper with a solenoid. The process further includes (at 1618) translating the gripper parallel to connector track element and opposite the direction to unplug the fiber optic connector. The process further includes (at 1620) stopping the translation when the gripper sensing elements detect that the fiber optic connector is sufficiently withdrawn to be clear of the connector receptacles, and (at 1622) translating the gripper at the end of the robot arm in a direction normal to the connector row substrate, to pass between connector track extensions.

Figure 6B:
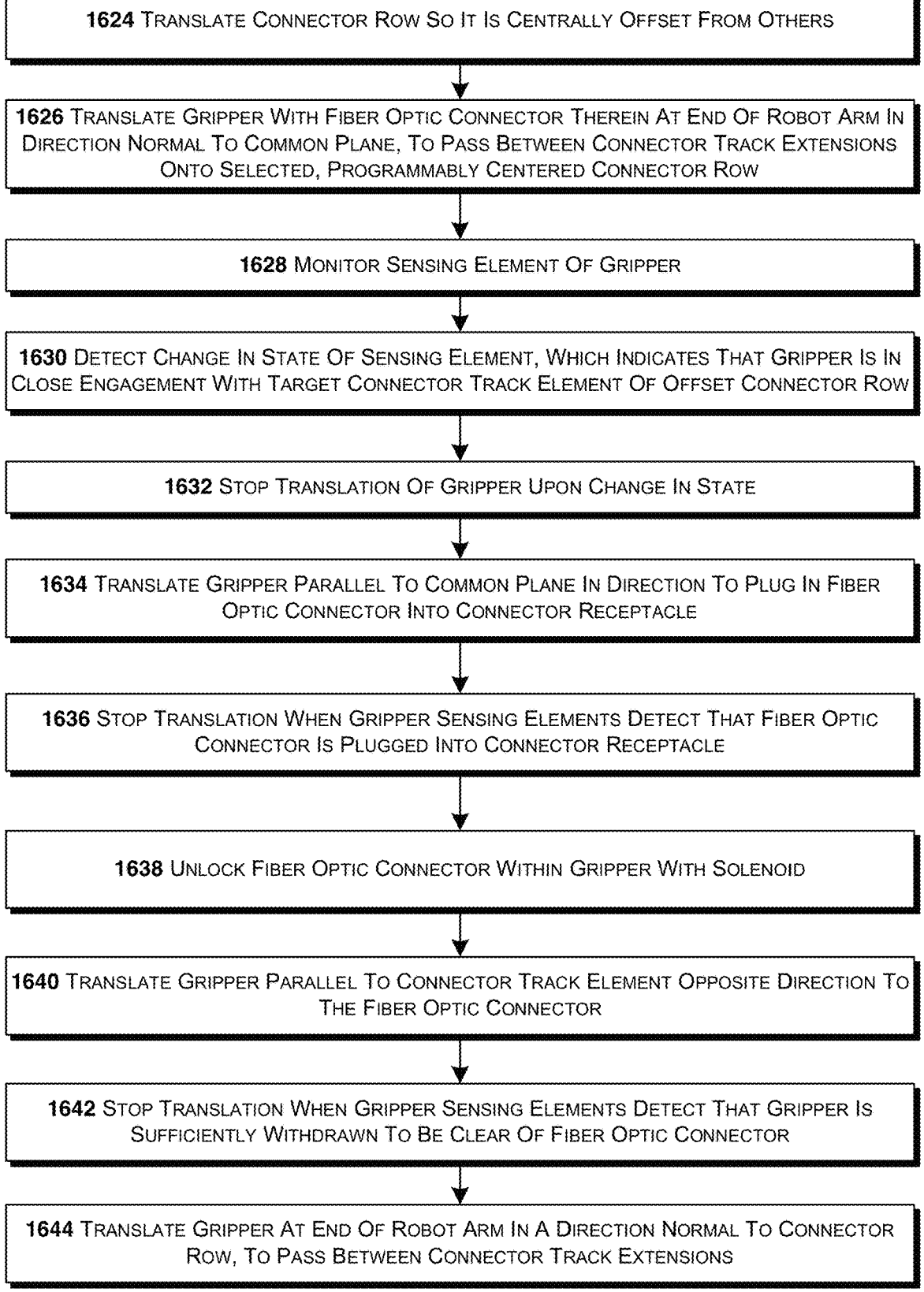
FIG. 6B is a flowchart depicting aspects of a plug-in operation of the gripper assembly according to exemplary embodiments hereof.

FIG. 6B illustrates the multi-step process under the control of a computer to plug-in a fiber connector from an internal port within the NTM so that it can be moved and reconfigured and moved within the multiplicity of surrounding fibers with multiple process validation steps to ensure the successful completion of each step of the process.

With reference to the flowchart in FIG. 6B, the exemplary plug-in process includes (at 1624) translating one connector row so it centrally offset from the others; (at 1626) translating the gripper with the fiber optic connector therein at the end of the robot arm in a direction normal to the common plane, to pass between connector track extensions onto a selected, programmably centered connector row. The process further includes (at 1628) monitoring the sensing element of gripper; and (at 1630) detecting a change in state of a sensing element, which indicates that the gripper is in close engagement with a target connector track element of the offset connector row. The process further includes (at 1632) stopping the translation of gripper upon the change in state. The process further includes (at 1634) translating the gripper parallel to common plane in a direction to plug in the fiber optic connector into connector receptacle, and (at 1636) stopping the translation when the gripper sensing elements detect that the fiber optic connector is plugged into the connector receptacle. The process further includes (at 1638) unlocking the fiber optic connector within the gripper with a solenoid; and (at 1640) translating the gripper parallel to connector track element opposite the direction to plug in the fiber optic connector. The process further includes (at 1642) stopping the translation when the gripper sensing elements detect that gripper is sufficiently withdrawn to be clear of the fiber optic connector; and (at 1644) translating the gripper at the end of the robot arm in a direction normal to the connector row, to pass between connector track extensions.

The gripper has a finite service lifetime and is a consumable that can be changed in the field. In a further example, to improve the field serviceability of the robotic cross-connect, it is advantageous for the gripper sub-system to be replaceable with minimal effort, skill, and labor. A quick-connect mounting design between the removable gripper sub-system and the robot arm subsystem is described below.

FIGS. 7A-7B illustrate a quick connect and disconnect mount to attach the gripper assembly 1100 from the robot arm inner stage 1312 and provide for easy installation, removal and replacement. This eliminates the need for tools or removeable fasteners, which is significant in this application because it prevents the accidental release of tools or fasteners into the dense fiber cross-connect area where it is extremely difficult to locate and retrieve such parts.

The quick connect and disconnect mount includes a combination of a multi-contact electrical interface 1316-1318 and a rigid, vibration tolerant mechanical interface that does not require a tool to remove or lock the gripper into place. In a particular example, a female electrical connector receptacle 1316 on a printed circuit board 1314 is mounted to the inner stage of robot arm 1312. A mating male electrical connector receptacle 1318 is on the printed circuit board 1104 of the gripper assembly. The gripper 1100 is affixed and locked to the arm 1312 by the quick release lock 1320. The quick release 1320, is, for example, a spring loaded knob which is pulled out to release the gripper.

Robot Sub-System

The robot sub-system disclosed herein has unique design requirements to ensure that fiber interconnections can be provisioned and reprovisioned over the lifetime of the system without interruption or faults, on demand even after extended periods of inactivity. The service lifetime is typically in excess of 10 years. Unique designs are required to eliminate the need for routine maintenance (e.g. lubrication, cleaning, etc.). This sub-system also must be easily replaceable without the need for skilled labor.

A robotic assembly 2100 according to exemplary embodiments hereof comprises a translatable, multi-stage telescopic robotic arm (FIG. 8) 2102 on which a gripper assembly (not shown) may be positioned at the end of the arm. The robotic arm provides one axis of translation (i.e. "y direction") in a two-axis robotic actuation system wherein the arm translates in a direction orthogonal to the y direction (i.e. the "x direction"), e.g. as shown in U.S. Pat. No. 10,345,526, the entire contents of which are hereby fully incorporated herein by reference for all purposes). As described in U.S. Pat. No. 10,345,526, the robotic arm is of a narrow width to allow it to descend into a dense fiber optic interconnect volume with no mechanical interference and no contact with surrounding fibers, and of extended depth to provide sufficient rigidity to experience minimal deflection under transverse forces including connector magnet repulsion and potentially oblique tension originating from the fiber being carried in the gripper therein.

With reference again to FIG. 8, the robotic arm 2102 includes an outer stage 2108 and a rectangular hollow channel element 2104 (also referred to as the middle stage or C-channel) within which a linear and narrower lower section or inner stage 2106 may move. The robotic arm 2102 extension axis is in the y direction, and it may move in the orthogonal x direction. The gripper attached at the end of the inner stage is able to translate incrementally in the z dimension.

The middle stage 2104 (the outer C-channel element) is preferably manufactured from hardened, non-magnetic stainless steel (preferably 303 or 304 stainless steel) to prevent corrosion. In a present exemplary implementation, the middle stage is 12.5 cm wide, 50 cm deep, and 75 cm long. Preferably the wall thickness of the middle stage 2104 is 1.0 to 1.5 mm.

The middle stage 2104 may move in the y dimension (i.e., in a vertical direction) through the outer stage 2108, as illustrated in FIGS. 9A-9B. Accordingly, the middle stage 2104 may slide by rollers 2202-1, 2202-2, 2202-3, 2202-4 (collectively and individually 2202) and spring-loaded rollers 2204 in the fixed outer stage 2108. The rollers 2202 are preferably hardened and ground crowned rollers. The mounting mechanism may also include a plurality of spring-loaded lubrication mechanisms 2206-1, 2206-2 . . . 2206-x (collectively and individually spring mechanism 2206) to maintain and/or control a position of the middle stage 2104 within the outer stage 2108 while still permitting smooth and controlled movement of the middle stage. The lubrication prevents galling or wear of the stainless-steel components during long duration rolling contact with one another.

As detailed in FIG. 9B, an exemplary lubrication mechanism 2206 includes a lubrication element 2208 and a spring 2210 positioned in a hole 2212 in the lubrication element 2208. The lubrication element 2208 and spring 2210 are held in place against the upper stage by a housing 2214 screwed to the mounting mechanism. The lubrication element 208 may be, for example, an machinable, oil-impregnated plastic element.

The use of oil-impregnated, spring loaded plastic lubrication elements in which lubrication fluid slowly diffuses out on the time scale of 10 years eliminates the need for maintenance over a 10-20 year lifetime of a robot and extends the lifetime of the telescopic arm to greater than one million cycles. The use of hardened and ground crowned rollers eliminates sharp edges that can degrade the C-Channel (middle stage 2104) and eliminates wear and galling of the outer wall of the C-Channel. Galling (a form of wear caused by metallic adhesion between sliding surfaces) is undesirable because it may lead to particulates that can contaminate the system and potentially collect on the delicate fiber connector end faces therein.

Spring loaded mounting of a subset of rollers to the outer stage has a number of advantages, including providing preload to rollers so that the C-Channel or middle stage is tightly constrained and stable in angular position while moving up and down. The preload force may be selected to be sufficiently high (approximately 10-20 N) to maintain the C-Channel (middle stage 2104) in rigid, precise alignment, but not too high as to cause wear of the rollers and outer surfaces of the C-Channel.

Spring loaded mounting of a subset of rollers to the inner stage has a number of advantages, including providing a slight preload to rollers so that the inner stage is slightly compliant in angular position while moving up and down. The preload force may be selected to be limited (approximately <10 N) to provide compliance and to not cause wear of the rollers on the inner surfaces of the C-Channel.

Example: Kinematic Robot Mounting/Leveling Mechanism

In a further example, to improve the field serviceability of the robotic cross-connect, it is advantageous for the robotic sub-system to be replaceable with minimal effort, skill, and labor. A kinematic mounting design between the removable robot sub-system and the fixed fiber interconnect system is described below.

The base of the robot has three distributed mounting locations near the corners and edge of the robot baseplate, with initially adjustable heights and locations. The heights are determined and locked in place at the time of initial factory alignment of the robot arm relative to the output connector columns. The mounting locations are next determined and locked in place once the system is calibrated.

FIGS. 10A-10L depict aspects of a robot leveling mechanism according to exemplary embodiments hereof. This three-point kinematic mounting of the robot facilitates replacement and maintenance without requiring a tedious realignment process. As shown in FIGS. 10A to 10D, a robotic arm assembly 2300 (corresponding, e.g., to the robotic arm assembly 2100 described above), may be connected to an inner door frame 2304 using a robot base plate 2306 and three (3) adjustable mounting/leveling screws 2308-1, 2308-2, 2308-3.

A top plate 2310 of the inner door frame 2304 has three slotted holes 2312-1, 2312-2, 2312-3, one for each of the screws 2308-1, 2308-2, 2308-3. The combination of three screws and corresponding holes define and provide a three-point leveling plane (as defined by the dashed lines A-A', B-B', and C-C' in FIG. 10G). The position of the base plate 2306 (and thus the robotic arm assembly 2300) relative to the top plate 2310 of door (and thus relative to the inner door frame 2304) may be adjusted and configured in the directions of the arrows shown in FIG. 10H.

FIGS. 10H-10L shows aspects of the connection of the robot base plate 2306 to the inner door frame 2304 with integral top plate 2310. The detail is shown for screw 2308-1, however it should be appreciated that the same approach is used for the other two screws. Screw 2308-1 has a machined slot to allow for flat-head screwdriver adjustment. The screw has, for example a ¼"-20 thread. The screw is held in place with a lock nut 2314 positioned over a washer 2316. A crowned hemispherical surface 2318 on the screw 2308-1 allows the base plate 2306 to adjust in three dimensions axially to the other two adjustment screws without causing distortion of the base plate. A captive nut 2320 is attached to the screw, and a nut 2322 prevents movement after adjustment. Tightening these nuts does not distort the base plate 2306 nor does it distort the door top plate 2310.

The robotic arm described above may be used, e.g., in a robot cross-connect system such as described in Telescent's U.S. Pat. No. 10,345,526, the entire contents of which are hereby fully incorporated herein by reference for all purposes. As described in U.S. Pat. No. 10,345,526, a gripper attached to an end of a robotic arm is able to unplug any fiber connector from among an array of fiber connectors inserted along connector rows, then transport connector and fiber attached thereto in a deterministic, optimal weaving pattern between the surrounding fiber connectors of the array upon manipulation by a robot arm assembly.

Example: Horizontally Telescopic Robot Arm

Figure 11A:
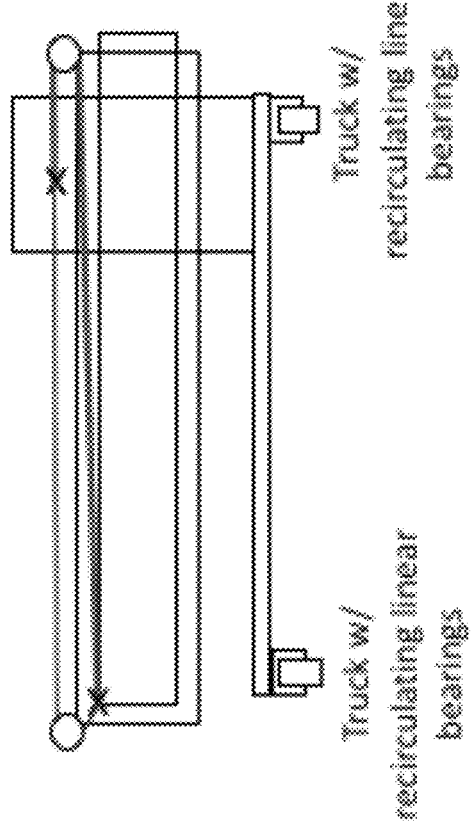
Figure 11B:
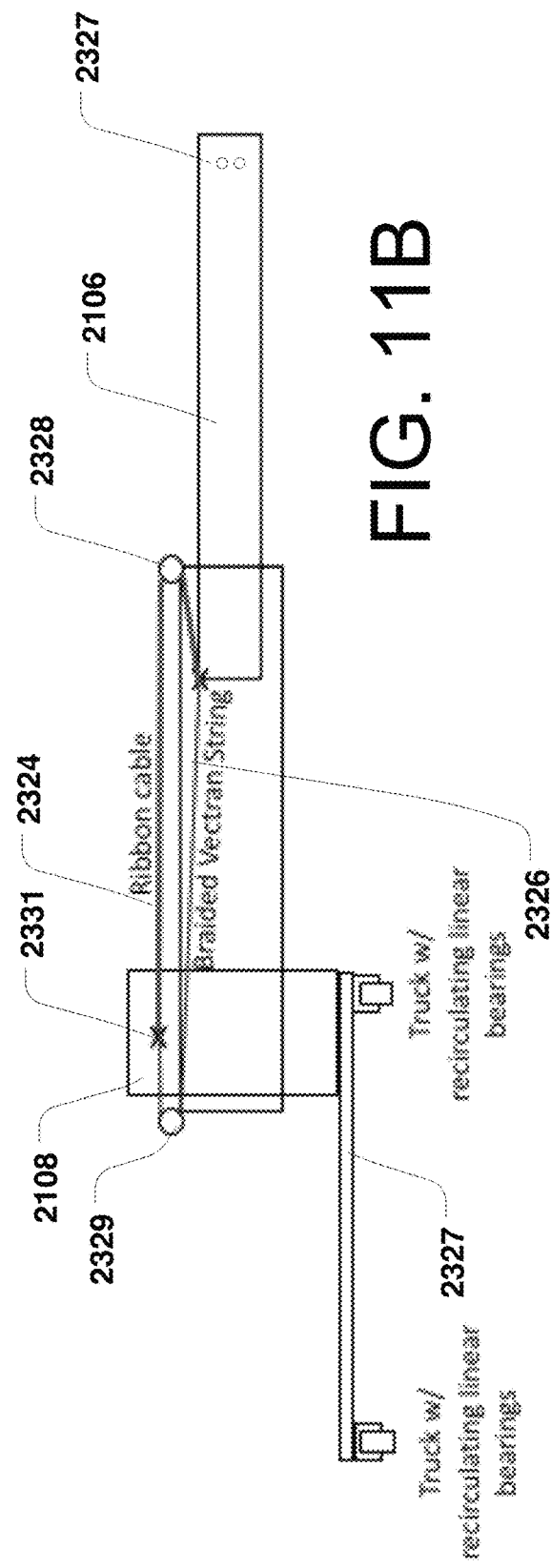

In a further example, FIGS. 11A-11D schematically illustrate aspects of an exemplary telescopic robot configured instead in a horizontal configuration. FIG. 11A shows the telescopic robot in a retracted state, whereas FIG. 11B shows it in an extended state. In this case, while the extension of the middle stage is actively driven by a motor coupled to the middle stage by a timing belt, the extension of the inner stage in the non-vertical direction does not have the assistance of gravity to pull the inner stage downward while supported by the ribbon cable traveling around the pulley at top of middle stage and fixed onto the outer stage.

Therefore, in this particular example, the inner stage is driven outward telescopically with the addition of a flexible drive element, such as a braided Vectran, Kevlar, or other flexible string or timing belt attached to the bottom of the inner stage, and wrapping around a pulley attached to the middle stage and then attached to the outer stage. When the middle stage is driven by the motor/timing belt or lead screw subassembly, motion will be transferred to the inner stage through the opposing combination of (1) the ribbon cable to retract in and (2) the flexible drive element to extend out.

In a specific example, the flexible drive element is a braided Vectran cord with a diameter of 0.5 to 3 mm. The pulley has an outer diameter of about 12 mm and spins on a rotary ball bearing. The Vectran cord is affixed by a clamping means to the outer stage, wherein the clamp allows the cord to be affixed with the proper tension. Adequate tension or "preload" of this flexible drive element is necessary to minimize backlash between when the ribbon cable retracts in the inner arm and the flexible drive element extends out the arm.

In a further fiber cross-connect system example illustrated in FIG. 11B, the robot arm is extendable horizontally and parallel to the 1D backbone within the fiber interconnect volume. This horizontal arrangement is advantageous for height constrained applications of the system because the overhead associated with the robot arm does not contribute the overall system height. This example further illustrates a small form factor robotic cross-connect system that fits within an industry standard 19" data center rack.

This robot subsystem also utilizes the connector gripper, to unplug and plug-in fiber optic connectors to the internal connector panel. This robot subsystem also interfaces to an internal cleaning cartridge, which cleans the connector end face.

Cleaning Cartridge Sub-System

The cleaning cartridge sub-system disclosed herein ensures that consistently clean optical fiber end faces are maintained within the sealed cross-connect enclosure and over the lifetime of the system. The cleaning process is based on a spool of commercially available cleaning fabric with the addition of actuation and sensing means to enable the robot to clean with high precision and repeatability. The cleaning cartridge sub-system is a consumable that can be quickly replaced when the fabric is exhausted.

Figure 12:
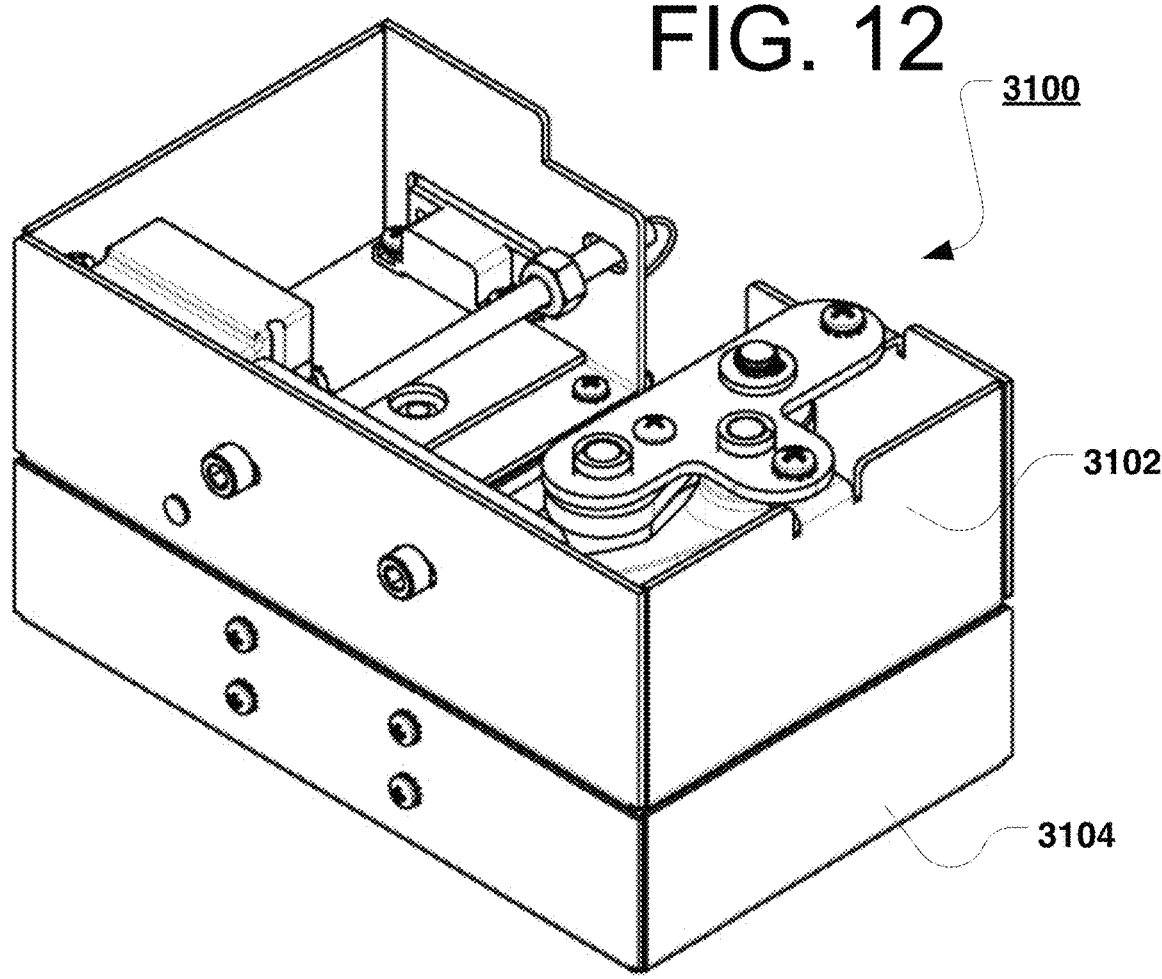
Figure 13:
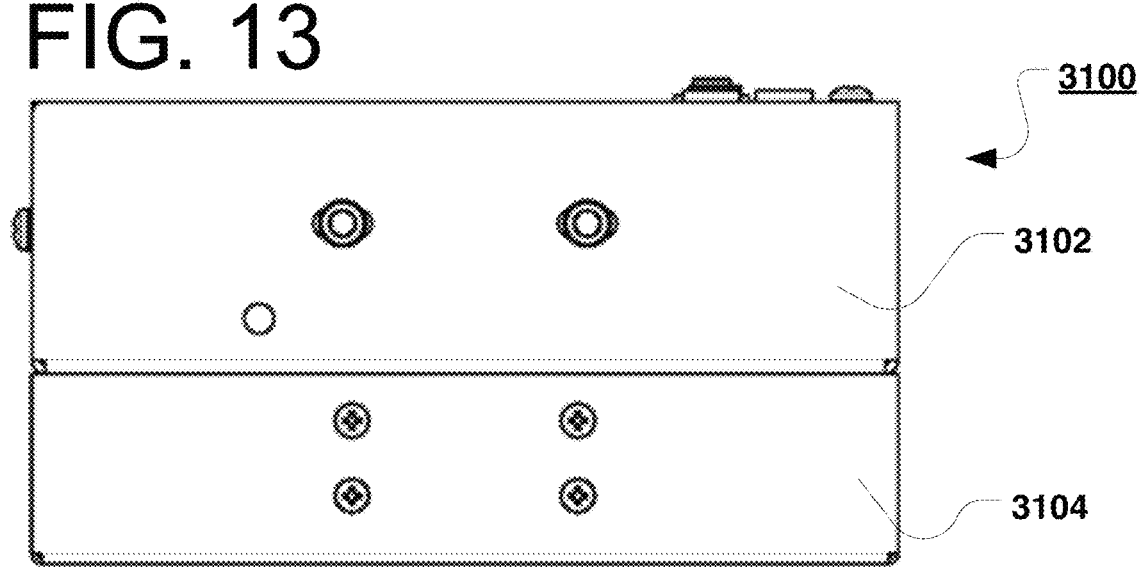
Figure 14C:
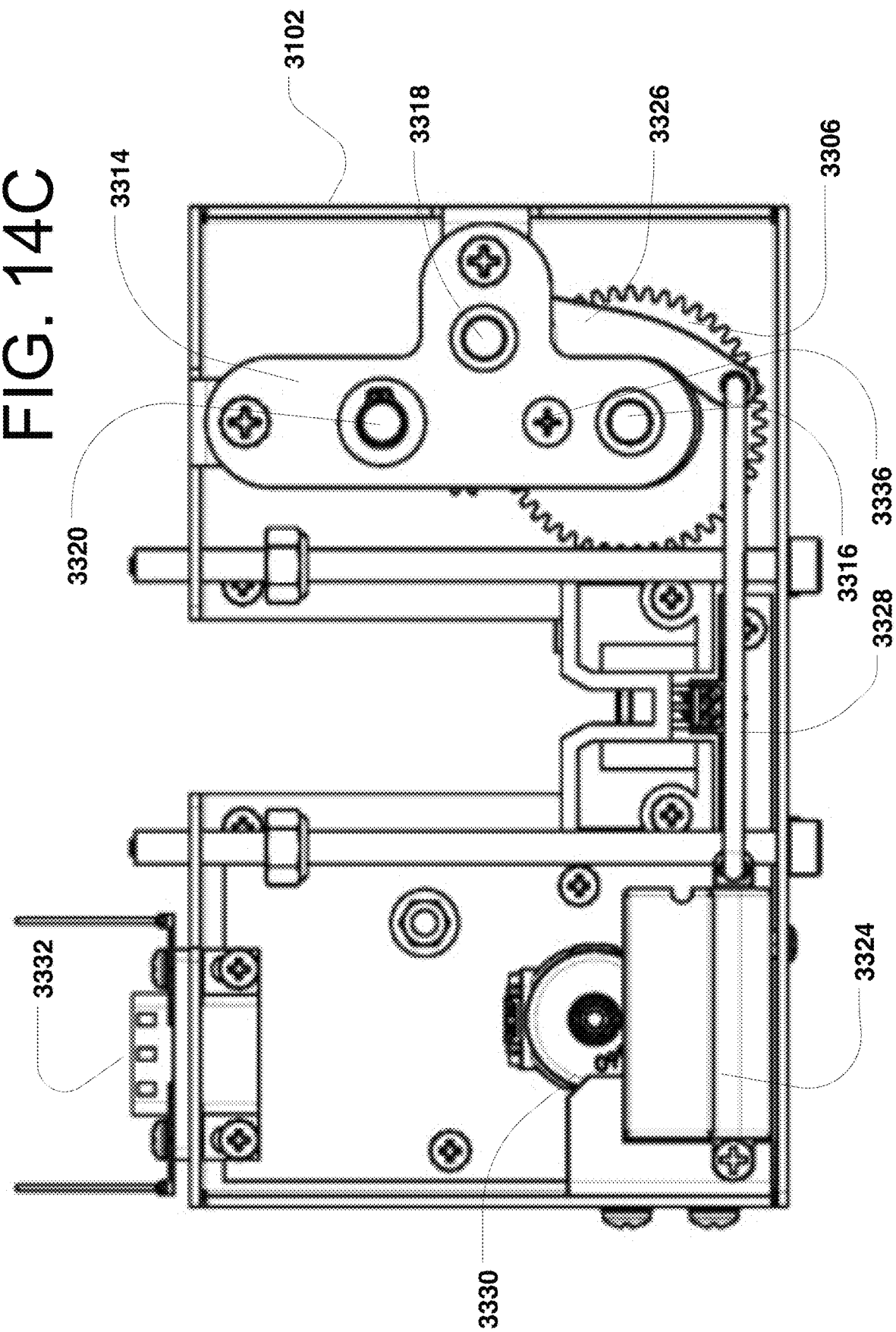
Figure 14D:
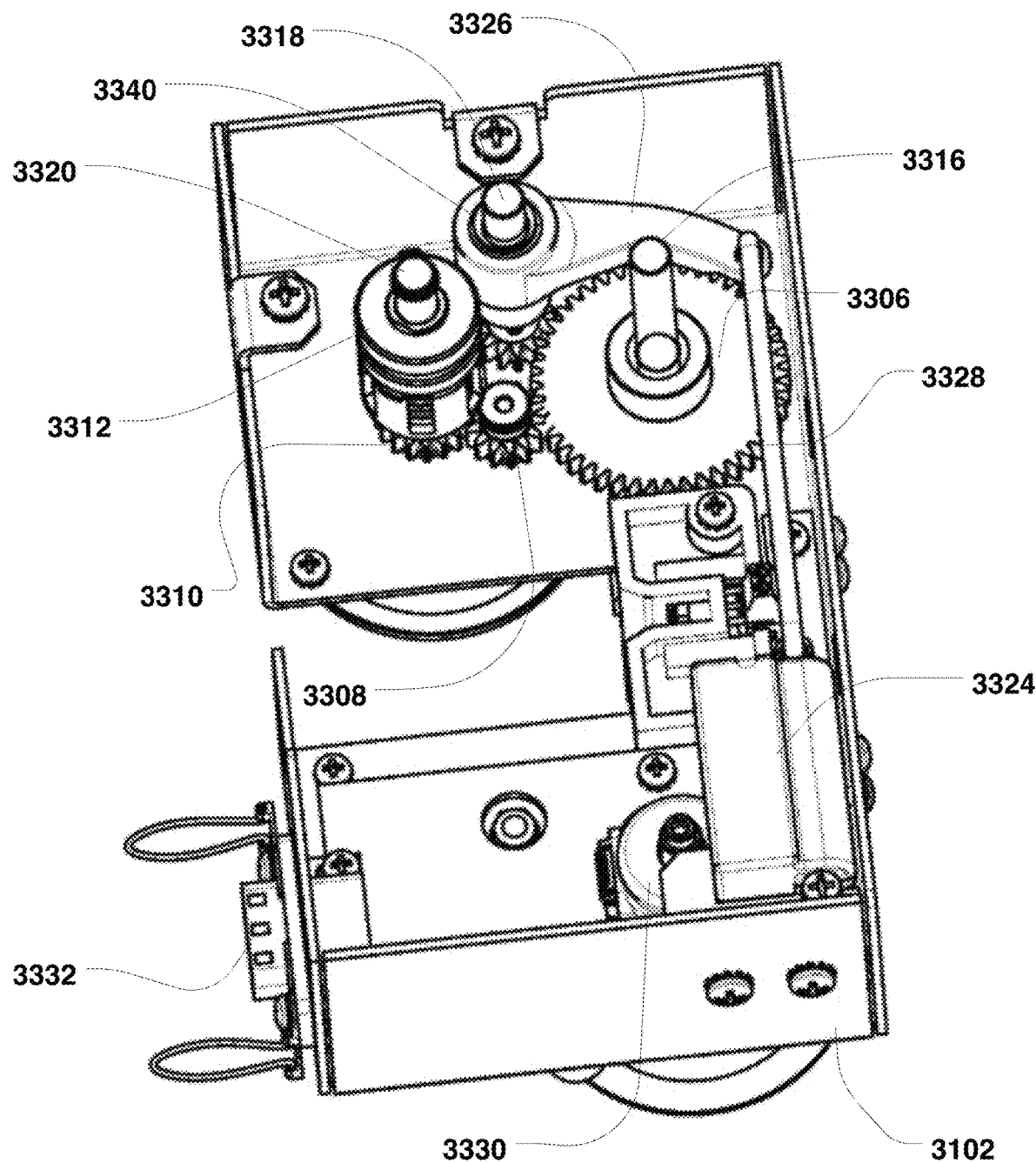
Figure 14H:
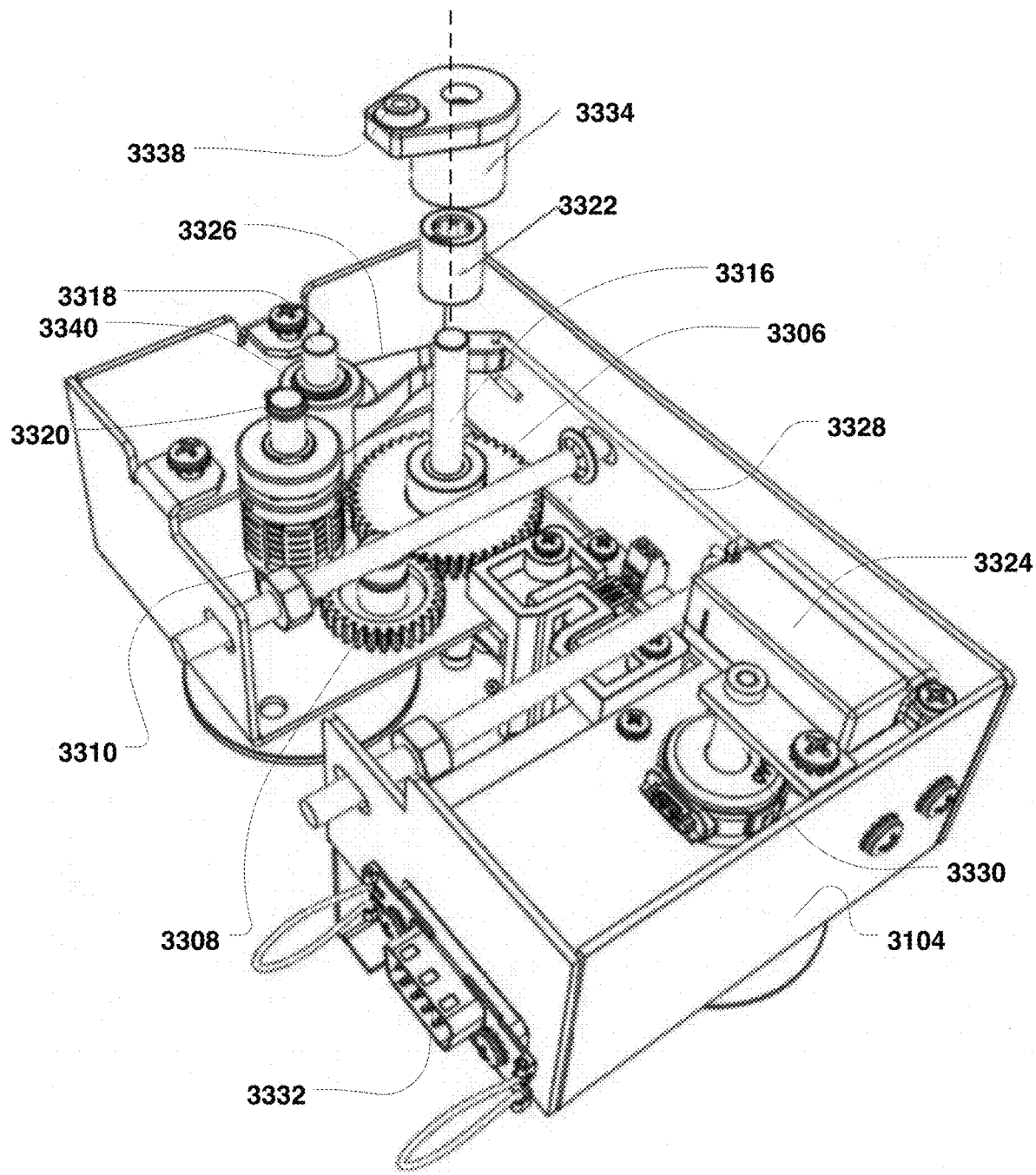

With reference to FIGS. 12 and 13, a cleaning cartridge system 3100 includes a top portion comprising a main housing 3102 operatively connected to a bottom portion having a bottom cover 3104. The top portion (in the main housing 3102) contains most of the operational components of the cleaning cartridge system 3100, whereas the bottom portion primarily contains the replaceable cleaning fabric and related components.

As shown, e.g., in FIGS. 14A-14H, the top portion includes a gear mechanism, having a main drive gear 3306 engaged with an idler gear 3308, which is engaged with a clutch gear 3310, and a clutch 3312. The idler gear 3308 engages the main drive gear 3306 and the clutch gear 3310. In operation, and as shown by the arrows in FIG. 14G, the main drive gear 3306 rotates counter-clockwise, causing the idler gear 3308 to rotate clockwise which causes the clutch gear 3310 to rotate counter-clockwise. The gears are positioned on three gear shafts 3316, 3318, 3320, and a top bearing plate 3314 aligns and secures the three gear shafts 3316, 3318, 3320 with perpendicularity to the main housing 3102.

A one-way bearing 3322 (e.g., a one-way needle bearing) allows the gear/drive shaft 3316 to rotate only in the direction which advances the cleaning fabric. The bearing 3322 is positioned in a housing 3334 (see also FIGS. 14K-14L), to hold the one-way bearing 3322. The bearing 3322 is glued and pressed into the housing 3334, and the housing 3334 with the bearing 3322 is positioned on the shaft 3316. The top bearing plate 3314 holds the housing 3334 in place using, e.g., a screw 3336 in the hole 3338 in the housing. As configured, the bearing 3322 prevents the drive shaft 3316 from clockwise rotation.

A linear actuator (LA) 3324 is connected to a lever arm 3326 by a linkage 3328. The linear actuator 3324 controls the precise advancement of the ribbon (as explained below) based on the displacement of the lever arm. The lever arm 3326 pivots by a certain amount to linearly advance the ribbon. In a presently preferred implementation, the lever arm 3326 pivots 31 degrees to linearly advance 1.5 mm of ribbon. Those of skill in the art will understand, upon reading this description, that different amounts of pivot of the lever arm 3326 will produce different amounts of ribbon advancement. The ribbon advancement is selected such that the polished fiber optic connector ferrule tip, which is 1.25 mm in diameter for LC ferrules or 2.5 mm in diameter for SC ferrules, is presented and cleaned on an unused portion of the fabric. The lever arm 3326 may be positioned on a one-way bearing 3340 (see, e.g., the detail in FIGS. 14J-14K).

In a particular example, the linear actuator is a dc motor with an integral lead screw to push or pull on its central member connected to the linkage 3328.

A 360-count rotary encoder/counter 3330 may be used to confirm advancement of the ribbon (to be described) and to determine when the ribbon has been used up. Once the encoder shows no counts upon advancing the fabric, this is the indicator that the ribbon is used up and the controller measuring the counts outputs an alarm indicating that the fabric must be replaced.

An electrical connector 3332 (e.g., a DB9 connector) provides an interface to a printed circuit board (PCB) and/or other control mechanisms (not shown). As noted, in present implementations the cleaning cartridge system 3100 is attached to a robot arm, and the electrical connector 3332 may connect with the robot's interface board.

With reference to FIGS. 15A-15F, the lower section (inside bottom cover 3104) contains a source cleaning fabric spool 3402 and a used cleaning fabric/take-up spool 3404. Both the source cleaning fabric spool 3402 and the used cleaning fabric spool 3404 may be removed for replacement (e.g., when the source cleaning fabric spool 3402 is used up). The cleaning fabric is preferably in the form of a 10-15 mm wide ribbon.

The take-up spool 3404 is connected to the drive shaft 3320 of the clutch gear 3310, whereby rotation of the clutch drive shaft 3320 causes corresponding rotation of the take-up spool 3404. Preferably the take-up spool 3404 secures to the clutch drive shaft 3320 with a left-hand thread 3428 in order to prevent the spool from unscrewing/loosening during operation.

The clutch 3312 serves two functions. First, it maintains at least a minimum tension on the ribbon/fabric 3500. Second, it allows slip to compensate for re-wind overdrive between the take up spool 3404 and the clutch gear 3310. As the ribbon/fabric 3500 in consumed during cleaning process and wound onto the take-up spool 3404, the diameter of the spool becomes larger. Therefore, for a given fabric advance length (e.g. 1.5 mm), this leads to a corresponding decrease in angular rotation of the spool as the fabric is consumed. The clutch 3312 provides slippage allows the advancement of the ribbon to always move at the designated 1.5 mm linear length independent of the accumulated ribbon on the take-up spool.

The cleaning ribbon/fabric 3500 passes from the source cleaning fabric spool 3402 to the take-up spool 3404 through a series of guide rollers 3406, 3408, 3410. A drive roller 3412 with high friction/low slip relative to fabric pulls the fabric from the source spool and winds used fabric onto the take-up spool while maintaining alignment of the ribbon of cleaning fabric as it traverses the series of rollers.

Figure 15B:
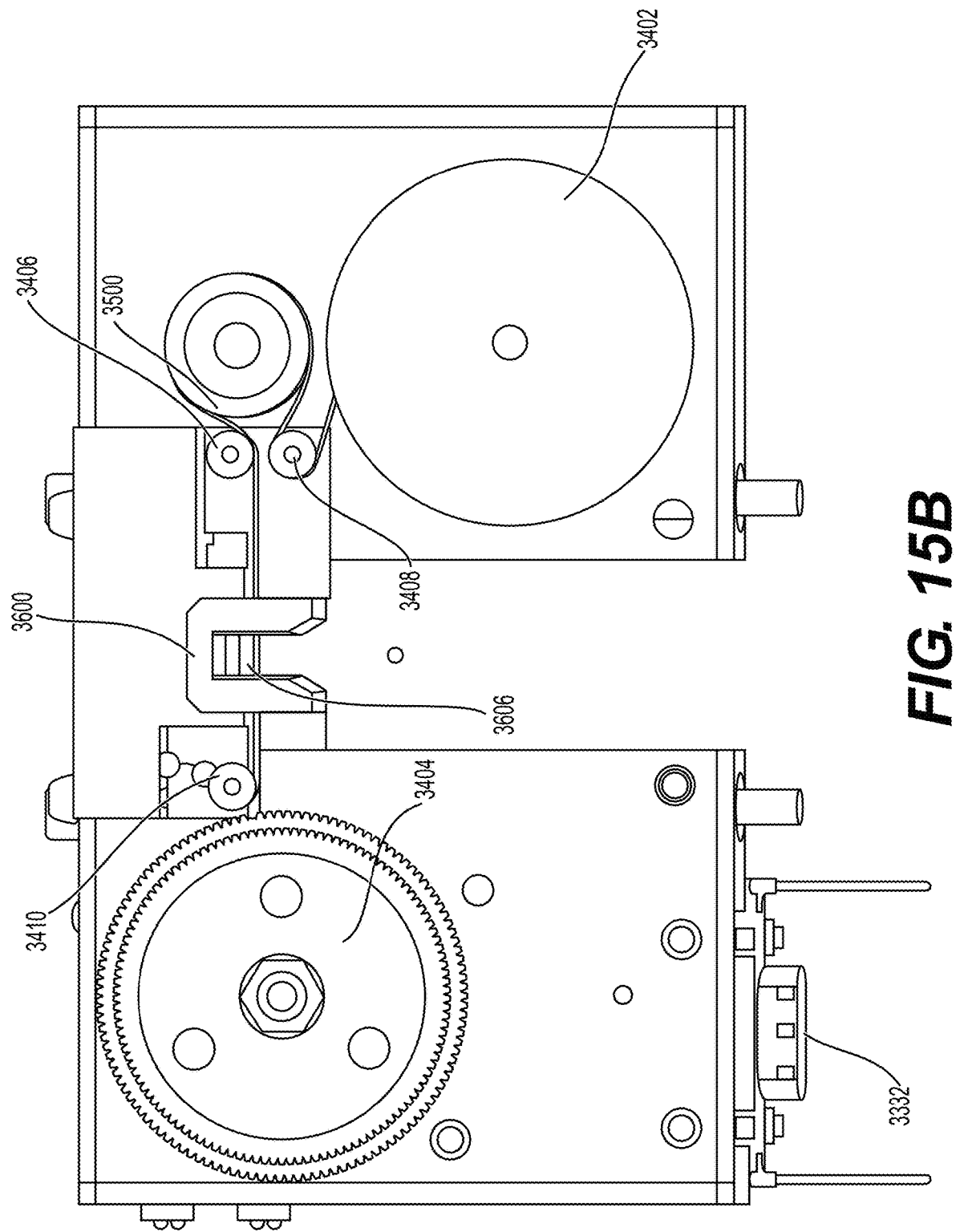
Figure 15C:
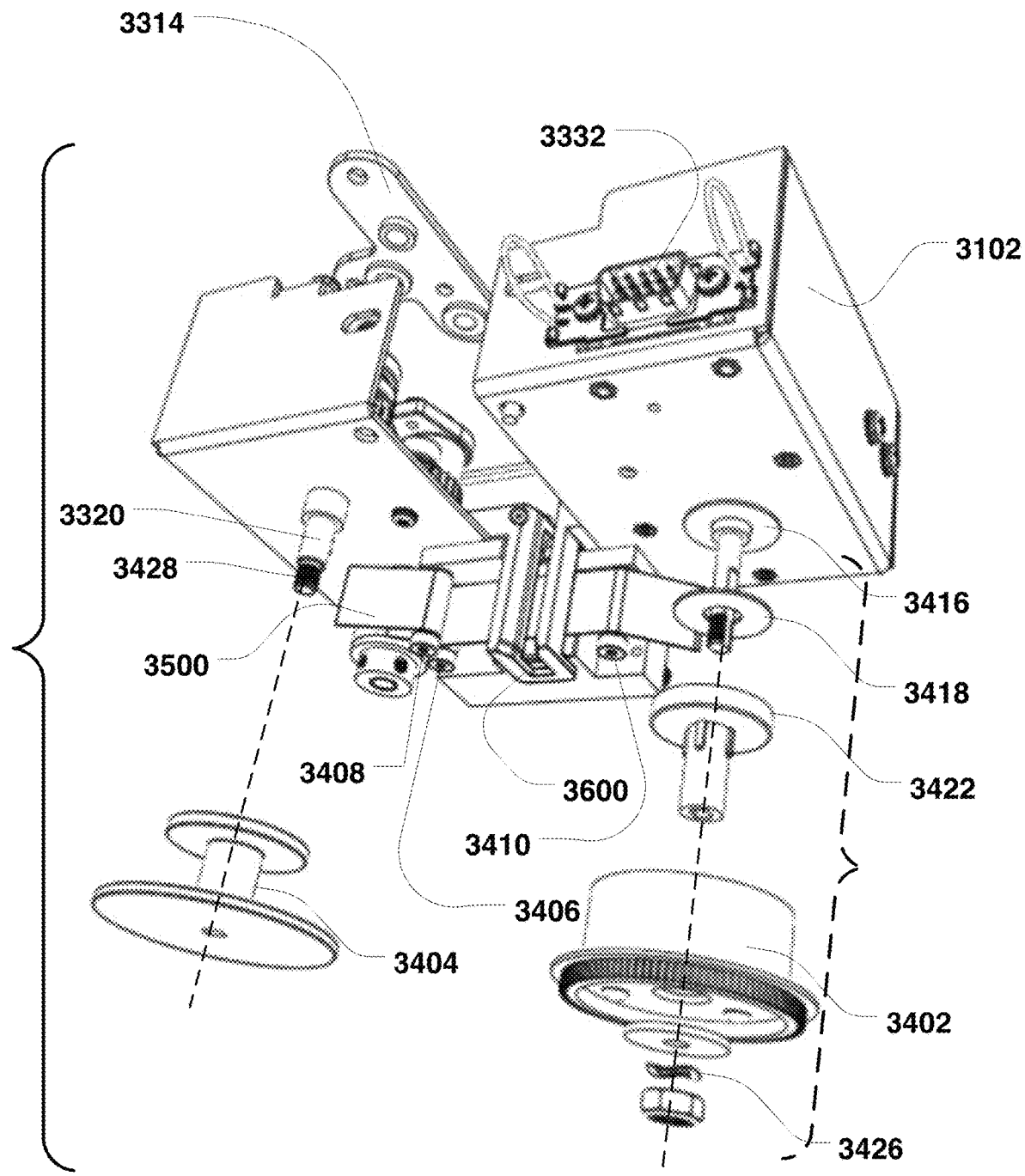
Figure 15D:
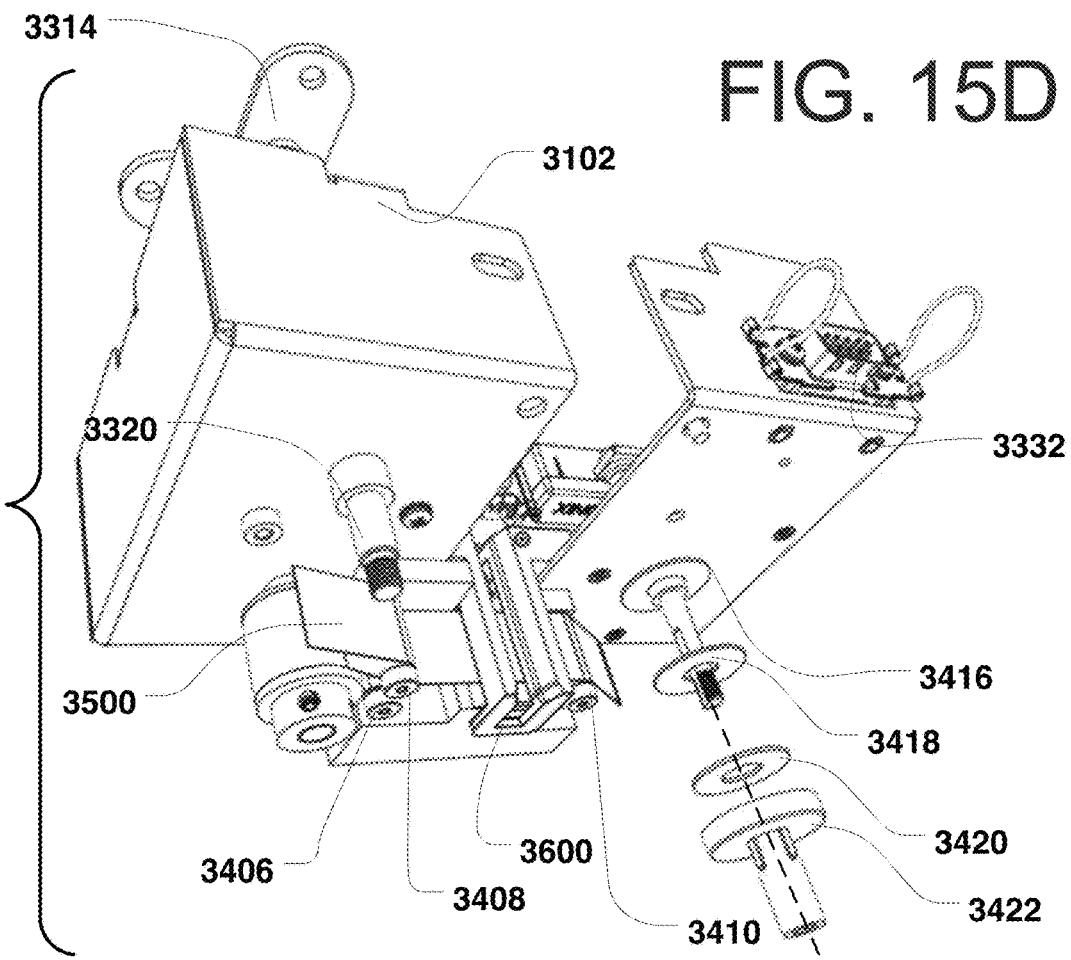
Figure 15E:
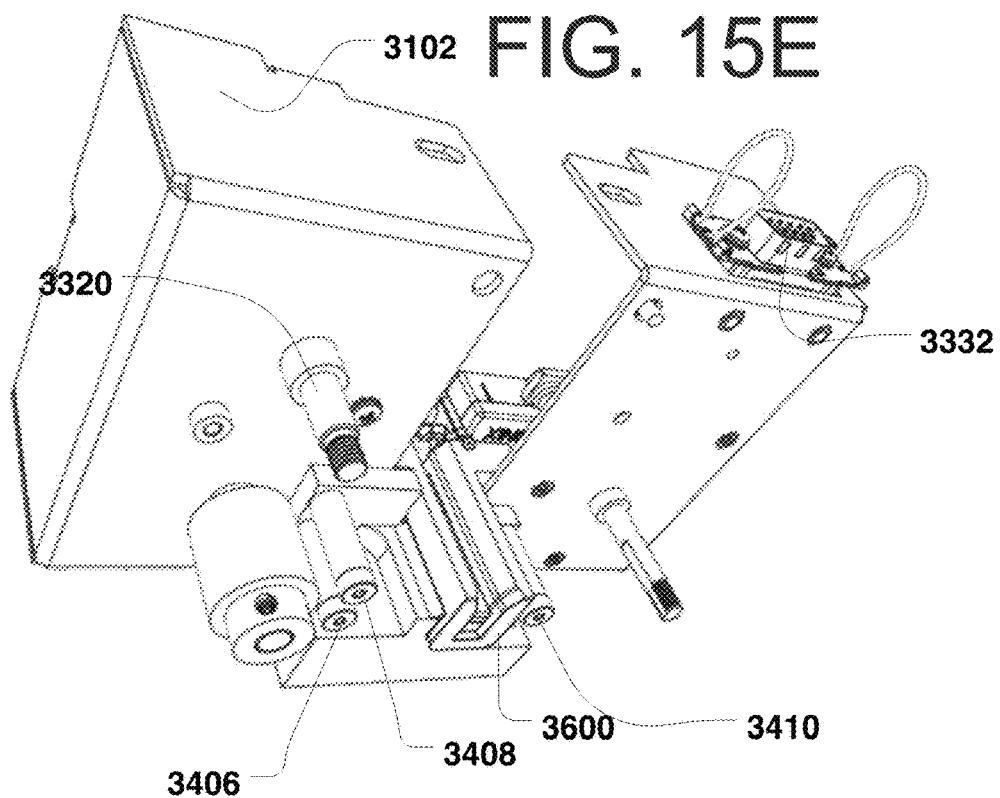

The source spool 3402 may be connected to a shaft 3414. The shaft 3414 may be connected to the rotary encoder/counter 3330. As shown, e.g., in FIGS. 15C-15D, a stainless-steel washer 3416 may be permanently fixed to the main housing 3102. A gasket 3418 (for compression) is positioned on the shaft 3414 between the washer 3416 and a corresponding stainless-steel washer 3420 permanently fixed to compression brake rotor 3422. With reference to FIG. 15C, a disk wave spring washer 3426 may apply consistent force to the compression brake rotor 3422.

Figure 16:
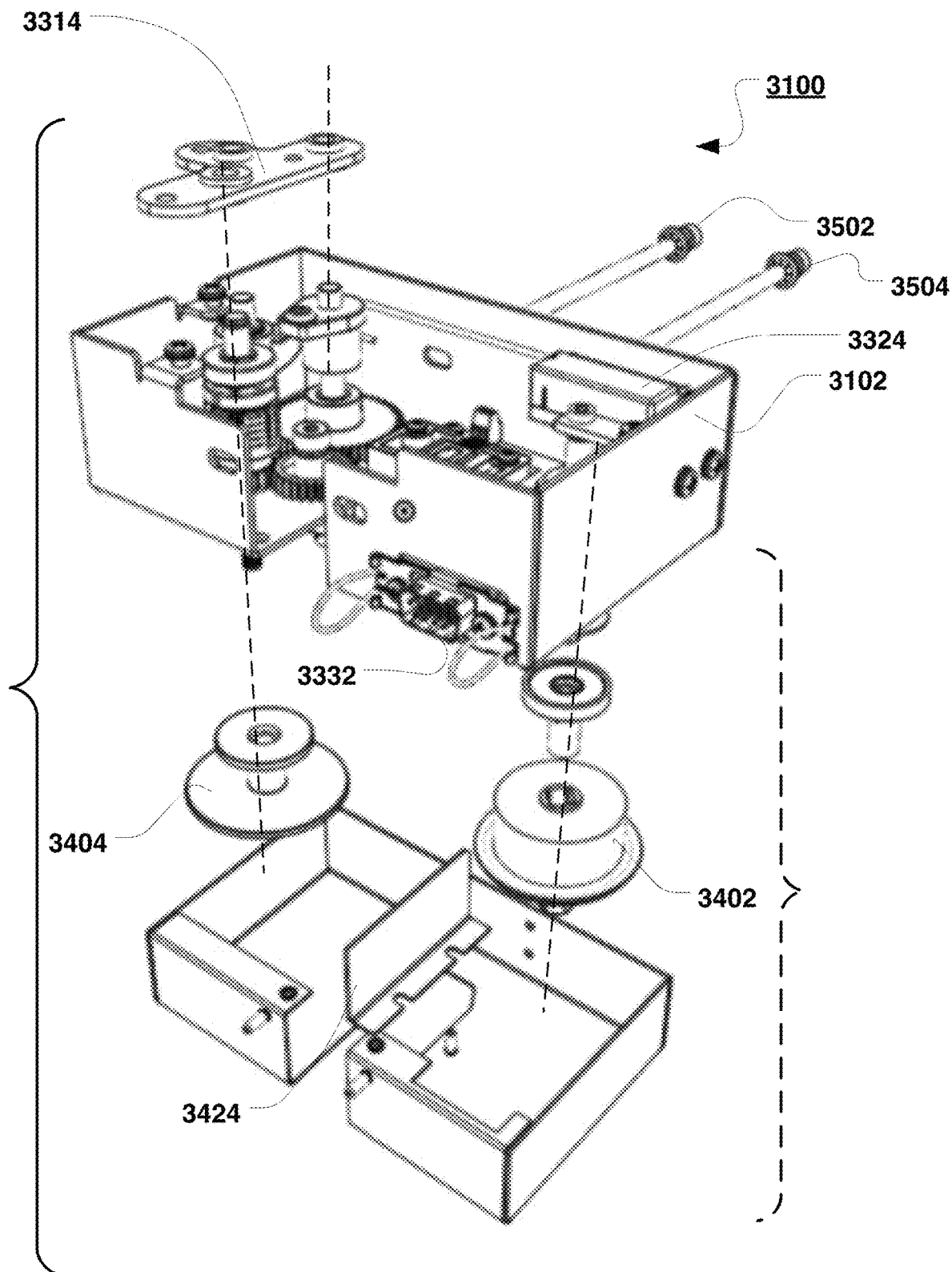

As shown in FIG. 16, a close out shield 3424 protects clean unwound fabric 3500 (on spool 3402) from contamination.

Mounting screws 3502, 3504 may be used to attach the cleaning cartridge system 3100 to a robot undercarriage (e.g., the underside of a robot module) so that the robot arm passes centrally through the cleaning cartridge and the gripper can be positioned within the cleaning cartridge so that the gripper pushes the fiber connector end face into the cleaning fabric and the gripper is then translated a distance perpendicular to the fabric feed direction to clean the fiber end face. This distance is typically 4 to 10 mm, less than the 14 mm width of the cleaning fabric.

The guide rollers 3406, 3408, 3410 guide and position the ribbon/fabric 3500 as it passed across a pressure sensing pad and mounting assembly 3600.

With reference to FIGS. 17A-17B, the pressure sensing pad and mounting assembly 3600 includes a pressure sensor 3602 covered by a rubber pad 3604, permanently glued to cover the pressure sensor 3602. The pressure sensor is, for example, a resistive force gauge whose electrical resistance is a sensitive function of mechanical pressure at the central region of the sensor.

The guide rollers 3406, 3408, 3410, help to keep the fabric 3500 aligned as it moves through the designated cleaning area 3606 (FIGS. 15A-15F).

The fabric 3500 passes in front the pressure sensor (pad 3604).

In presently preferred operations, the cleaning cartridge system 3100 is attached in a fixed position relative to robot carriage, surrounding the robot arm that traverses columns of spaced-apart connectors (e.g., as described in U.S. Pat. No. 8,068,715).

The cleaning cartridge system 3100 must be small enough to allow it to be installed in the limited volume beneath the robot carriage.

In operation, an end of an optical fiber (that is to be cleaned) is brought into contact with the pressure sensor 3602 (in the designated cleaning area 3606). The pressure sensor triggers the gripper motor to stop advancing the ferrule once it makes contact with the fabric and ensures that the pressure is within suitable upper and lower bounds so as to not tear fabric, not wear out compliant pad behind fabric, and not damage optical fiber end face. With sufficient pressure to trigger the sensor, after a time delay the fabric 3500 advances. The gripper then moves the fiber connector end face transverse to the feed direction of the cleaning fabric over a distance of 4 to 10 mm to "swipe" and thereby clean the end face.

In a further example, the cleaning of the end face is further confirmed by an end face inspection microscope device, which analyzes the image to determine if cleaned end face passes predefined metrics for the number and size of contaminants and or defects in the vicinity of the optical fiber core.

In a further example, the cleaning of the end face is confirmed by an optical time domain reflectometer or OTDR, which sends light pulses through the fiber and connector to measure the insertion loss and return loss resulting when the fiber connector end face is plugged into a mating connector by, for example, a robotic arm and gripper.

Exemplary operation of the cleaning cartridge system 3100 is shown in the flowchart 3700 of FIG. 18. First, at 3702, the gripper (on the end of a robot arm, not shown) engages the fiber connector tip with the cleaning fabric 3500 and activates the resistive touch sensor (pressure sensor (pad 3604)). A voltage change across the touch sensor triggers a time delay circuit #1 (at 3704). Next, the robot arm moves the gripper up vertically to swipe the fiber connector tip across the cleaning fabric (at 3706) in a direction perpendicular to the direction in which the fabric advances over a distance of 2 to 10 mm. After a delay #1 (e.g., 3-4 seconds), time delay circuit #2 triggers and switches on drive current to linear actuator in one direction (actuator 3324 moves outward) for, say, 2.5 seconds (at 3708). At the end of time delay #2 the time delay circuit #3 will start, which will switch the linear actuator's moving direction (actuator 3324 moves inward). During this move the drives lever arm 3326 rotates drive shaft through opposing one-way needle bearings (at 3710).

Rotation of drive shaft 3320 rotates fabric friction feed roller (at 3712). The fabric 3500 is advanced by, e.g., 1.5 to 3 mm (at 3714) such that a new clean portion of fabric is presented for subsequent cleaning process. The circuit is then reset (at 3716) and ready for next cleaning cycle. With the settings described above, about 7,000 to 9,000 cleanings can be performed for a spool with 11 to 13 meters of cleaning fabric.

The optical encoder 3330 may monitor each fabric advance in order to estimate the remaining cleaning fabric length on the spool 3402, and thereby to indicate a finished cleaning fabric roll. The encoder pulses are counted and stored by an external controller, such that the remaining cleaning capacity is monitored and reported. The cleaning cartridge system 3100 described thereby provides consistent fabric advance.

In a further example, the method of cleaning the optical fiber end face with a cleaning fabric in an automated cross-connect system that reconfigures optical fiber end faces among a multiplicity of receiving receptacles, comprises of the steps of (1) energizing an electrical actuator, (2) rotating a fabric advance roller to translate fabric ribbon, (3) unspooling fabric ribbon partially from fabric ribbon source spool, (4) advancing a pre-determined section of fabric to present an unused section of fiber at cleaning element, (5) counting the encoder pulses generated when advancing the fabric, (6) waiting for the fabric advance to complete based on the encoder pulse count, (7) contacting the fiber end face substantially normal to the fabric surface, (8) detecting the contact of fiber end face on fabric using a force or pressure sensor, (9) swiping the fiber end face in a direction substantially normal to fabric ribbon length, (10) withdrawing the cleaned fiber end face from cleaning element, and plugging the fiber end face into one of the receiving receptacles.

In a further example, this is followed by the additional step of measuring the backreflection of the cleaned fiber end face to verify cleaning. If the backreflection of the cleaned fiber end face exceeds a given threshold, all steps in the process are repeated. Typical backreflection thresholds are not to exceed −50 dB. The backreflection can be measured, for example, by an optical time domain reflectometer (OTDR) or optical coherence domain reflectometer (OCDR).

A fiber end face may be inspected for cleanliness using an optical microscope and image processing system may be used to identify contamination. If the image processing system determines that the fiber end face is not adequately cleaned, all steps in the above process may be repeated.

Fiber Optic Tensioning Reel Sub-System

The fiber optic tensioning reel sub-system disclosed herein has unique design requirements to ensure that fiber interconnections can be provisioned and reprovisioned over the lifetime of the system without interruption or faults, on demand even after extended periods of inactivity. The service lifetime is typically in excess of 10 years. Consistency of fiber tensioning under all possible configurations requires significant technical advances. The fiber optic sub-system must be easily replaceable without the need for skilled labor.

With reference to FIG. 19, a reel assembly 4010 comprises a cable spool 4012 rotatable about a screw 4014 with a central axis concentric with rotary bearing 4016. The cable spool has a cable winding support annulus 4018 concentric with a central axis X-X' defined by the axis of the screw 4014 passing through the center of rotary bearing 4016. A spacer 4015 may be provided between the screw 4014 and the cable spool. The cable spool 4012 has an annular surface 4020 attached to disk 4022 for winding optical fiber cable thereon.

The surface of disk 4022 preferably has a flatness of less than 0.005" (0.127 mm) and the annular surface 4020 has a radius of curvature at least greater than a minimum bending radius of the optical fiber cable 4024 that is repeatedly wound and unwound thereon. The typical outer diameter of annular surface 4020 is 95 mm to 100 mm.

A central portion of the continuous length of optical fiber passes through a tube 4026 with rectangular cross-section, the tube preferably comprises a dual-lumen tube with two parallel, spaced apart lumen, the first lumen containing therein an optical fiber and the second lumen containing an internal wire 4027 (e.g., piano or stainless steel spring wire) element. (See, e.g., FIGS. 7C and 7D of U.S. Pat. No. 10,042,122). The nominal outer dimensions of the dual lumen tube are 2.4 mm×0.89 mm, and the diameter of the lumens is about 0.5 mm.

The dual lumen tube is preferably made of a flexible polymer with low coefficient of friction and the polymer material may exhibit a low modulus and low stiffness relative to an internal wire element. The dual lumen tube is bonded at one end to a slot or channel 4028 on the bottom side of disk 4022, so that a middle portion of the optical fiber follows a path from the bottom side of disk 4022 to the top side, through an opening 4030 connecting the top and bottom sides of the disk 4022.

A heat shrink tube 4029 may be positioned to increase the outer dimensions of the dual lumen tube and so to serve as an anchor, preventing the dual lumen tube from getting pulled into the reel during processing, before it is finally fixed in place (e.g., with a clip and glue).

The internal wire element is straight (not coiled) in its free state and may act as a stiffening element which maintains a radius of curvature of the fiber at least greater than a minimum bend radius of the optical fiber throughout the range of rotation angles of the disk 4022. The portion of the optical fiber in the tube can potentially move (e.g., piston or longitudinally slide) freely within the tube's lumen as needed (e.g., when the fiber is retracted or extended from the reel assembly).

The optical fiber with an acrylate coating having an outer diameter of 0.125 to 0.250 mm diameter may further have a protective, wear resistant, low friction jacket of 0.5 to 0.9 mm outer diameter, the jacket fabricated of Hytrel® TPC-ET thermoplastic elastomer, PEEK or a fluoropolymer such as PFA, ETFE, or PTFE (Teflon).

The optical fiber cable 4024 is continuous with polished fiber optic connectors 4050-1, 4050-2 at opposite ends, and kept at a radius of curvature in excess of an established minimum at all locations along its length. The minimum bend radius of optical fiber ranges from 5 mm to 25 mm, depending on the manufacturer and design.

A mandrel 4020 of soft rubber may be positioned between the cable spool 4012 and a cover disk 4032. As the optical fiber under tension is wrapped onto the spool, it contacts the soft mandrel 4020 along the inner diameter of the spool, to protect the optical fiber 4024 and eliminate fiber optic microbending, macrobending and associated insertion loss. The cover disk 4032 outer perimeter is circular, with open sectors 4033 along its perimeter, and is molded using a plastic material having with a highly light reflecting surface. The open sectors 4033 enable an optical sensor 4040 on printed circuit board 4046 positioned in vicinity of the perimeter to detect the rotation of the reel, since as the disk rotates the open sectors 4033 will pass by the sensors and the lack of light reflecting from the open sectors 4033 is detected electronically.

In a particular example, twelve reels are arranged on the surface of the substrate and six separate circuit board assemblies 4046 with reflective optical sensors 4040 are used to detect the individual rotations of the twelve reels. The sensors are positioned at a distance of 0.5 to 1 mm from the outer reflective surface of the cover disk 4032.

A cover piece 4034 may be positioned to retain the power spring 4036 so that it does not expand unstably out of the plane containing the power spring. The cover piece 4034 is attached/bonded to disk surface 4022.

The rotatable end of a prestressed flattened power spring 4036 is connected to the cover piece 4034 (e.g. using an end 4038 of the spring 4036 at location 4048 on the cover piece 4034, FIG. 21). The non-rotatable end of power spring 4036 is attached to a central (or power spring) mandrel 4042 that is fixed by a screw 4014 and thread insert 4044 so that it does not rotate. The prestressed, flattened design for power spring 4036 is used to minimize torque variation as fiber is pulled off the reel and concurrently as the power spring is wound tighter. The flattened power spring 4036 reduces variation in tension of the fiber as it is retracted and/or extended.

A die cut ring 4052 of UEMW film with pressure sensitive adhesive on one side (visible in FIG. 22) adheres to the surface of disk 4022. Beneath this die cut ring, the optical fiber originating from the dual lumen tube below the disk 4022 and exiting the top of the disk 4022 follows a spiral path towards the outer diameter of the disk 4022. The fiber along this spiral path passes under the rubber O-ring 4020 with square cross-section, and then wraps about the outer diameter of the annulus and the far end exits the reel and it directed towards the central one-dimensional backbone.

A multiplicity of reel assemblies 4010 may be mounted onto a Teflon-coated sheet metal tray 4060 (FIG. 22), wherein the Teflon coating minimizes friction as the spiral element winds and un-winds. The metal tray 4060 may hold multiple reel assemblies. For example, in an implementation, a metal tray holds twelve (12) reel assemblies 4010 as described above. Another implementation has eighteen (18) reel assemblies 4010 on a metal tray.

As shown in FIGS. 20A-20C, each real assembly includes a helically wound length of dual lumen tube. The length ranges from 152 cm to 280 cm, with a typical length of about 183 cm. The dual lumen tube may include a friction reducing chemical additive such as PTFE to enable it to coil and uncoil with minimal friction and minimize hysteresis of resulting reel torque/fiber tension. The base material of the dual lumen tube is fabricated of PEBAX, PEEK, nylon, or a fluoropolymer, for example. If the diameter of spring wire within the dual lumen tube is too large then the friction between turns of the spiral dual lumen tube increases, which produces excessive hysteresis in fiber tension (e.g. greater than 85 gm of hysteresis in fiber tension) as the optical fiber is retracted vs extended.

As the diameter of spring wire is decreased, the torque and hysteresis of torque is decreased. The hysteresis is about 85 gm for a diameter of spring wire of 0.45 mm and length of 259 cm, 57 gm for a diameter of spring wire of 0.45 mm and length of 183 cm, 42.5 gm for diameter of spring wire of 0.41 mm and length of 183 cm, and 28 gm for diameter of spring wire of 0.36 mm and length of 183 cm. The spring wire is fabricated of straightened spring tempered stainless steel, for example 17-7 or 300 series stainless.

Fiber Optic Tensioning Pulley Sub-System

The fiber optic tensioning pulley sub-system disclosed herein has unique design requirements to ensure that fiber interconnections can be provisioned and reprovisioned over the lifetime of the system without interruption or faults, on demand even after extended periods of inactivity. The service lifetime is typically in excess of 10 years. The fiber optic sub-system must be easily replaceable without the need for skilled labor. Consistency of fiber tensioning under all possible configurations and in a compact form factor requires significant technical advances.

With reference to FIGS. 23A-23B, a three-dimensional array of pulleys arranged on a substrate 5002 with a fixed set of pulleys 5004 and a moving set of pulleys 5006 on a spring loaded, moveable sled 5008 and an optical fiber cable 5010 repeatedly wound therebetween is disclosed. The system comprises a flat substrate, about 425 mm by 375 mm and 0.6 mm thick, with a common central fiber backbone 5012 with a stacked linear array of low friction fiber cylindrical guides 5014, each with an outer diameter (OD) of 1 mm, inner diameter (ID) of 0.75 mm, and a length of about 75 mm. A multiplicity (e.g. twelve) of optical fiber cables with outer diameters of 0.4 mm and length of 3 m and with connectors 5016 at both ends, pass through a corresponding number of fiber guides. Each of these fibers have a corresponding spring-loaded pulley system 5018 which stores up to a maximum length (e.g. 1.5 m) of optical fiber cable and produces a precise tension.

Each pulley subsystem 5018 associated with a single fiber cable comprises a moveable sled comprised of several pulleys 5006 rotating with outer diameters of about 20 mm on a common shaft 5020 with a diameter of about 1.5 mm and with a low coefficient of friction sliding element. A pair of contact force spring 5022 extendable ends are attached to one end of the sled, and the fixed ends of the constant force springs are each within a circular housing 5024 that is free to rotate about a fixed shaft 5026 attached to the substrate. Opposite the circular housing, at a distance of about 250 mm, are the fixed set of pulleys 5004. Each optical fiber cable repeated wraps around fixed and moveable pulleys.

Starting from the fixed connector end 5016-1 of the fiber optic cable, which is attached to a connector patch-panel 5028, the cable is routed to a fixed clamp 5030 attached to the substrate. From the clamp, the cable wraps 180 degrees around a first pulley 5006-1 of the sled, then wraps 180 degrees around a first fixed pulley 5004-1, then wraps 180 degrees around a second pulley 5006-2 of the sled, then wraps 180 degrees around a second fixed pulley 5004-2, then wraps 180 degrees around a third pulley 5006-3 of the sled, then wraps 180 degrees around a third fixed pulley 5004-3, then wraps 180 degrees around a fourth pulley 5006-4 of the sled, then wraps about 90 degrees around a fourth fixed pulley 5004-4 with integral encoder wheel 5032. After this fourth fixed pulley, the fiber cable is routed by one of the redirecting pulleys 5034 to one of the multiplicity of backbone guides.

These elongated fiber cable and pulley sub-systems 5018 are repeated across the substrate in a 1×12 array. Each tray thus includes an array with 4 levels of pulleys arrayed across 12 positions.

The rotation of each encoder wheel attached to each fourth fixed pulley is detected by a reflective photo-interrupter device 5036 comprising an LED light source and phototransistor on a printed circuit board (PCB) substrate 5038 that further interfaces to a controller and logic board (not shown in this diagram). To monitor the potentially changeable length of optical fiber extended and/or retracted by the pulley system, an electronic encoder subsystem is utilized. In this particular example, the reflective photo-interrupter is used to detect the rotation of one of the optical fiber pulleys. To prevent fiber slippage on this pulley, a compliant, high friction surface on the pulley mandrel is desirable. Moreover, the printed, reflective encoder wheel is attached to one of the pulleys and the reflective photo-interrupter is precisely positioned in vicinity of reflective encoder wheel.

Unlike a typical block and tackle winch arrangement to lift loads, in this case each pulley subsystem 5018 divides the force $F_{spring}$ generated by one or more extension springs by an integer value of Mechanical Advantage (MA) to transfer a repeatable and substantially constant Tension $T_{fiber}$ on an optical fiber cable subsystem 5010. For the example illustrated in FIGS. 23A-23B, there are 8 fiber segments between the fixed and moveable pulleys. Therefore, $MA = F_{spring}/T_{fiber}$ = number of segments of optical fiber = 8. The decreased tension force produced by the spring(s) is offset by both the increased length of optical fiber retained by the slack buffering system 5018. There are also force losses that further decrease the tension, primarily from the friction of the pulleys on their shafts and the torque required to overcome the rotational inertia of the pulleys.

The tension on the optical fiber cable subsystem 5018 is generated by a helical wound constant force spring 5022. It is a pre-stressed flat strip of spring material which is formed into virtually constant radius coils around itself or on a drum. When the strip is extended (deflected) the inherent stress resists the loading force, the same as a common extension spring, but at a nearly constant (zero) rate. A constant torque is obtained when the outer end of the spring is attached to another spool and caused to wind in either the reverse or same direction as it is originally wound. The full rated load of the spring is reached after being deflected to a length equal to 1.25 times its diameter. Thereafter, it maintains a relatively constant force regardless of extension length. The load is basically determined by the thickness and width of the material and the diameter of the coil.

A constant force spring is usually mounted by first tightly wrapping it on the circular drum 5024, then extending and attaching the free end to the sled. The strip becomes unstable at long extensions and should be guided to prevent twisting or kinking on recoil. For example, as shown herein the constant force springs are mounted back to back in parallel, which provides mechanical rigidity transverse to the extension axis.

Each subsystem 5018 comprises a pair of blocks, each block with 4 pulleys, one block fixed, and the other block attached to a pair of extension constant force springs. The tension of the optical fiber cable is reduced by 8 from the total force provided by the power spring(s), corresponding to the number of fibers segments between the fixed block of pulleys subsystem 5004 and the moveable, spring-loaded block subsystem 5006. The radius of curvature of the optical fiber cable should be maintained at a level greater than 5 mm for bend insensitive fiber, so that the optical insertion loss caused by the bends remain low; that is, less than about 0.1 dB.

When extending or retracting the optical fiber, the fiber experiences tension that results from the reduced force of the constant force spring, the frictional force of the pulleys, and the torque required to overcome the rotational inertia of the pulleys. The frictional component resulting from the pulleys is based on the ratio of pulley mandrel diameter to central shaft diameter. It is optimal from the standpoint of reducing friction to minimize central shaft diameter. The tray includes additional guidance pulleys to redirect fiber with low friction.

In a particular example, the tension is generated by constant force spring(s) 5022 attached to the sled with moveable pulleys. The key parameters of the constant force spring are:

Extended length=0.46 m
Load=16 gm-f
Thickness=0.125 mm
Width=8 mm
ID=17.5 mm
OD=20 mm
Material: 301 Stainless Steel In a particular example as illustrated in FIGS. 24 and 25, the system of fiber optic cable length buffers auto-tensions optical fiber cables, each fiber cable with distal and proximal ends and extendable from the length buffer. Typically, both distal and proximal ends have connectors, but in some applications only the distal end has a connector and the proximal end is available to fusion splice into the fiber optic network. The robot reconfigures the distal end of connector within the array of connector receptacles, and if the proximal ends are connectorized, they are plugged into the patch-panel segment of the corresponding tray.

In a further example, the tray is comprised of a central, stacked linear array of flexible, low friction through guides attached to substrate, and a multiplicity of the length buffers arrayed on the substrate, wherein the length buffers each include a spring-loaded moving sled with a multiplicity of freely rotating pulleys on a moving common shaft, and a spaced-apart fixed common shaft with an equal multiplicity of freely rotating pulleys thereon, wherein the fiber optic cable wraps in a repeated circuit around opposing sets of pulleys on the moving shaft and on the fixed shaft and is routed through one of the low friction through guides to a fiber optic connector at the distal fiber end.

Multiple identical trays can be stacked on top of one another within a common housing, to produce modules with a number of cables in multiples of 12. Moreover, multiple modules can be stacked on top of one another in an enclosure to further increase the number of trays and cables within the cross-connect system.

The length of fiber extendable from the buffers is approximately equal to the number of circuits multiplied by the maximum distance between the moving and fixed common shaft. The spring-loaded moving sled is attached to a pair of power springs at one end and attached to the substrate at the other end and extending in opposition from their fixed housing. The average tension of the fiber optic cable is equal to the total retraction force of the spring pair divided by the number of circuits.

The length and tension are selected so that the robotic module is able to translate any of the distal connectors between any arbitrary pair of mating receptacles without subjecting the optical fiber cable to excessive tensile and shear forces.

In a further example, a fiber optic cable length buffer device that auto-tensions a moveable end of an optical fiber cable that is extendable from the length buffer and opposite a fixed end of the optical fiber cable, wherein the length buffer is comprised of a spring-loading translating sled with a multiplicity of freely rotating pulleys about a common first shaft affixed to the sled; a spaced-apart fixed common second shaft with an equal multiplicity of freely rotating pulleys thereon; wherein the fiber optic cable wraps in a repeated circuit around opposite pairs of pulleys on the first shaft and on the second shaft, and the moveable end of fiber optic cable is routed through the low friction through guide to a fiber optic connector, the force produced by spring-loading on sled equal to an integer multiple of the tension force imparted on the moveable end of the optical fiber cable, wherein the ratio of the pulley outer diameter to the shaft outer diameter is about 10 to 1 to minimize friction of the pullies on shafts, wherein the tension force imparted on the moveable end of the optical fiber cable is typically in the range of 20 to 60 gm-f.

As shown in the process flow chart in FIG. 26, the method of maintaining precise tension of optical fiber cables extendable from arrayed spools comprises of the steps of (1) extending one of the optical fiber cables from the arrayed spools by robot actuator, (2) sliding one of the optical fiber cables through one of an array of flexible guides, (3) rotating a roller attached to a rotary encoder to generate encoder pulses, (4) counting the encoder pulses, (5) pulling the optical fibers cable wrapped around spools in multiple circuits on a sled traveling between two endpoints, (6) rotating the one or more arrayed spools on the sled with different rotation speeds, (7) translating a sled along a straight path due dynamic extension force of optical fiber cables wrapped around spools of sled, (8) pulling one or more springs attached at one end to the sled from their housing to impart a restoring force that maintains the precise tension.

The precise tension is in the range of 10-30 gm-f and increases to 40-75 gm-f as the length of optical fiber cable extended increases to about 1 m. The number of encoder pulses is compared to the calculated extension length to verify that the fiber optic cable is properly extended or retracted. The robot actuator is driven so that the travel of the sled is a fraction of the travel of the robot actuator.

Robotic Cross-Connect System

In accordance with aspects hereof, unique robotic cross-connects systems (FIG. 27) are achieved by incorporating a controller sub-system 6001 executing instructions according to the KBS algorithm (e.g., as described in U.S. Pat. No. 8,068,715) to a robot subsystem 6002 with a translatable platform carrying a telescopic robot arm with a gripper sub-system 6003 attached to end of arm and a cleaning cartridge subsystem 6007 attached to translatable platform, and a multiplicity of fibers with connectors that are carried by the gripper, each fiber independently tensioned and retracted within an arrayed storage and tensioning sub system 6004 incorporating a multiplicity of spring powered retractors. The telescopic arm may be a multi-stage unit with an outer stage attached to translatable platform, a middle stage translating within the outer stage and an inner stage sliding within the middle stage and with a gripper attached at one end. The extension axis of the telescopic arm may be parallel to the direction of the one-dimensional backbone of flexible, low friction fiber guides, and is perpendicular to translatable connector rows that independently translate according to the KBS algorithm. The extension axis of the telescopic arm can be oriented vertically or horizontally, depending on space constraints and the number of fibers with connectors.

An array of spring powered retractors are comprised of a stacked multiplicity of one or both of spring-powered reel assembly trays or spring-powered roller assembly trays that tension and store excess lengths of continuous optical fiber cables with one or more connectors at their ends.

The controller sub-system 6001 may be, for example, based on Linux servers with Ethernet interfaces to communicate with the sub-systems. The controller may be in bi-directional electronic communication with sub-systems such as those illustrated in FIG. 27 to execute a sequence of mechanical moves and electronic sensing, in a temporal relationship that ensures proper operation of each subsystem by validating the proper execution of each move before continuing on to the next step in the process. The multi-step reconfiguration process may take at least 30 seconds per port to complete.

The controller sub-system 6001 may be further in communication with an optical power monitor (OPM) sub-system 6006 to measure insertion loss and optical power of the cross-connect. OPMs use photodiodes, amplifiers and analog to digital conversion and look-up tables to measure the optical power within optical fiber cables.

The controller sub-system 6001 may be further in communication with an optical time domain reflectometer (OTDR) sub-system 6005 to measure insertion loss, back-reflection and length of each cross-connect and cables attached thereto. Suitable OTDRs are commercially available from suppliers such as Exfo, Viavi, Anritsu and ADVA.

The controller sub-system 6001 may be further in communication with a fiber end face inspection microscope sub-system 6008 to measure or evaluate the cleanliness of the fiber endface. Suitable inspection microscope sub-systems are commercially available from suppliers such as Viavi, Sumix, AFL, etc.

Cross-connect systems and subsystems as disclosed may be used to automate data centers and networks. This application requires a very high level of reliability and features that eliminate the interruption of transmission through the fiber optic cables under any conceivable faults. Accordingly, the cross-connect system disclosed herein is designed such that any of the above-mentioned sub-systems as shown in FIG. 27 can be removed and replaced, without interrupting the transmission of signals through the system. The time to replace any sub-system is typically less than 60 minutes and requires minimal experience to perform the replacement. These features are essential to ensure high availability of the system and automation services enabled by the system.

CONCLUSION

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs" and includes the case of only one ABC.

As used herein, including in the claims, term "at least one" should be understood as meaning "one or more," and therefore includes both embodiments that include one or multiple components. Furthermore, dependent claims that refer to independent claims that describe features with "at least one" have the same meaning, both when the feature is referred to as "the" and "the at least one."

As used in this description, the term "portion" means some or all. So, for example, "A portion of X" may include some of "X" or all of "X." In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only," the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise," "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

APPENDIX: ABSTRACTS

The Following are Non-Limiting Abstracts for Various Disclosed Embodiments

Gripper Sub-System

In a fiber optic cross-connect in which a robot selectively transports fiber optic connectors between different positions, a fiber optic connector gripper assembly, connectable to said robot, the gripper assembly comprising: a stepper motor drive, responsive to command signals and mounted on a support structure; a dual drum connected to the stepper motor drive and rotatable about a first axis, said dual drum comprising a top drum portion and a bottom drum portion; a plurality of bearing shafts slidably engaged in spaced apart relation in the support structure along axes perpendicular to the first axis; a pair of spaced apart terminal blocks fixedly mounted on opposite ends of the bearing shafts; and a length of drive string connected to the dual drum. A first portion of said drive string is positioned to wind about the bottom drum portion when the drum is rotated, and wherein an end of said first portion of said drive string is connected to a first of said terminal blocks. A second portion of said drive string is positioned to wind about the top drum portion when the drum is rotated, and wherein an end of said second portion of said drive string is connected to a spring attached to a second of said terminal blocks. Rotation of the drum in a first direction causes the pair of spaced apart terminal blocks to move together.

Robot Arm Sub-System

A robotic arm assembly, in a fiber optic cross-connect in which a robot selectively transports fiber optic connectors between distinct positions. The robotic arm assembly includes an upper stage and a lower section slidable in said upper stage; and a mounting mechanism through which the upper stage is movable in a vertical direction, where the mounting mechanism includes a plurality of spring-loaded lubrication mechanisms; and a plurality of rollers, including hardened and ground crowned rollers. The spring-loaded lubrication mechanisms include a lubrication element; and a spring positioned in a hole in the lubrication element. The lubrication element may be an oil-impregnated plastic element. The upper stage may be case-hardened, non-magnetic stainless steel.

Cleaning Cartridge Sub-System

A device for cleaning an end of a fiber optic cable, the device comprising: a drive mechanism; a pressure sensor; a source spool of fabric; a take-up spool operatively connected to the drive mechanism; and a plurality of guide rollers to guide the fabric past the pressure sensor to the take-up spool, wherein contact of a fiber connector tip on the pressure sensor causes the drive mechanism, after a predetermined delay, to rotate the take-up spool and advance a predetermined amount of the fabric from the source spool to the take-up spool.

Fiber Optic Tensioning Reel Sub-System

A tensioning spool apparatus for storage of optical fiber exhibiting reduced variation of tension during a retraction cycle versus an extension cycle of fiber over a predefined range of spool rotation cycles, the optical fiber dynamically extended under tension from the spool. A first spiral element includes a linear spring, a length of optical fiber characterized by an insertion loss dependent on its bend radius along a length of element, and an outer sheath with the linear spring and the fiber therein. The first spiral element is sufficiently flexible to reduce adjacent turn interaction force and binding under bending, while being at the same time sufficiently stiff to prevent buckling of spiral during unwinding and ensure that a bend radius of the optical fiber is at all locations and for all configurations greater than a minimum bend radius specified for the optical fiber. A second spiral element includes a flat coiled metallic spring. The second spiral element produces greater average torque relative to an average torque produced by the first spiral element. A flat, non-rotating substrate is in a first plane, the first spiral element in a second plane, the second spiral element in a third plane, and the first, second and third planes are parallel, and the second plane lies between the first and third planes. The average torque transferred to the tensioning spool to drive rotation is equal to a sum of the average torque of the first and second spiral elements, the variation of said tension resulting primarily from friction between adjacent turns of the first spiral element, an outer surface of the sheath having a low coefficient of friction with itself to minimize the variation in tension.

Fiber Optic Tensioning Pulley Sub-System

A fiber optic cable tray system with a three dimension array of pulleys is disclosed, comprised of a central, stacked linear array of flexible, low friction through guides attached to substrate, and a multiplicity of the length buffers arrayed on the substrate, wherein the length buffers each include a spring-loaded moving sled with a multiplicity of freely rotating pulleys on a moving common shaft, and a spaced-apart fixed common shaft with an equal multiplicity of freely rotating pulleys thereon, wherein the fiber optic cable wraps in a repeated circuit around opposing sets of pulleys on the moving shaft and on the fixed shaft and is routed through one of the low friction through guides to a fiber optic connector at the distal fiber end. Multiple identical trays can be stacked on top of one another within a common housing, to produce modules with a number of cables in multiples of 12.

We claim:
1. A system of fiber optic cable length buffers that tension fiber optic cables, each of the fiber optic cables with distal and proximal ends and extendable from each of the length buffers, the system comprising:
  a central, stacked linear array of flexible, low friction through guides attached to a common substrate; and
  a multiplicity of the length buffers arrayed on the common substrate,
  wherein the length buffers each includes a spring-loaded moving sled with a stacked multiplicity of first freely rotating pulleys on a moving common shaft, and a spaced-apart fixed common shaft with an equal multiplicity of second freely rotating pulleys thereon, and wherein each of the fiber optic cables wraps in a repeated circuit around opposing sets of first freely rotating pulleys and second freely rotating pulleys on the moving common shaft and on the fixed common shaft and each of said fiber optic cables is routed through one of the low friction through guides to a fiber optic connector at a distal fiber end.

2. The system of fiber optic cable length buffers of claim 1, wherein a length of fiber extendable from the length buffers is approximately equal to a number of the repeated circuits multiplied by the maximum distance between the moving and fixed common shafts.

3. The system of fiber optic cable length buffers of claim 1, wherein the spring-loaded moving sled is attached to a pair of power springs at one end and attached to the common substrate at the other end and extends in opposition from fixed housings of the power springs.

4. The system of fiber optic cable length buffers of claim 3, wherein an average tension of the fiber optic cable is equal to a total retraction force of the pair of power springs divided by a number of the repeated circuits.

5. The system of fiber optic cable length buffers of claim 1, wherein the distal fiber end is terminated in the fiber optic connector that is connected and/or disconnected by a robot system.

6. The system of fiber optic cable length buffers of claim 5, wherein an end face of the distal fiber end is cleanable by the robot system swiping the end face across cleaning fabric.

7. The system of fiber optic cable length buffers of claim 1, wherein the outer diameter of each of the low-friction through guides is less than or equal to 1.0 mm to enable a high density of the multiplicity of fiber optical cable length buffers.

8. The system of fiber optic cable length buffers of claim 1, wherein the outer diameter of the fiber optic cable is less than or equal to 0.5 mm to enable a high density of the multiplicity of fiber optical cable length buffers.

9. A method of maintaining tension of optical fiber cables extendable from arrayed spools, the method comprising:
extending a first optical fiber cable of the optical fiber cables from the arrayed spools by a robot actuator;
sliding the first optical fiber cable through one of an array of flexible guides;
rotating a roller attached to a rotary encoder to generate encoder pulses;
counting the encoder pulses;
pulling the optical fibers cable wrapped around the arrayed spools in multiple circuits on a sled traveling between two endpoints;
rotating the arrayed spools on the sled with different rotation speeds;
translating the sled along a straight path due to dynamic extension force of the optical fiber cables wrapped around the arrayed spools of the sled; and
pulling one or more springs attached at one end to the sled from their housing to impart a restoring force that maintains a tension.

10. The method of claim 9 wherein the tension is in the range of 20 gm-f to 50 gm-f on average, and wherein the tension increases as a length of the first optical fiber cable extended increases.

11. The method of claim 9, further comprising:
comparing a number of the encoder pulses to a calculated extension length to verify that the first fiber optic cable is properly extended or retracted.

12. The method of claim 9, further comprising:
driving the robot actuator so that the travel of the sled is a fraction of the travel of the robot actuator.

13. A fiber optic cable length buffer device that auto-tensions a moveable end of an optical fiber cable that is extendable from a length buffer and opposite a fixed end of the optical fiber cable, wherein the length buffer comprises:
a spring-loading translating sled with a multiplicity of first freely rotating pulleys about a common first shaft affixed to the translating sled; and
a spaced-apart fixed common second shaft with an equal multiplicity of second freely rotating pulleys thereon,
wherein the fiber optic cable wraps in a repeated circuit around opposite pairs of the first pulleys and second pulleys on the common first shaft and on the common second shaft, and a moveable end of fiber optic cable is routed through a low friction through guide to a fiber optic connector, a spring force exerted on the spring-loading translating sled is equal to an integer multiple of a tension force imparted on the moveable end of the optical fiber cable.

14. The buffer device of claim 13, wherein a ratio of the first or second pulley's outer diameter to the shaft's outer diameter is about 10 to 1.

15. The buffer device of claim 13, wherein the tension force imparted on the moveable end of the optical fiber cable is in the range of 10 gm-f to 50 gm-f.

16. The buffer device of claim 13, wherein the optical fiber cable has a low friction, wear resistant protective covering with outer diameter of 0.25 to 0.5 mm.

17. The buffer device of claim 13, wherein the optical fiber cable is comprised of one or more individual optical fibers.

* * * * *